United States Patent [19]

Sakai et al.

[11] Patent Number: 5,613,135

[45] Date of Patent: Mar. 18, 1997

[54] PORTABLE COMPUTER HAVING DEDICATED REGISTER GROUP AND PERIPHERAL CONTROLLER BUS BETWEEN SYSTEM BUS AND PERIPHERAL CONTROLLER

[75] Inventors: Makoto Sakai; Koichi Dewa; Hiroyuki Tsukada; Keiichi Uehara; Tohru Mamata; Yasuhiro Nishino; Hiroyuki Oda, all of Tokyo, Japan

[73] Assignee: Kabushiki Kaisha Toshiba, Kanagawa-ken, Japan

[21] Appl. No.: 106,724

[22] Filed: Aug. 16, 1993

[30] Foreign Application Priority Data

| Sep. 17, 1992 | [JP] | Japan | 4-248327 |
| Sep. 17, 1992 | [JP] | Japan | 4-248328 |
| Sep. 17, 1992 | [JP] | Japan | 4-248356 |
| Sep. 17, 1992 | [JP] | Japan | 4-272471 |
| Sep. 17, 1992 | [JP] | Japan | 4-272479 |
| Sep. 18, 1992 | [JP] | Japan | 4-250165 |
| Sep. 24, 1992 | [JP] | Japan | 4-255000 |
| Sep. 24, 1992 | [JP] | Japan | 4-255001 |
| Sep. 24, 1992 | [JP] | Japan | 4-255004 |

[51] Int. Cl.$^6$ .................................................. G06F 3/00
[52] U.S. Cl. ...................... 395/800; 395/887; 364/234; 364/234.4; 364/DIG. 1; 364/928; 364/928.6; 364/DIG. 2
[58] Field of Search ................. 395/800, 275, 395/887; 364/DIG. 1, DIG. 2, 234, 234.4, 928, 928.6

[56] References Cited

U.S. PATENT DOCUMENTS

| 4,470,038 | 9/1984 | Amano et al. | 340/365 |
| 4,621,319 | 11/1986 | Braun et al. | 364/200 |
| 4,739,310 | 4/1988 | Yamamoto | 340/365 |
| 5,121,472 | 6/1992 | Danish et al. | 395/275 |
| 5,138,305 | 8/1992 | Tomiyasu | 340/717 |
| 5,241,646 | 8/1993 | Arai | 395/500 |
| 5,291,585 | 3/1994 | Sato et al. | 395/500 |
| 5,333,273 | 7/1994 | Raasch et al. | 395/275 |
| 5,341,316 | 8/1994 | Nishigaki | 364/709.12 |
| 5,345,392 | 9/1994 | Mito et al. | 364/483 |
| 5,369,771 | 11/1994 | Gettel | 395/750 |
| 5,423,045 | 6/1995 | Kannan et al. | 395/750 |
| 5,485,614 | 1/1996 | Kocis et al. | 361/680 |

FOREIGN PATENT DOCUMENTS

| 0201020 | 12/1986 | European Pat. Off. | G06F 15/16 |
| 0358423 | 3/1990 | European Pat. Off. | G06F 13/12 |

OTHER PUBLICATIONS

Interrupt Protocol for Interconnected Microprocessos, Burmester & Jaschinski, IBM Technical Disclosure Bulletin, vol. 21, No. 2, Jul. 1978, New York, USA, pp. 786–787.

*Primary Examiner*—Thomas G. Black
*Assistant Examiner*—Valerie Darbe
*Attorney, Agent, or Firm*—Limbach & Limbach LLP

[57] ABSTRACT

Dedicated registers are arranged in a status LCD control gate array connected to a system bus, and the dedicated registers or register group and a keyboard controller are connected through a keyboard interface bus. The keyboard controller has two ports for communicating with a CPU. The keyboard controller transfers existing commands released to an application program or the like and transmits normal key data through the system bus. The keyboard controller transmits hot key data and transfers a command for realizing any other special function through the keyboard interface bus and the dedicated registers.

3 Claims, 38 Drawing Sheets

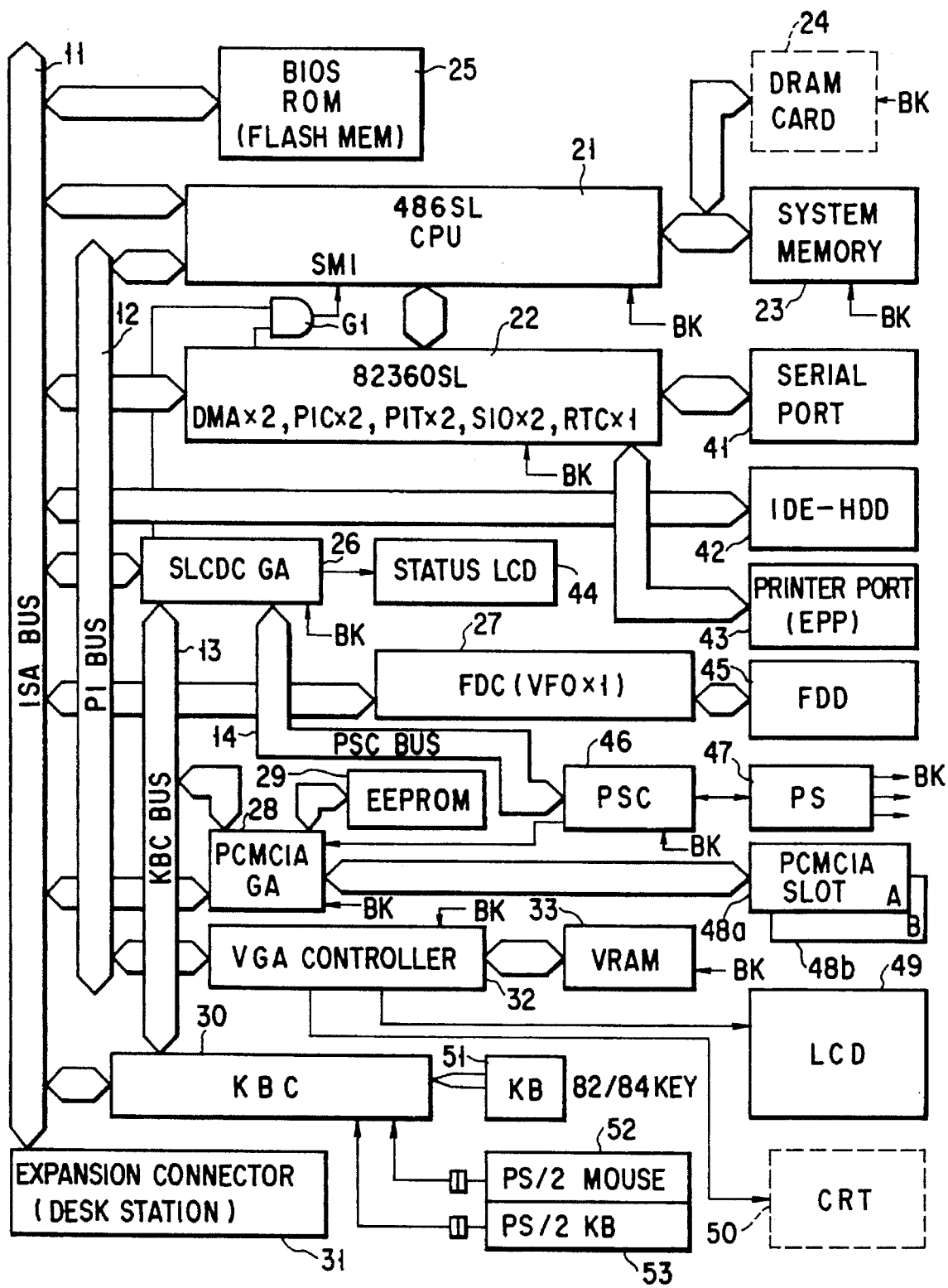
F I G. 1

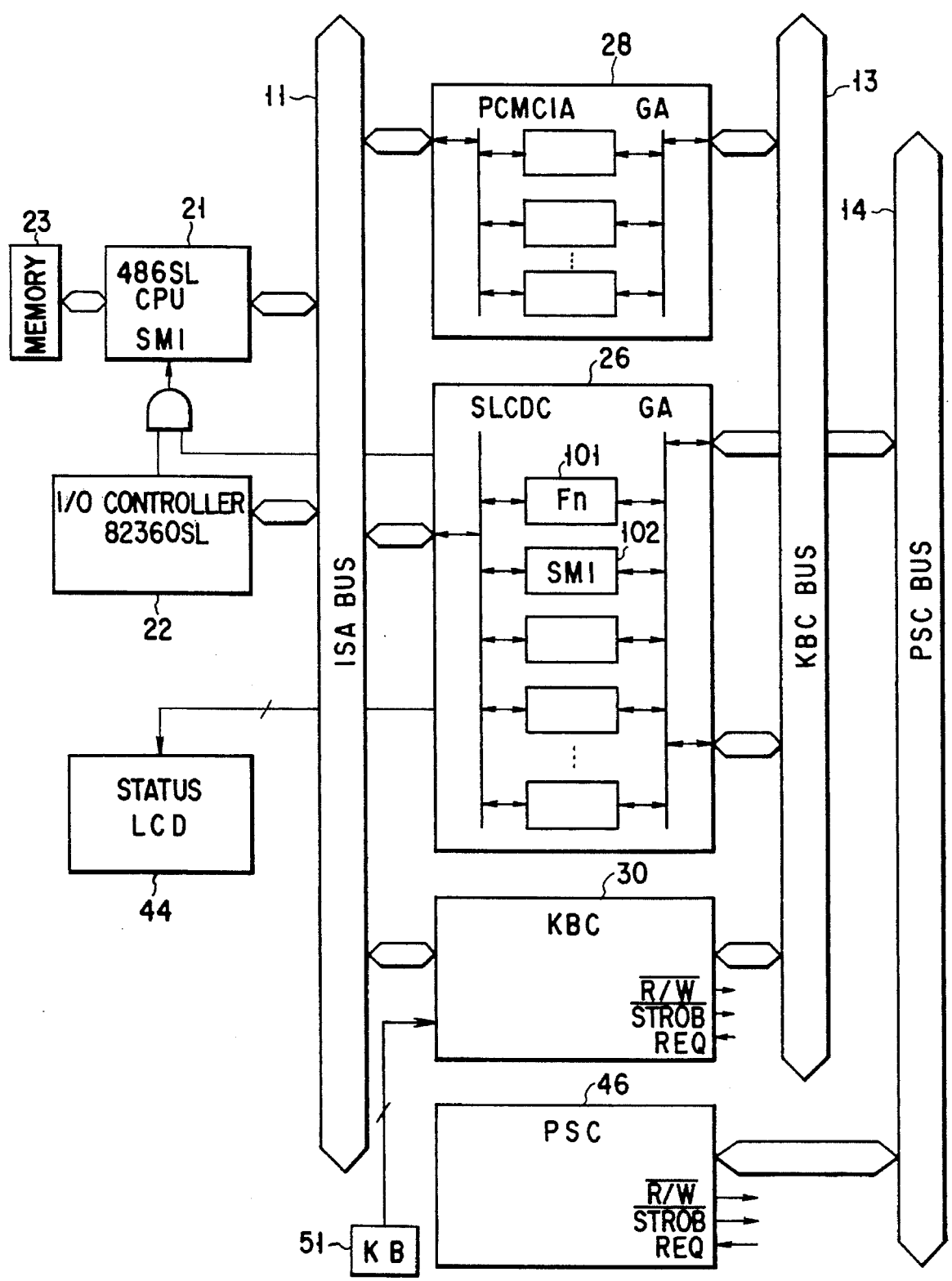
F I G. 3

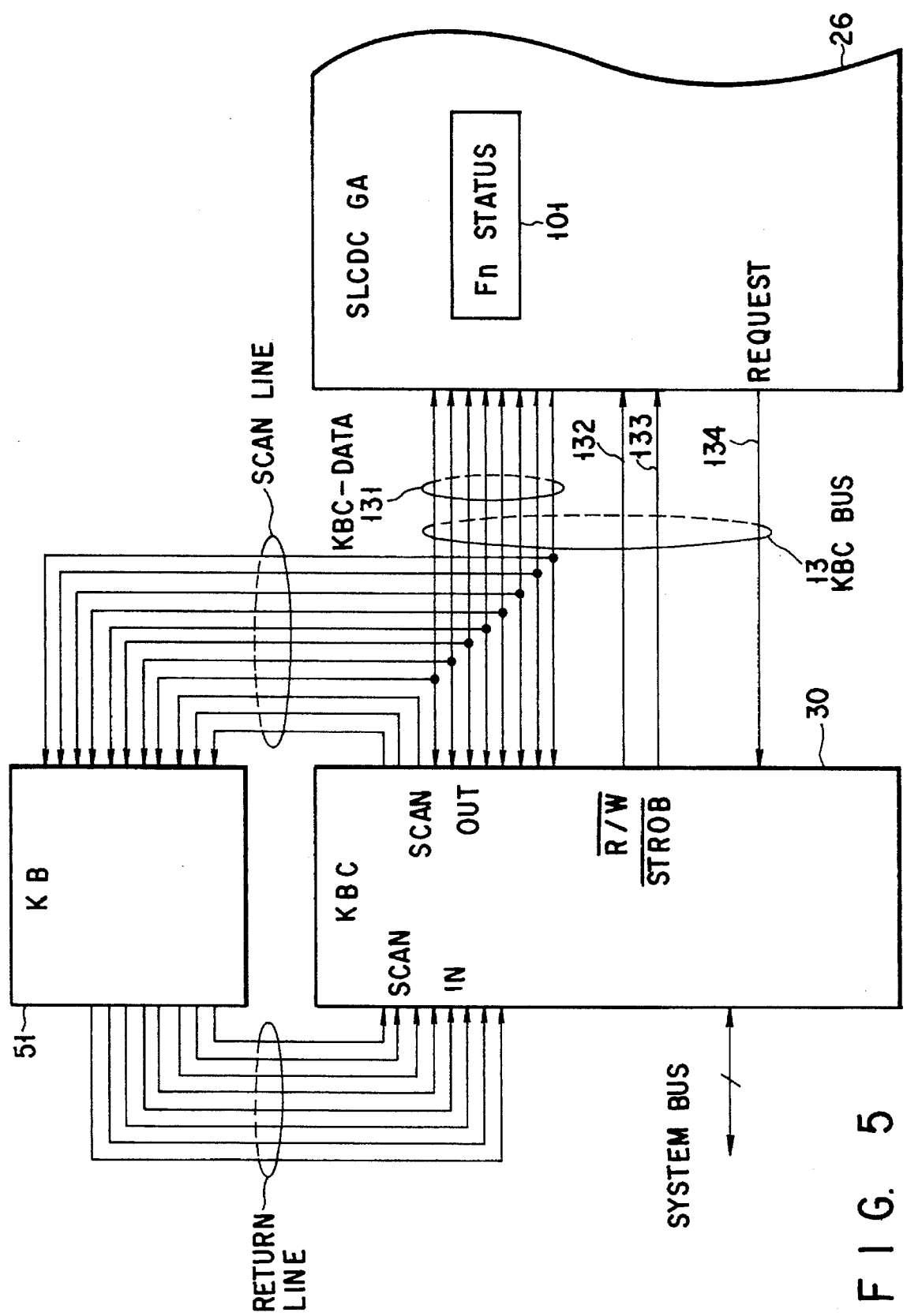
F I G. 5

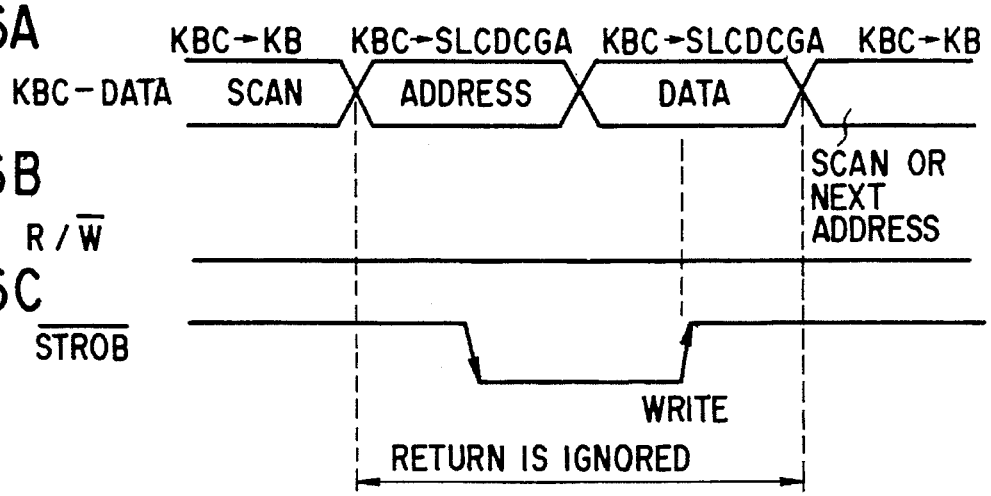
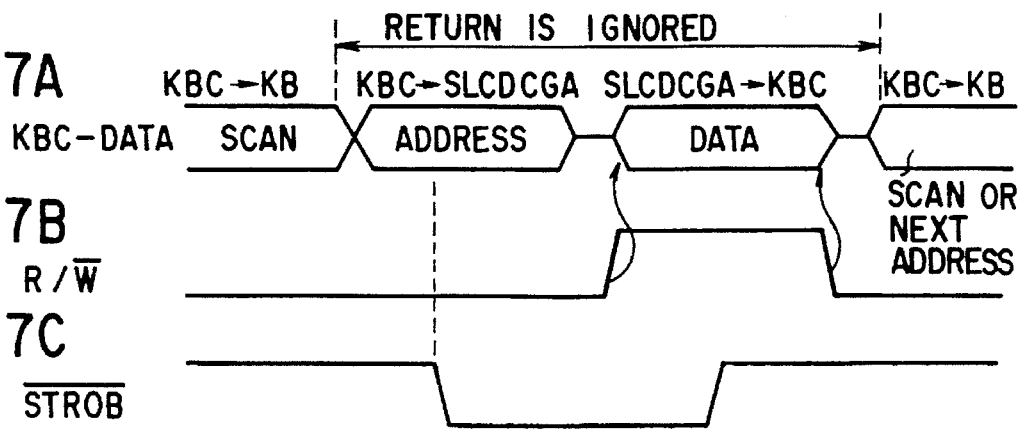
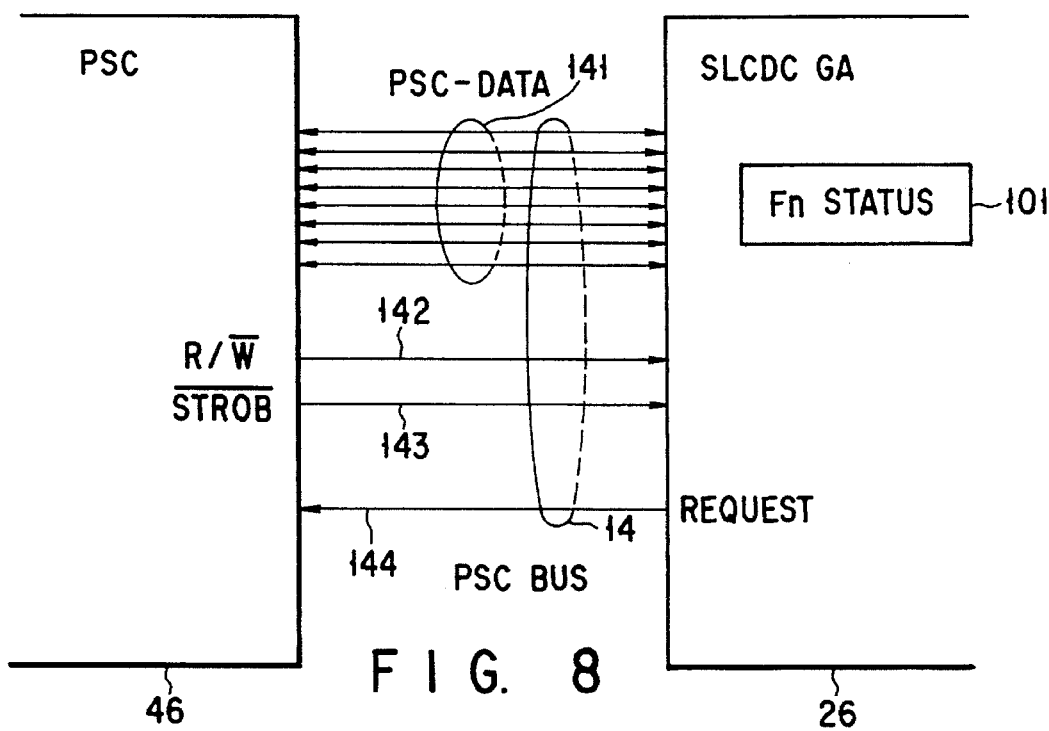
F I G. 8

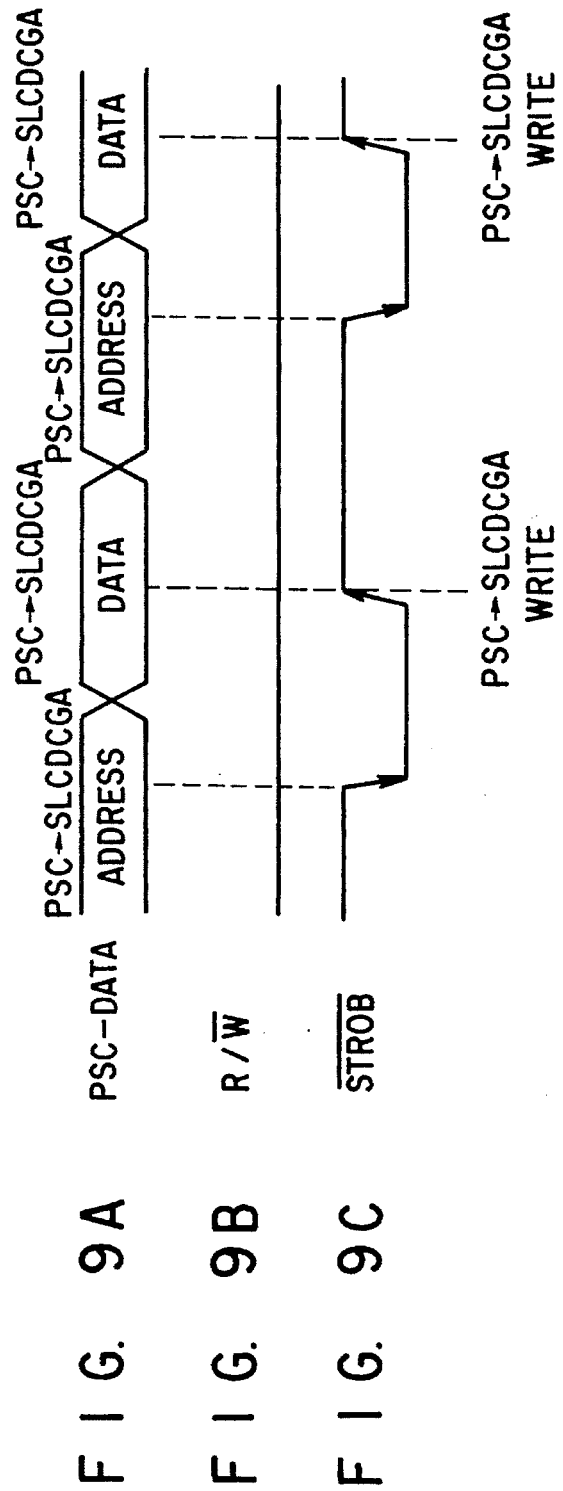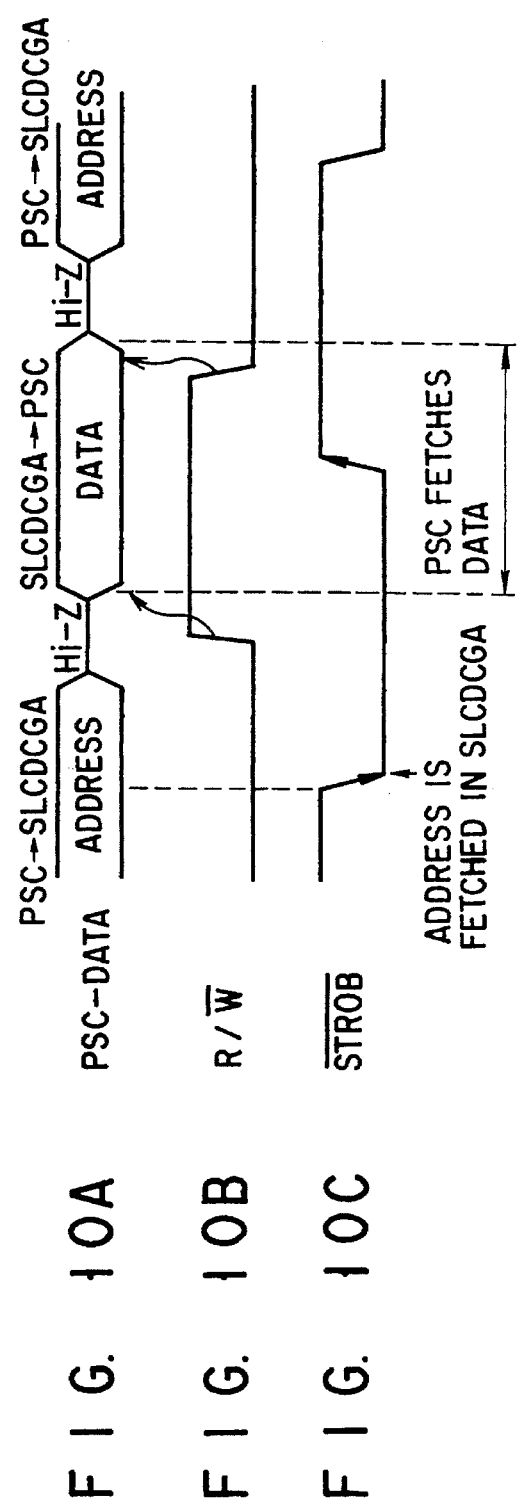

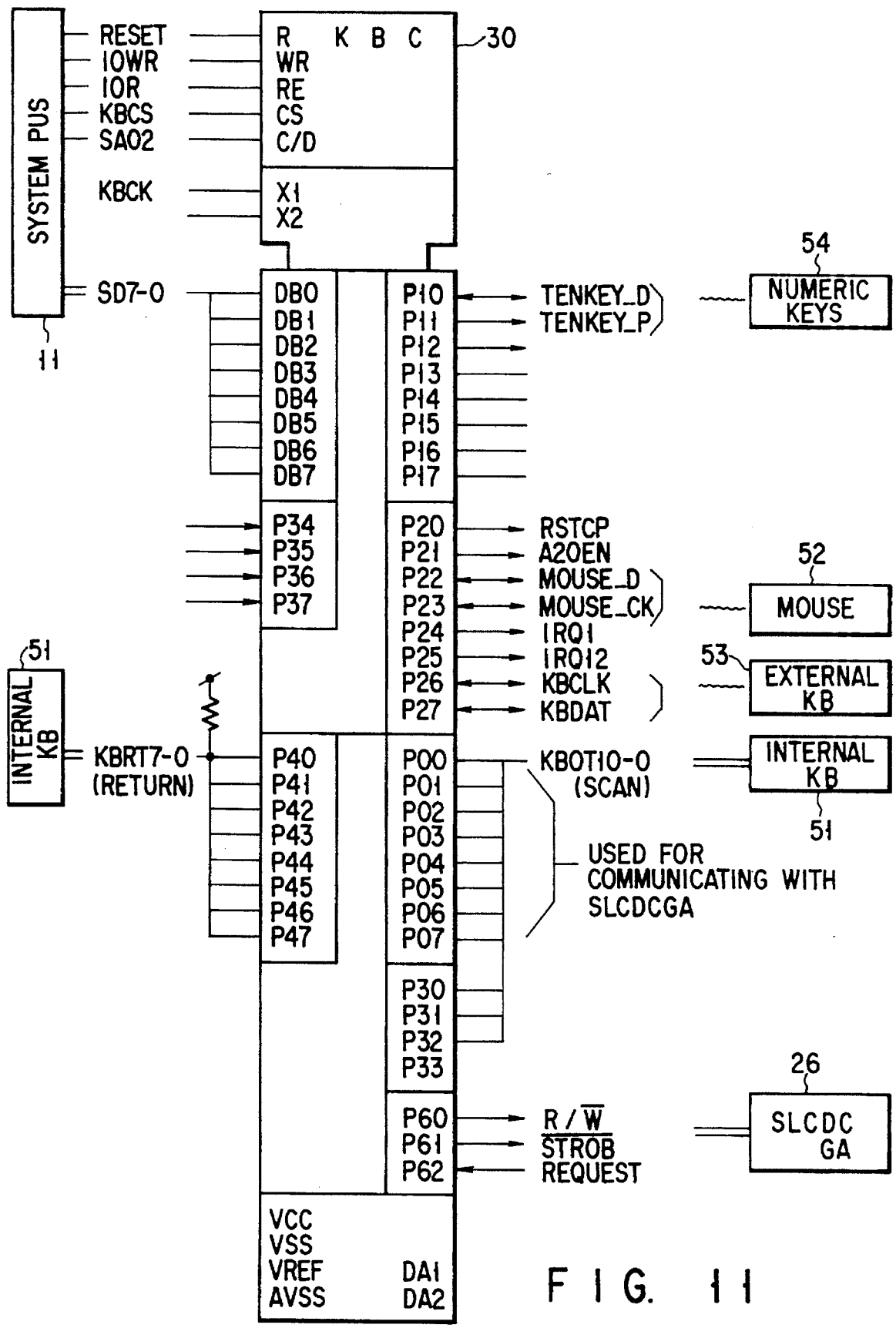
F I G. 11

| PORT | NAME | IO | FUNCTION |
|---|---|---|---|
| DB0 | SD00 | IO | CONNECTED TO SYSTEM BUS |
| DB1 | SD01 | IO | |
| DB2 | SD02 | IO | |
| DB3 | SD03 | IO | |
| DB4 | SD04 | IO | |
| DB5 | SD05 | IO | |
| DB6 | SD06 | IO | |
| DB7 | SD07 | IO | |
| P00 | KBIN00 | IO | (1) SELECT ONE OF 11 KEYBOARD SCAN LINE SELECT SIGNALS BY SEQUENTIALLY MAKING ONE OF THEM AT A LOW LEVEL |
| P01 | KBOT01 | IO | |
| P02 | KBOT02 | IO | |
| P03 | KBOT03 | IO | |
| P04 | KBOT04 | IO | (2) USED FOR COMMUNICATING WITH GA |
| P05 | KBOT05 | IO | |
| P06 | KBOT06 | IO | |
| P07 | KBOT07 | IO | |
| P10 | TENKEY_D | IO | SERIAL DATA COMMUNICATION WITH NUMERIC KEY PAD  1=COMMUNICATING WITH    0=POWER IS SUPPLIED TO NUMERIC KEY PAD |
| P11 | TENKEY_P | OT | |
| P12 | | OT | |
| P13 | | IN | |
| P14 | | IN | |
| P15 | | IN | |
| P16 | | IN | |
| P17 | | IN | |
| P20 | RESET | CT | CPU RESET SIGNAL (0 RESET) |
| P21 | A20EN | CT | A20 SIGNAL (1=ENABLE 0=DISABLE) |
| P22 | MOUSE_D | IO | SERIAL DATA COMMUNICATION WITH PS2 MOUSE |
| P23 | MOUSE_CK | IO | SYNC CLOCK FROM PS2 MOUSE IS ENTERED |
| P24 | IRQ1 | OT | ISSUE KEY INPUT INTERRUPT TO HOST CPU |
| P25 | IRQ12 | OT | ISSUE MOUSE INTERRUPT TO HOST CPU |
| P26 | KBCLK | IO | MANIPULATE CLOCK LINE OF EXTERNAL 101 KEY |
| P27 | KBDAT | IO | MANIPULATE SERIAL DATA LINE OF EXTERNAL 101 KEY |

IO: INPUT AND OUTPUT    IN: INPUT    OT: OUTPUT

F I G. 12

| PORT | NAME | IO | FUNCTION |
|---|---|---|---|
| P30<br>P31<br>P32 | KBOTO8<br>KBOTO9<br>KBOT10 | OT<br>OT<br>OT | KEYBOARD SCAN LINE SELECTION SIGNAL<br>(CONTINUED) SELECT LINE BY MAKING ONE OF<br>10 LINES TO GO LOW LEVEL SEQUENTIALLY |
| P33 | | IN | |
| P34<br>P35<br>P36<br>P37 | | IN<br>IN<br>IN<br>IN | |
| P40<br>P41<br>P42<br>P43<br>P44<br>P45<br>P46<br>P47 | KBRT0<br>KBRT1<br>KBRT2<br>KBRT3<br>KBRT4<br>KBRT5<br>KBRT6<br>KBRT7 | IN<br>IN<br>IN<br>IN<br>IN<br>IN<br>IN<br>IN | RETURN DATA OF SCAN LINE SELECTED BY<br>KBOT D0-10<br>WHEN KEY IS NOT DEPRESSED, BECOMES<br>HIGH LEVEL BY PULL-UP LESISTOR |
| P60<br>P61<br>P62 | R/$\overline{W}$<br>STROB<br>REQUEST | OT<br>OT<br>IN | SELECTION OF READ/WRITE TO SLCDC GA<br>READ/WRITE TIMING OF SLCDC GA<br>BECOMES 1 WHEN REQUEST OCCURS FROM SM<br>ROUTINE TO KBC |

FIG. 13   IO: INPUT AND OUTPUT   IN: INPUT   OT: OUTPUT

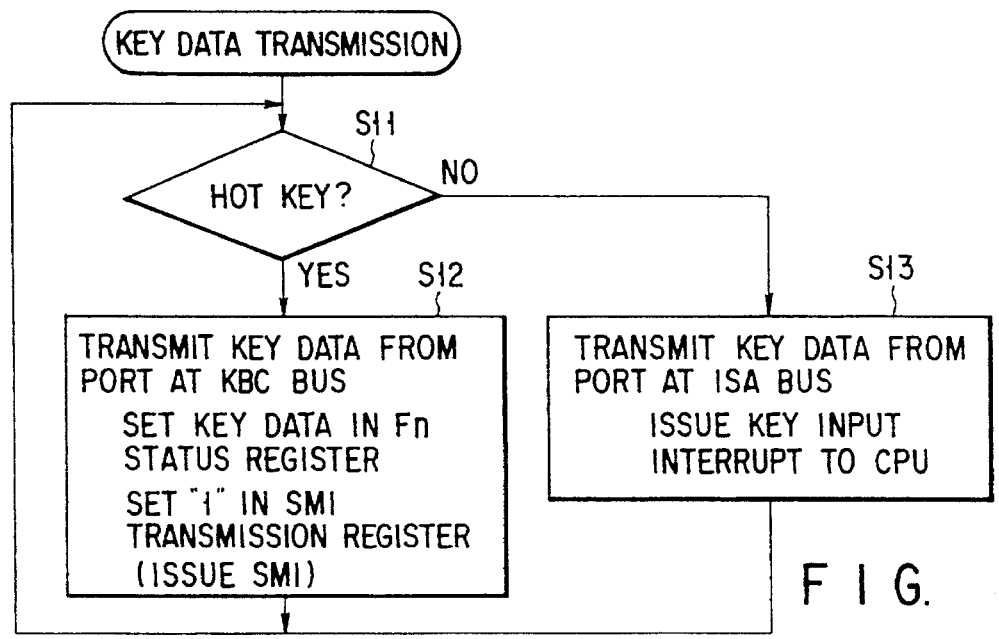

FIG. 14

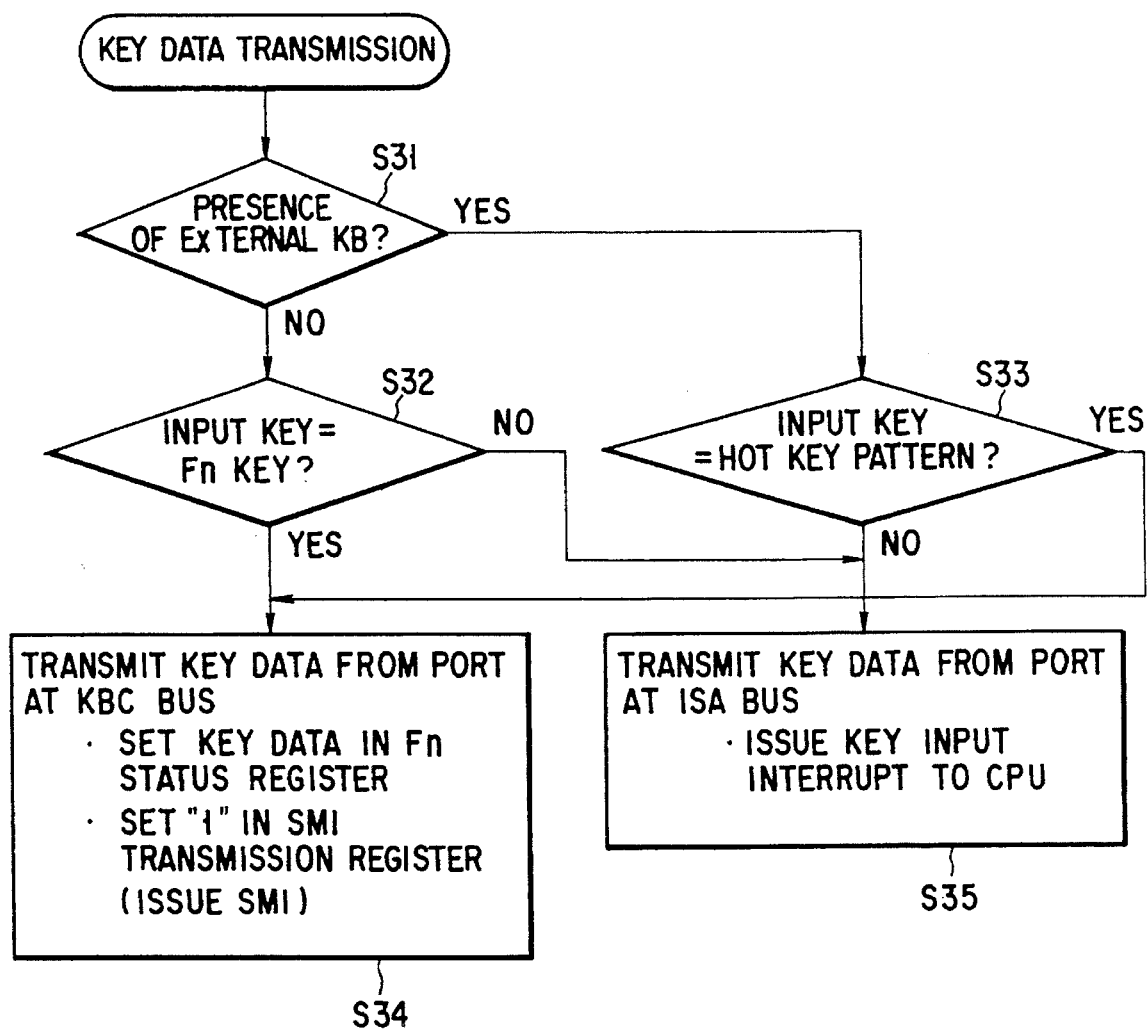
F I G. 16

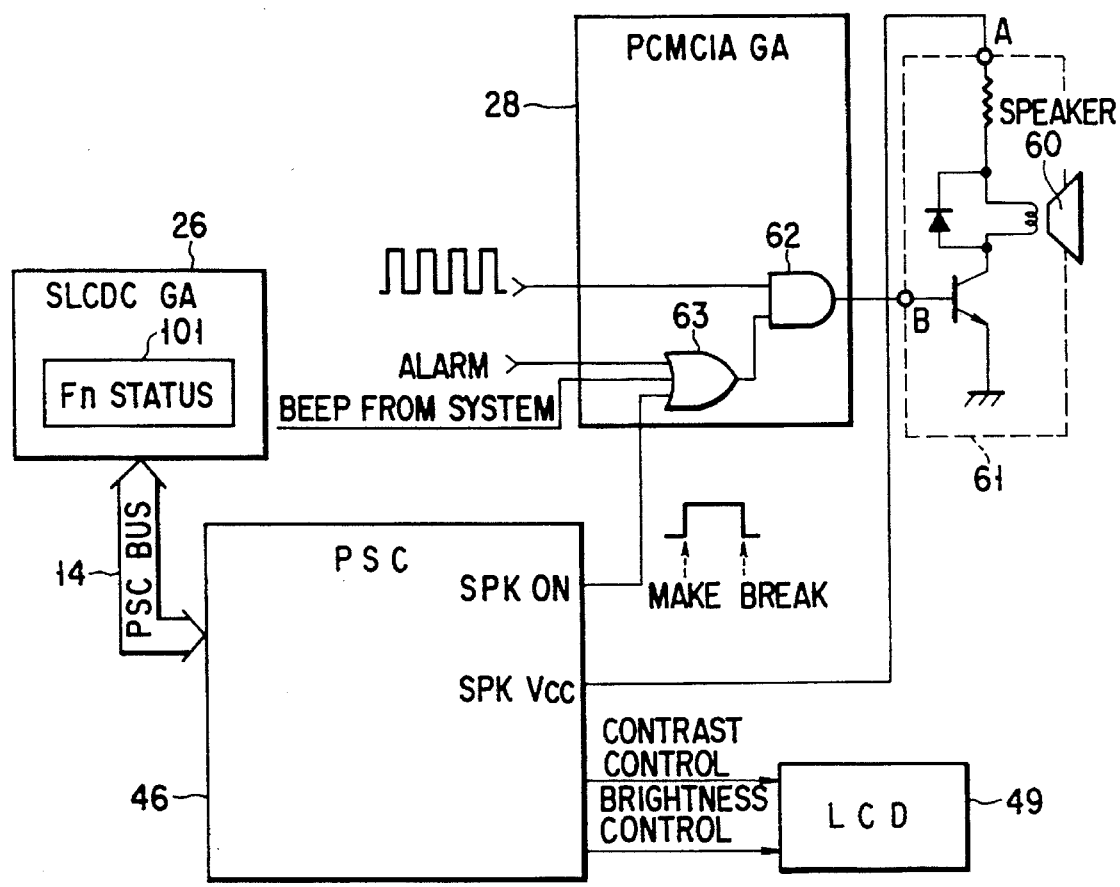
F I G. 17
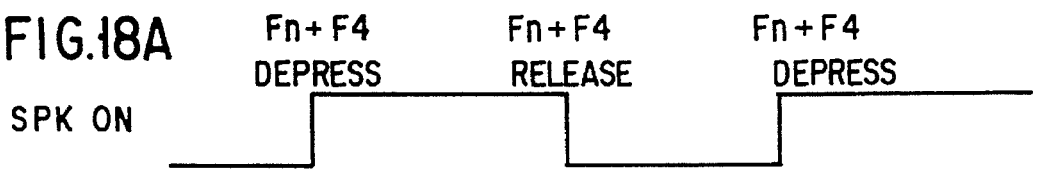
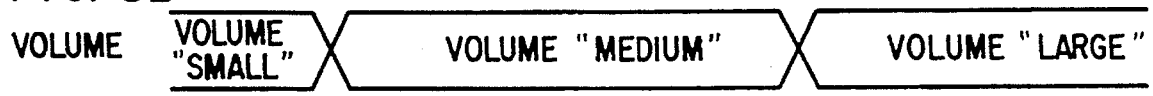

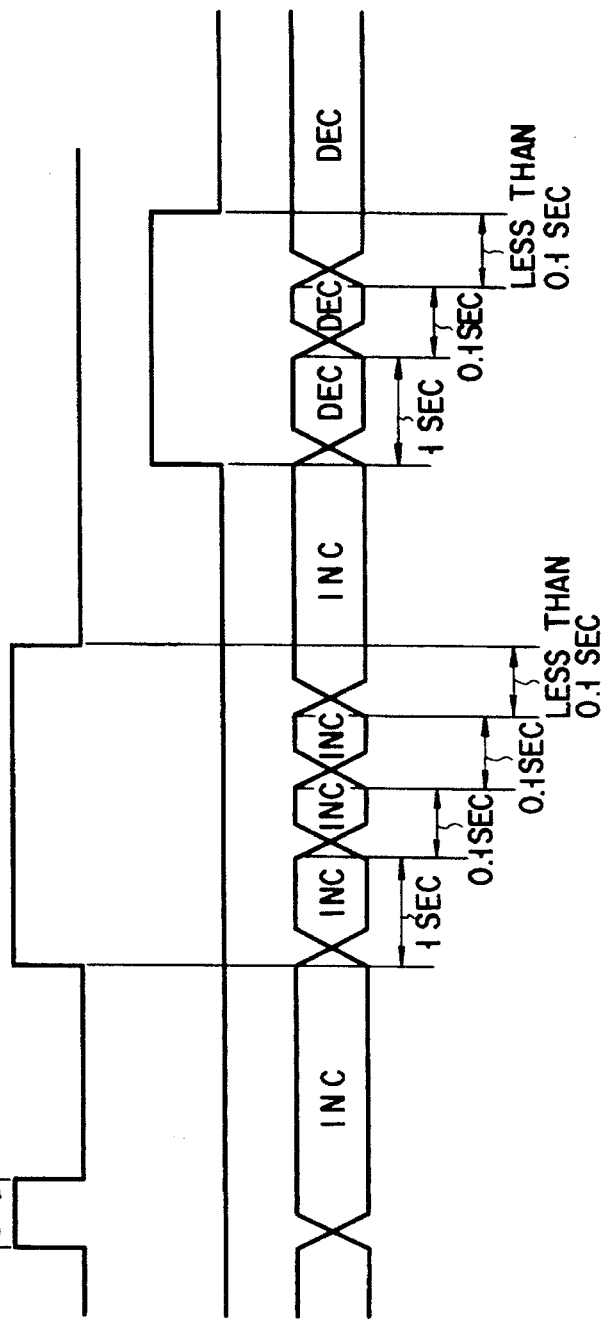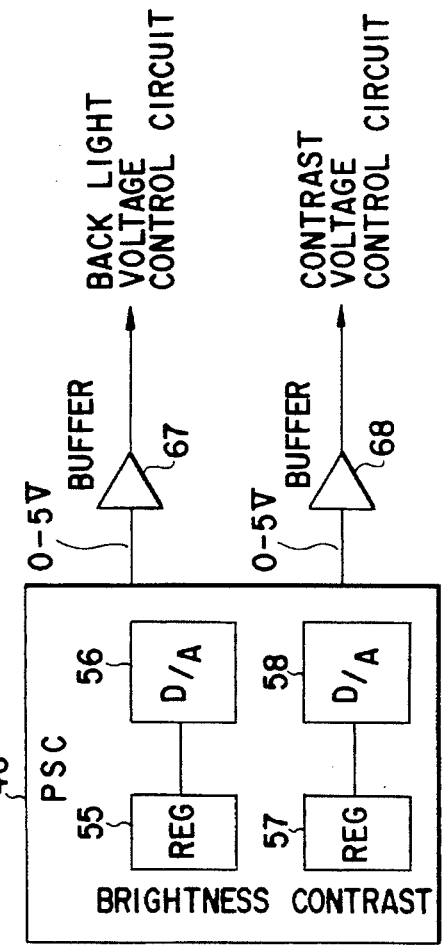

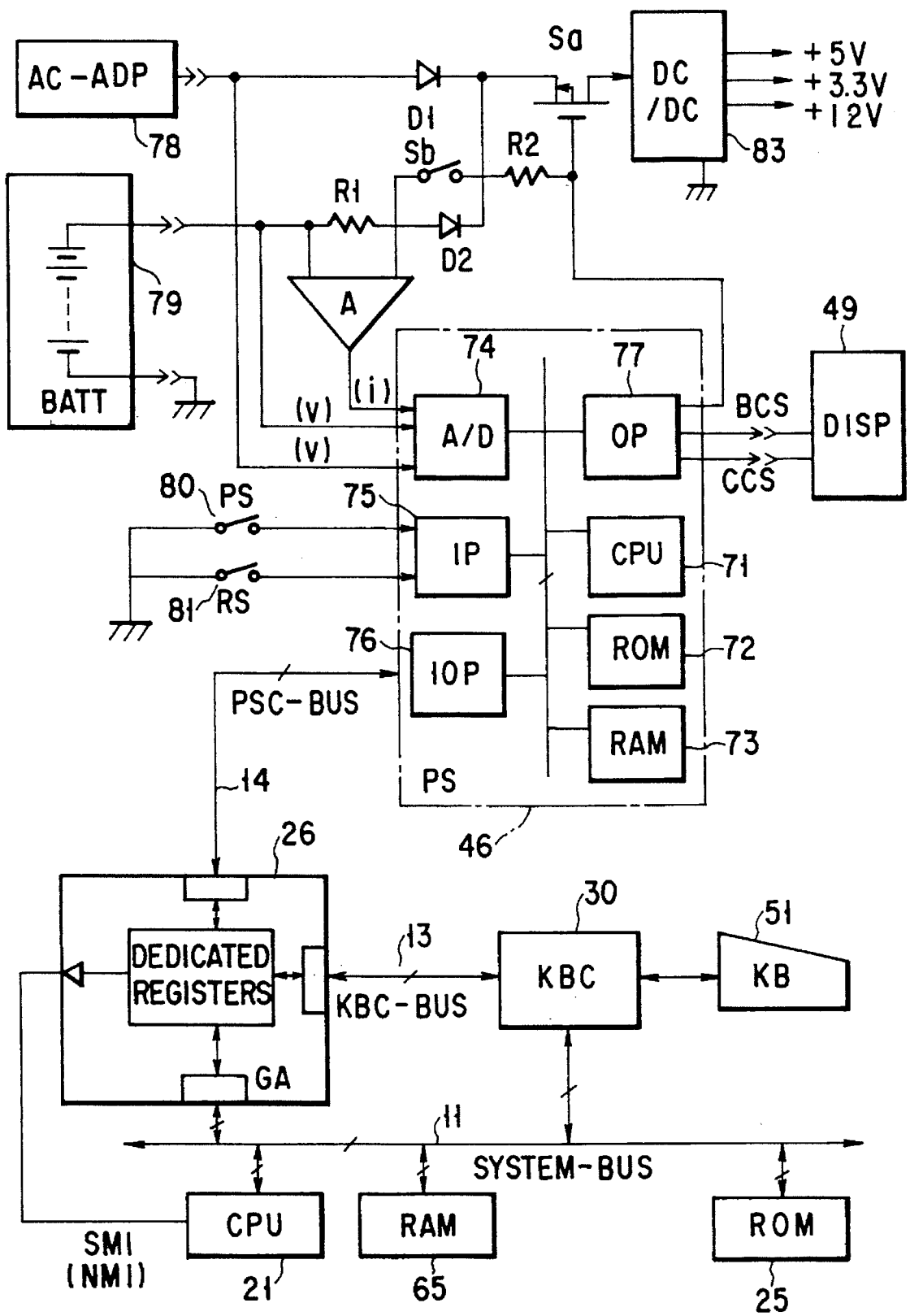
F I G. 21

REGISTER CONTENTS

| ADDRESS | |
|---|---|
| 30h<br>:<br>4Fh | PS ⇔ SYSTEM INTERFACE REGISTER |
| 80h<br>:<br>8Ch | SUB LCD CONTROL REGISTER |
| 8Dh | RESERVED |
| 8Eh | HOT KEY REGISTER |
| 8Fh | RESERVED |

F I G. 22

PS ⇔ SYSTEM INTERFACE REGISTER

| ADDRESS | DESCRIPTION |
|---|---|
| 30h | SYSTEM COMMAND STATUS REGISTER |
| 31h | SYSTEM COMMAND REGISTER |
| 32h | SYSTEM COMMAND PARAMETER REGISTER |
| 33h | RESERVED |
| 34h | RESPONSE COMMAND REGISTER |
| 35h | RESPONSE PARAMETER 1 REGISTER |
| 36h | RESPONSE PARAMETER 2 REGISTER |
| 37h | RESPONSE PARAMETER 3 REGISTER |
| 38h | POWER SUPPLY COMMAND REGISTER |
| 39h | POWER SUPPLY COMMAND PARAMETER REGISTER |
| 3Ah | POWER SUPPLY COMMAND PARAMETER |
| :<br>3Eh | RESERVED |
| 3Fh | POWER SUPPLY COMMAND STATUS REGISTER |
| 40h<br>:<br>47h | RESERVED |

SYSTEM COMMAND STATUS REGISTER (30h)  (CPU→PSC)

| B7 | B6 | B5 | B4 | B3 | B2 | B1 | B0 |
|---|---|---|---|---|---|---|---|
| COMRQ | — | — | — | — | — | — | ACK |

FIG. 24B

SYSTEM COMMAND REGISTER (31h)

| B7 | B6 | B5 | B4 | B3 | B2 | B1 | B0 |
|---|---|---|---|---|---|---|---|
| D7 | D6 | D5 | D4 | D3 | D2 | D1 | D0 |

FIG. 24C

SYSTEM COMMAND PARAMETER REGISTER (32h)

| B7 | B6 | B5 | B4 | B3 | B2 | B1 | B0 |
|---|---|---|---|---|---|---|---|
| D7 | D6 | D5 | D4 | D3 | D2 | D1 | D0 |

FIG. 24D

RESPONSE COMMAND REGISTER (34h)

| B7 | B6 | B5 | B4 | B3 | B2 | B1 | B0 |
|---|---|---|---|---|---|---|---|
| D7 | D6 | D5 | D4 | D3 | D2 | D1 | D0 |

FIG. 24E RESPONSE COMMAND PARAMETER REGISTER (35h~37h)

| B7 | B6 | B5 | B4 | B3 | B2 | B1 | B0 |
|---|---|---|---|---|---|---|---|
| D7 | D6 | D5 | D4 | D3 | D2 | D1 | D0 |

FIG. 24F POWER SUPPLY COMMAND STATUS REGISTER (3Fh) (PSC→CPU)

| B7 | B6 | B5 | B4 | B3 | B2 | B1 | B0 |
|---|---|---|---|---|---|---|---|
| SMIRQ | — | — | — | — | — | — | — |

FIG. 24G POWER SUPPLY COMMAND REGISTER (38h)

| B7 | B6 | B5 | B4 | B3 | B2 | B1 | B0 |
|---|---|---|---|---|---|---|---|
| D7 | D6 | D5 | D4 | D3 | D2 | D1 | D0 |

FIG. 24H POWER SUPPLY COMMAND PARAMETER REGISTER (39h)

| B7 | B6 | B5 | B4 | B3 | B2 | B1 | B0 |
|---|---|---|---|---|---|---|---|
| D7 | D6 | D5 | D4 | D3 | D2 | D1 | D0 |

PROCESS OF PSC

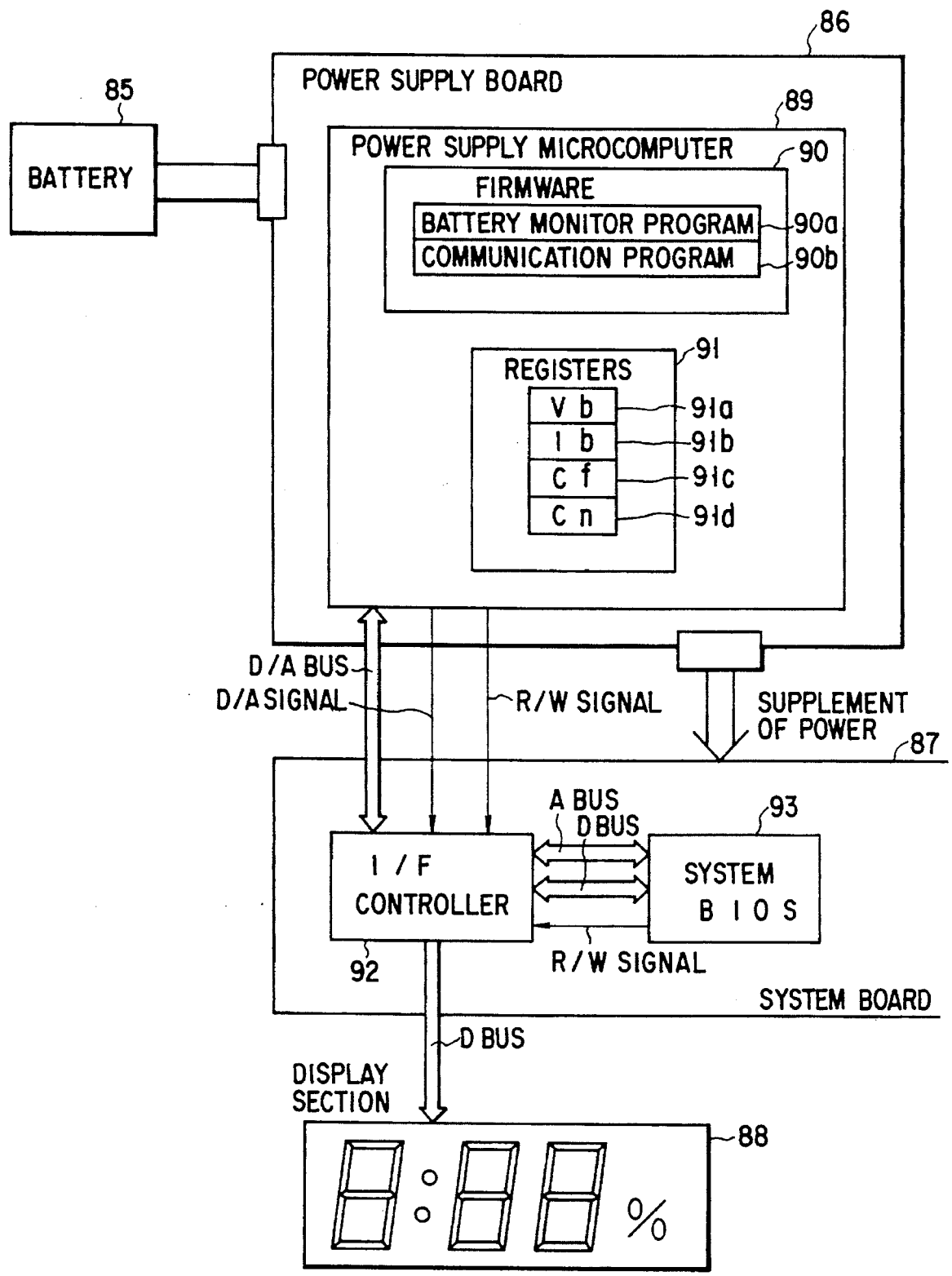
F I G. 30

| HOT KEY | FUNCTION |
| --- | --- |
| [Fn] + [F1] | INSTANT SECURITY |
| [Fn] + [F2] | SWITCHING OF POWER SAVE MODE |
| [Fn] + [F3] | SWITCHING OF RESUME/BOOT MODE |
| [Fn] + [F4] | SWITCHING OF SPEAKER VOLUME |
| [Fn] + [F5] | SWITCHING OF LCD/CRT DISPLAY |
| [Fn] + [F6] | SWITCHING OF MONOCHROME INVERTED DISPLAY OF LCD PANEL |
| [Fn] + [F7] | UNDEFINED |
| [Fn] + [F8] | UNDEFINED |
| [Fn] + [F9] | UNDEFINED |
| [Fn] + [F10] | OVERLAY OF KEYBOARD (ARROW MODE) |
| [Fn] + [F11] | OVERLAY OF KEYBOARD (NUMERIC MODE) |
| [Fn] + [F12] | SCROLL ROCK OF KEYBOARD |
| [Fn] + [→] | CONTRAST UP OF LCD PANEL |
| [Fn] + [←] | CONTRAST DOWN OF LCD PANEL |
| [Fn] + [↑] | UP BACK LIGHT BRIGHTNESS OF LCD PANEL |
| [Fn] + [↓] | DOWN BACK LIGHT BRIGHTNESS OF LCD PANEL |

FIG. 32

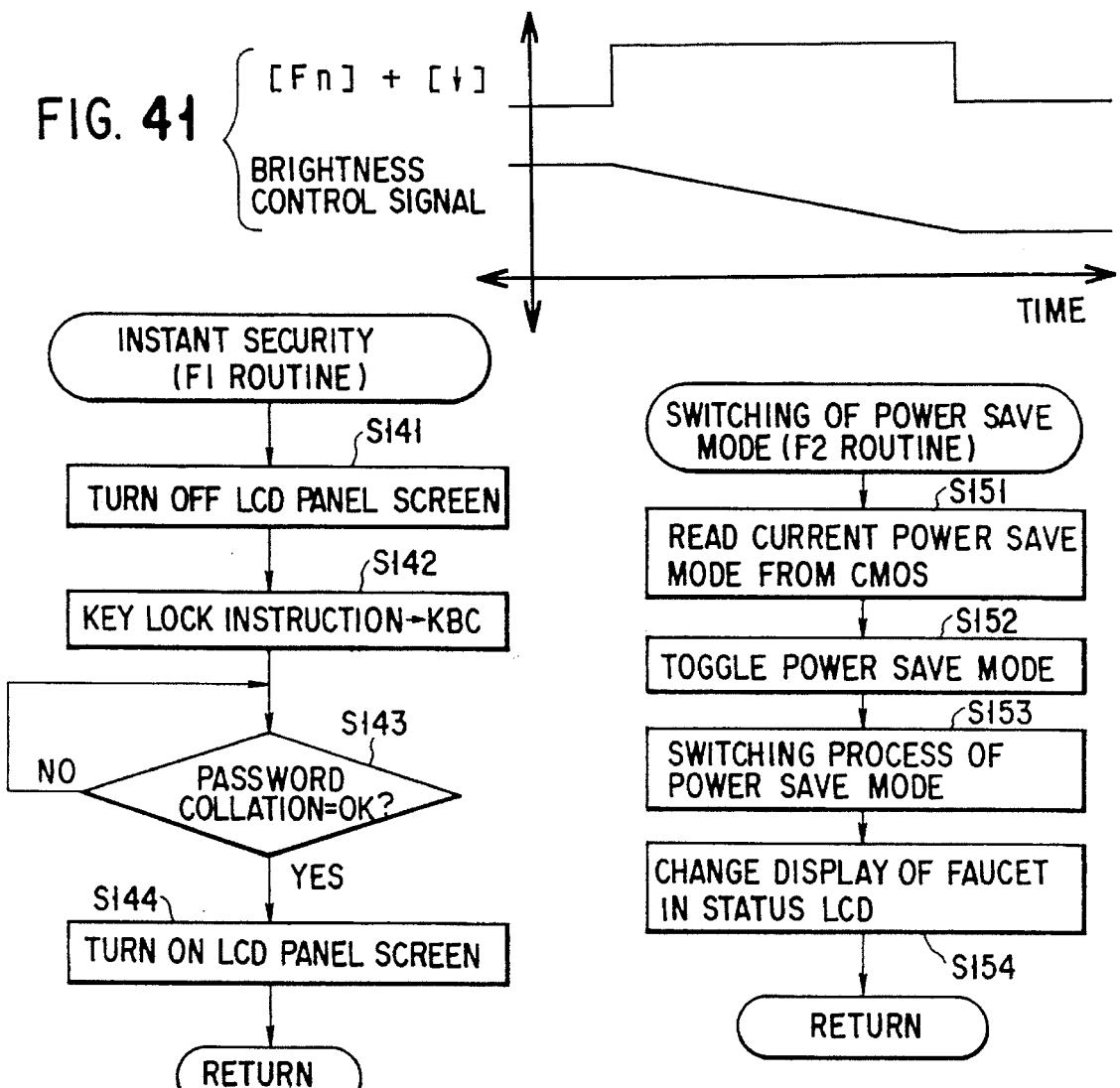

| PD4 | PD3 | PD2 | PD1 | DESCRIPTION |
|---|---|---|---|---|
| H | H | H | H | ABSENCE OF CARD |
| L | H | H | H | EXPANSION MODE EEPROM CAN BE ACCESSED THROUGH PD8-PD5 |
| OTHERS | | | | REPRESENTS CARD ARRANGEMENT DATA TOGETHER WITH PD8-PD5 |

NOTE  H: PD PIN IS PULLED UP
L: PD IS GROUNDED

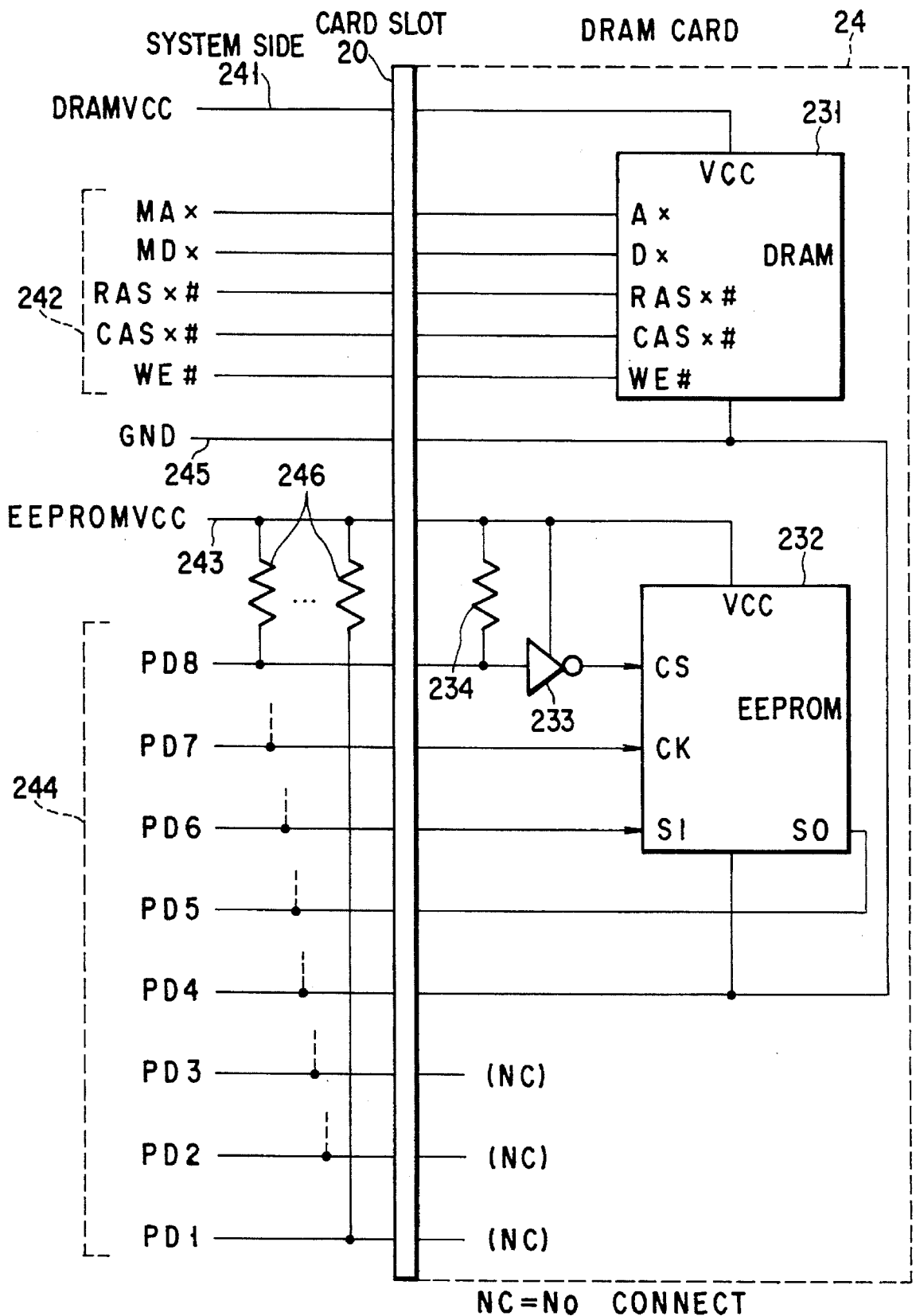
F I G. 49

| 1 | 2 | 3 | 1 | 2 | 3 |
|---|---|---|---|---|---|
| 1 | GND | GND | 23 | CAS0# | CAS0# |
| 2 | DQ0 | MD0 | 24 | CAS1# | CAS1# |
| 3 | DQ1 | MD1 | 25 | VCC(3.3V) | EEPROMVCC |
| 4 | DQ2 | MD2 | 26 | RAS2# | RAS2# |
| 5 | DQ3 | MD3 | 27 | VCC(5V) | DRAMVCC |
| 6 | DQ4 | MD4 | 28 | PD2 | PD2 |
| 7 | DQ5 | MD5 | 29 | PD4 | PD4 |
| 8 | DQ6 | MD6 | 30 | PD6 | PD6 |
| 9 | VCC(5V) | DRAMVCC | 31 | RFU | RFU |
| 10 | DQ7 | MD7 | 32 | RFU | RFU |
| 11 | VCC(3.3V) | EEPROMVCC | 33 | DQ17 | MD17 |
| 12 | DQ8 | MD8 | 34 | DQ9 | MD9 |
| 13 | A0 | MA0 | 35 | VCC(3.3V) | EEPROMVCC |
| 14 | A2 | MA2 | 36 | DQ10 | MD10 |
| 15 | VCC(5V) | DRAMVCC | 37 | VCC(5V) | DRAMVCC |
| 16 | A4 | MA4 | 38 | DQ11 | MD11 |
| 17 | VCC(3.3V) | EEPROMVCC | 39 | DQ12 | MD12 |
| 18 | A6 | MA6 | 40 | DQ13 | MD13 |
| 19 | A8 | MA8 | 41 | DQ14 | MD14 |
| 20 | A10 | MA10 | 42 | DQ15 | MD15 |
| 21 | A12 | MA12 | 43 | DQ16 | MD16 |
| 22 | RAS0# | RAS0# | 44 | GND | GND |

1 : PIN NUMBER
2 : SIGNAL NAME OF JEIDA
3 : SIGNAL NAME OF CARD SLOT

FIG. 51

| 1 | 2 | 3 | 1 | 2 | 3 |
|---|---|---|---|---|---|
| 45 | GND | GND | 67 | GND | GND |
| 46 | DQ18 | MD18 | 68 | CAS3# | CAS3# |
| 47 | DQ19 | MD19 | 69 | RAS3# | RAS3# |
| 48 | DQ20 | MD20 | 70 | WE# | WE# |
| 49 | DQ21 | MD21 | 71 | PD1 | PD1 |
| 50 | DQ22 | MD22 | 72 | PD3 | PD3 |
| 51 | DQ23 | MD23 | 73 | GND | GND |
| 52 | DQ24 | MD24 | 74 | PD5 | PD5 |
| 53 | DQ25 | MD25 | 75 | PD7 | PD7 |
| 54 | DQ26 | MD26 | 76 | PD8 | PD8 |
| 55 | RFU | RFU | 77 | RFU | RFU |
| 56 | GND | GND | 78 | RFU | RFU |
| 57 | A1 | MA1 | 79 | DQ35 | MD35 |
| 58 | A3 | MA3 | 80 | DQ27 | MD27 |
| 59 | A5 | MA5 | 81 | DQ28 | MD28 |
| 60 | A7 | MA7 | 82 | DQ29 | MD29 |
| 61 | A9 | MA9 | 83 | DQ30 | MD30 |
| 62 | A11 | MA11 | 84 | DQ31 | MD31 |
| 63 | GND | GND | 85 | DQ32 | MD32 |
| 64 | A13 | MA13 | 86 | DQ33 | MD33 |
| 65 | RAS1# | RAS1# | 87 | DQ34 | MD34 |
| 66 | CAS2# | CAS2# | 88 | GND | GND |

1 : PIN NUMBER
2 : SIGNAL NAME OF JEIDA
3 : SIGNAL NAME OF CARD SLOT

FIG. 52

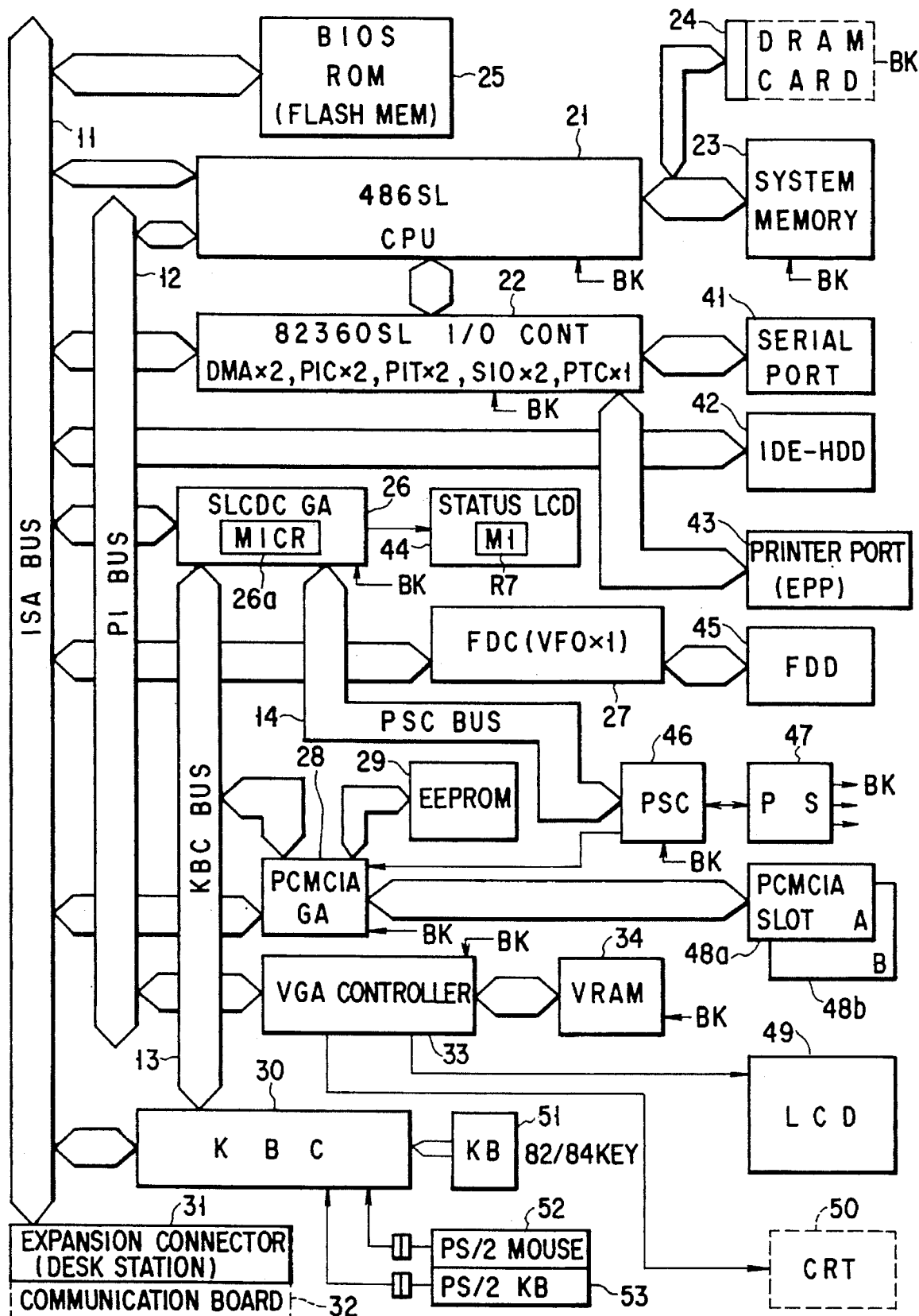
F I G. 54

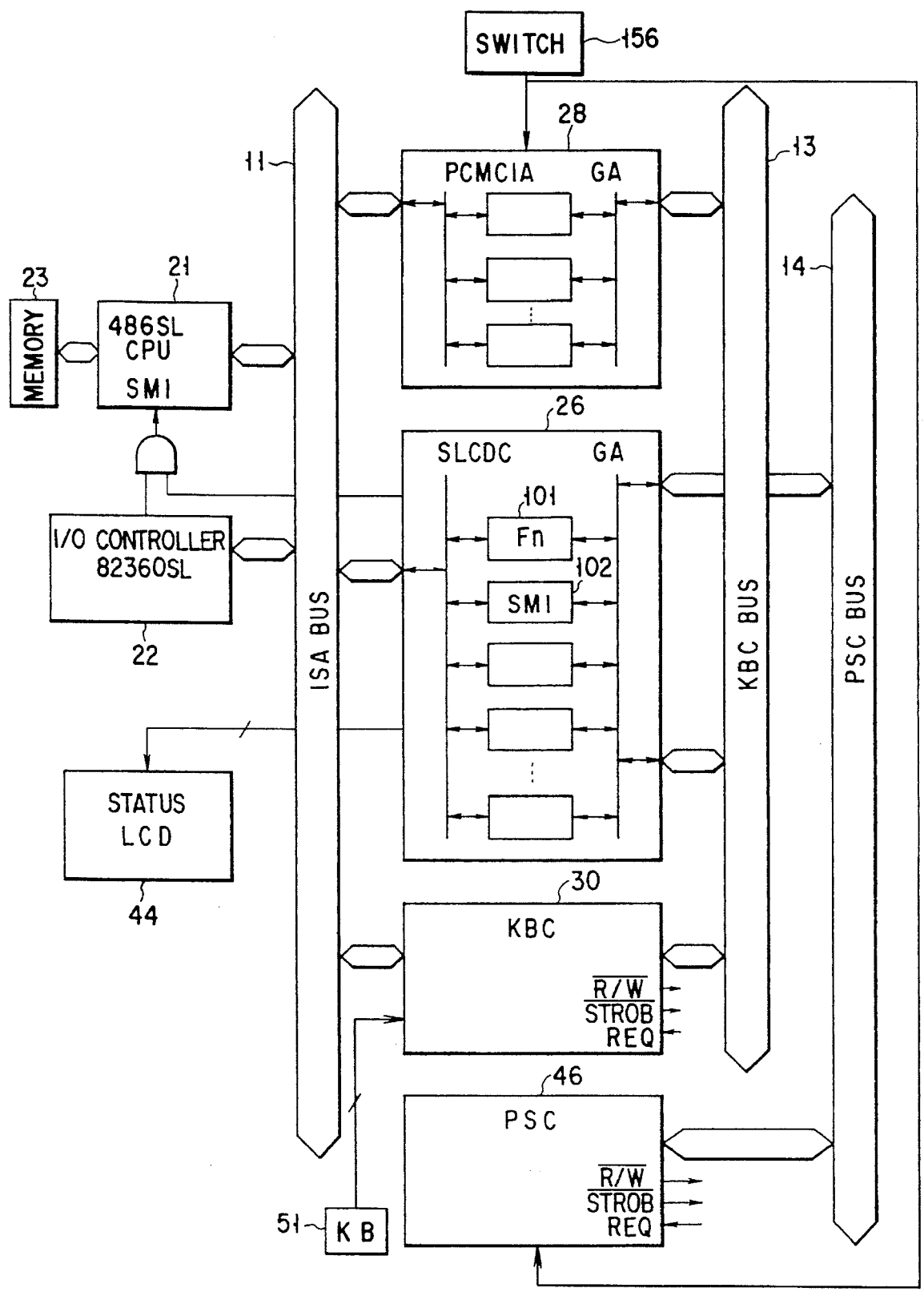
F I G. 57

| | DISPLAY UNIT | |
|---|---|---|
| | LCD | CRT |
| PANEL CLOSED | ○ | ○ |
| PANEL OPENED | ○ | × |

PORTABLE COMPUTER HAVING DEDICATED REGISTER GROUP AND PERIPHERAL CONTROLLER BUS BETWEEN SYSTEM BUS AND PERIPHERAL CONTROLLER

BACKGROUND OF THE INVENTION

1. Field of the Invention

The present invention relates to a laptop or notebook type portable computer.

2. Description of the Related Art

In recent years, various types of laptop or notebook type portable computers have been developed.

A portable computer of this type comprises a CPU, a memory, and a plurality of various peripheral controllers. The CPU is connected to the peripheral controllers through a system bus. In this case, various commands are exchanged between the CPU and each peripheral controller. All the commands are transferred through the system bus.

Communication between the CPU and the peripheral controllers through the system bus is realized in accordance with a so-called handshake scheme various communication control signals must be exchanged every time a command is transferred. For this reason, no problem is posed when the number of times of command exchange between the CPU an the peripheral controllers is small. When the number of times of command exchange is increased, the CPU and the system bus are occupied for a long period of time by command transfer. The processing performance of the system as a whole is undesirably degraded.

The number of times of command exchange is increased when a special function is assigned to a specific peripheral controller to expand the function of the portable computer. That is, when the special function is assigned to the specific peripheral controller, a command for realizing this special function is also added. The added command is transferred through the system bus as in commands for realizing the conventional functions. When function expansion is performed, the number of times of command exchange is increased accordingly.

The addition of the special function makes it possible to achieve the function expansion, but the operation time of the system bus and the CPU in command transfer between the CPU and a specific peripheral controller is prolonged. As a result, the operation performance of the system as a whole is undesirably degraded.

The CPU writes a command in the I/O register in the peripheral controller or reads out the command set in the I/O register by the peripheral controller to transfer data between the CPU and the peripheral controller. For this reason, when the special function is added to the specific peripheral controller, the command required to realize this special function is also exchanged through the I/O register of the peripheral controller as in other existing commands.

When a function required to start during execution of an application program is added as a special function, contention occurs in the read and write operations of the I/O register between the application program and the special function command, thereby causing the failure of execution of the application program. For example, when execution of the special function is requested while the application under execution sets a command in the I/O register, the command for executing the special function is overwritten on the application command, thus causing the failure of execution of the application program.

The influence on the application program by such a factor can be avoided when the contents of the I/O registers set by the application program under execution are temporarily saved upon requesting execution of the special function. When this processing is performed, however, the processing procedure for executing the special function is complicated, and it takes a long period of time until actual execution of the special function is started after the special function is requested by a user.

In recent years, in a laptop or notebook type portable computer, to meet contradictory requests, i.e., an increase in CPU processing speed, performance upon mounting a large-capacity hard disk (HDD), performance upon mounting a high-resolution, high-brightness display, improvements in performance of these devices, prolongation of the drive time of a battery, improvements of usability involving a compact, lightweight arrangement, system power supply control including battery charge control, power supply control of each input/output device, and the like using a special-purpose microprocessor (i.e., a power supply control processor) in power supply control has been performed.

In a conventional portable computer having a power supply control processor of this type, however, the interface between a CPU for controlling the system and the power supply control processor is not satisfactory. Therefore, fine adjustment in power supply control cannot be performed.

In a portable computer of this type, in data exchange between the power supply control processor arranged in a power supply controller and the system side (i.e., the CPU for controlling the system), the power supply control processor has only a means for informing the CPU of the OFF state of a power switch. This information is transferred to the CPU in the following manner. Output data from the power supply control processor is monitored by an NMI interrupt generator. When this data is set in a specific state, an NMI interrupt is supplied to the system side.

For example, in a portable computer which has a function of setting a power save mode and is capable of being operated with an AC adapter or battery power supply, assume that the power save mode is set/reset as follows, when an AC adapter is plugged into and connected to the main body, the power save mode is invalidated. When the AC adapter is disconnected from the main body (the plugged state is released), the power save mode is immediately validated. Under the above assumptions, the connected or disconnected state of the AC adapter upon connecting or disconnecting the AC adapter must be transmitted to the system side. In a conventional technique, the CPU on the system side must perform polling to check the AC adapter status because the power supply control processor cannot inform the CPU on the system side of the connected or disconnected state using an interrupt. In this case, the system performance is degraded by this polling.

In a conventional portable computer of this type, a CPU (main CPU) for controlling the system must involve in processing for changing the state of a device with a key operation, and therefore system performance is undesirably degraded.

Assume that the brightness of a display is changed with a key operation. In this case, a keyboard controller for executing a key operation must send a key operation status signal to the CPU (main CPU). The CPU analyzes this status signal to send a command for changing the brightness of the display to the power supply controller. For this reason, in the conventional computer, the CPU for controlling the system is overloaded to degrade system performance.

The most popular portable computer of this type has a so-called resume processing function of reproducing the previous use state immediately preceding a power-OFF operation when the power switch is turned on again.

In a conventional portable computer of this type, in a resume mode set condition (i.e., in the resume mode ON state), various data required to perform resume processing are stored in, e.g., an RTC (Real-Time Clock) memory (CMOS memory) backed up by a battery (suspend processing) when the system power switch is turned off.

In the data storage means by the above suspend processing, however, when the system is kept unused for a long period of time, the backup power supply (battery power supply) of the memory cannot be charged, and the voltage of the battery power supply is decreased. The storage data is therefore lost, and in this case, normal resume processing cannot be performed.

various kinds of information required for resume processing are then stored in a hard disk (HDD) (storage in a freeze mode) arranged in the system to solve the above problem.

However, data storage processing in the freeze mode requires a longer period of time than that in the suspend processing because this storage processing involves with HDD access.

For example, when a power or reset switch, or the like is operated during execution in the freeze mode, data to be saved in the HDD may be damaged, and data storage in the freeze mode cannot be guaranteed.

In a portable computer such as a battery-driven personal computer, a function of displaying a remaining battery level to a user to allow the user to judge a remaining battery operation time of the computer is required to prevent the dead state of the battery during the use of the computer.

In a conventional personal computer or the like, this battery remaining level is displayed in percentage. A method of displaying the remaining battery level in percentage is as follows.

1) An A/D-converted value of a battery current is sampled with a period.
2) The sampled digital battery current value is accumulated in the form of an addition for charging and in the form of a subtraction for discharging in a battery level counter for counting the remaining battery level.
3) The remaining level count value in the fully charged state of the battery is calculated in accordance with the given battery specifications. This calculation value is defined as a 100% capacity value, and finite count values at, e.g., 90%, 80%, . . . , 0% are prepared.
4) The battery level counter value calculated every predetermined period is compared with each prepared count value in percentage to obtain the current battery level in the form of an "X percentage".

When the remaining battery level is displayed by the above method, the reference is defined by the given battery specifications. That is, this reference is based on the initial charging/discharging characteristics which can be supposed in the new state of the battery.

In general, the battery performance is greatly influenced by an application environment and is gradually degraded, when the degree of degradation is great, a difference between the displayed battery level and the actual battery level is increased.

Upon displaying the battery level in percentage, the user roughly figures out the remaining battery time in accordance with the displayed percentage and the battery time in the fully charged state. The user then continues to use the computer. In this case, it is more convenient to directly display a remaining battery time in numeric value.

This also applies to the battery charging operation. It is more convenient to display the charge time representing the charge level of the battery or the remaining charge time in numeric value in place of the percentage.

A portable computer of this type has various operation modes. For example, the portable computer can switch between speaker ON and OFF states and between the resume mode and the boot mode. To switch between these modes and check the current mode, a conventional arrangement requires to display a pop-up window on the screen upon execution of pop-up processing or the like. In this case, the application program is temporarily interrupted until the end of pop-up processing.

The displayed characters in the pop-up window may be disturbed by the application program because the pop-up window is displayed within the screen provided by the application program under execution. Pop-up processing is started using a maskable interrupt, and this interrupt is masked by the application program under execution. As a result, the pop-up processing cannot be performed.

Expanded memories of conventional personal computers are uniquely developed by different manufacturers. However, in recent years, demand has arisen for standardizing the expanded memories in the field of computer industries, and JEIDA standardized a DRAM card and issued a guideline ver. 1.0. In U.S.A., JEDEC approved the same DRAM card specifications as those of the guideline.

In a standardized ver. 1.0 DRAM card (to be simply referred to as a DRAM card hereinafter), PD (Presence Detect) pins are defined to allow the system to identify the card configuration.

The PD pins consist of eight pins, i.e., PD8 through PD1 (eight bits). Unique meanings are assigned to the PD pins, respectively. First of all, the pin PD8 represents a refresh type DRAM, and the pins PD7 and PD6 represent a card access time. The pin PD5 represents the number of banks. The pins PD4 through PD1 represent a combination of row/column addresses and a device type (device configuration).

There is a possibility of introducing a DRAM card which cannot be expressed by these pieces of card configuration information. To prepare for a future expansion, an expansion PD pin is reserved as "EXPANSION" in the pins PD4 through PD1. A method of using this expansion PD pin is not yet defined.

To cope with a DRAM card which cannot be expressed by only the defined card configuration information, a serial EEPROM for storing an expanded card configuration information may be mounted on the same card, and the expansion PD pin may be assigned to the serial EEPROM. More specifically, if the pins PD4 through PD1 represent "EXPANSION", the pins PD8 through PD5 are used in communication between the system side and the serial EEPROM.

A battery-driven system mainly requires to operate a DRAM at a low voltage (3.3 V) so as to reduce the power consumption. An I/O (I/O port) may require a high voltage (5 V) in compatibility with other systems. When the serial EEPROM is mounted on the DRAM card, the EEPROM must be operated at a voltage different from the operating voltage of the DRAM because the PD pin interface is connected to the I/O (I/O port). This cannot be realized by the present definitions of the DRAM card.

When a DRAM operated at 3.3 V is applied to the DRAM card, the power supply voltage may be applied from a 3.3-V power supply pin of the DRAM card. When this card is inserted into a 5-V system (i.e., a system not connected to a 3.3-V power supply), the power supply (3.3-V power supply) of the DRAM is kept floating. Only a signal having a 5-V level is applied to the DRAM to cause an operation error or damage. This trouble also occurs when the power supply voltage is applied from the 5-V power supply pin of the DRAM card and the card is inserted into a 3.3-V system.

A DRAM having a wide range operative at 3 through 5 V cannot be conveniently used because the 5- and 3.3-V power supply pins are separated.

Many personal computers of this type can perform electronic mail exchange through a mail server with other personal computers or the like upon connection with a LAN or the like through a communication interface (communication board).

In a conventional arrangement, the user cannot know whether the electronic mail has been received during execution of an application program. The user may not notice even an emergency electronic mail.

To check the presence/absence of a received mail, the user must interrupt the application program under execution and starts a mail program (as one of the application programs). Upon executing this mail program, an electronic mail to him, which has been received by the mail server, must be read from the mail server and be displayed on the screen. After the user performs a confirmation operation for the display result at a keyboard or the like, the mail program is ended, and execution of the previous application program can be restored.

In the conventional arrangement described above, the application program under execution must be interrupted for a long period of time to check the presence/absence of the received electronic mail, resulting in inconvenience.

In a conventional portable computer, a key operation must be performed to switch between an internal display and an external display, as needed. The setup contents concerning the display switching are reset to the initial condition when the power switch is turned off. When the user wants to use an external display device, the key operation must be repeated every time the power switch is turned on, resulting in a cumbersome operation.

SUMMARY OF THE INVENTION

It is an object of the present invention to provide a portable computer capable of efficiently realizing function expansion of a system without degrading the system performance.

It is another object of the present invention to provide a power supply interface apparatus for a portable computer, which is arranged to send an interrupt from a power supply controller to a CPU to cause the CPU to read various data including a power supply controller status signal, so that arbitrary data can be exchanged between the power supply controller and the CPU without degrading the system performance.

It is still another object of the present invention to provide a power supply interface apparatus for a portable computer, capable of performing device control of a power supply controller which involves with a key operation without overreading the system side.

It is still another object of the present invention to provide a power supply control apparatus capable of properly storing data even if a power switch, a reset switch, or the like is operated in the freeze mode.

It is still another object of the present invention to provide a portable computer capable of accurately displaying a remaining battery level in an understandable unit.

It is still another object of the present invention to provide a portable computer capable of checking or switching a current operation mode without adversely affecting an application program under execution.

It is still another object of the present invention to provide a DRAM card control system, capable of properly using a DRAM card having a ROM such as a serial EEPROM which stores card configuration information, independently of a DRAM even if the operating voltages of the ROM and DRAM are different from each other.

It is still another object of the present invention to provide a portable computer capable of automatically displaying whether an electronic mail is received, without adversely affecting execution of an application program or the like.

It is still another object of the present invention to provide a portable computer capable of automatically switching between an internal display device and an external display device in accordance with an open/closed state of a panel upon power-ON operation.

According to the first aspect of the present invention, there is provided a portable computer having a CPU, a memory, a system bus, and various peripheral controllers connected to the CPU through the system bus, comprising a dedicated register group, arranged between the system bus and the peripheral controllers, for temporarily setting various kinds of control information exchanged between the CPU and the peripheral controllers, and a controller bus which is arranged between the dedicated register group and the peripheral controllers and in which a data line having a width of a plurality of bits is defined, wherein the CPU reads/writes control information from/in the dedicated register group through the system bus, and the peripheral controllers read/write the control information from/in the dedicated register group through the controller bus.

In this portable computer, the dedicated register group is arranged between the system bus and the peripheral controllers. The dedicated register group and the peripheral controllers are connected through the controller bus. For this reason, the CPU performs read/write access to the dedicated register group through the system bus, and the peripheral controllers perform read/write access to the dedicated register group through the controller bus. Therefore, exchange of control information between the CPU and the peripheral controllers can be executed.

In this case, in transfer from the CPU to any peripheral controller, while the CPU writes control information in the dedicated register group through the system bus, the peripheral controller can execute other processing operations. After the control information is written in the dedicated register group, the CPU and the system bus are released from this control information transfer. Similarly, in transfer from the peripheral controller to the CPU, while the peripheral controller writes control information in the dedicated register group through the controller bus, the CPU and the system bus are released from this control information transfer and can execute other processing operations. Therefore, even if the number of times of transfer of the control information between the CPU and the peripheral controllers is increased, the operation time of the system bus and the CPU in this transfer can be shortened, and the function expansion of the system can be efficiently realized.

According to the second aspect of the present invention, the peripheral controller has first and second communication ports respectively connected to the controller bus and the system bus, first control information is exchanged between the peripheral controller and the CPU through the first communication port, the controller bus, and the dedicated register group, and the second control information is exchanged between the peripheral controller and the CPU through the second communication port and the system bus.

With this arrangement, for example, when an additional command for function expansion is exchanged as the first control information between the peripheral controller and the CPU through the controller bus and the dedicated register group, and other existing commands used in an application program and the like are exchanged between the peripheral controller and the CPU through the system bus. Therefore, the expansion function can be executed without adversely affecting execution of the application program while maintaining compatibility with conventional systems.

According to the third aspect of the present invention, an interrupt register and a data register are arranged between a CPU for controlling a system and a power supply controller having a microprocessor for controlling a system power supply. When the power supply controller is to send data to the CPU, the power supply controller sends a hardware interrupt to the CPU through the interrupt register, and the CPU reads data from the power supply controller through the data register. Arbitrary data can be exchanged between the power supply controller and the CPU without degrading the system performance.

More specifically, a gate array having a plurality of input/output ports and a register group capable of performing read/write access from each of the plurality of input/output ports is arranged between a CPU for controlling a system and a power supply controller having a microprocessor for controlling a system power supply. Some registers of the register group of the gate array are used as the interrupt register (power supply command status register) and the data register (power supply command register) which realize data exchange between the power supply controller and the CPU. When the power supply controller is to send data to the CPU, the power controller sets transmission data in the data register, and then sends a hardware interrupt such as an NMI or SMI to the CPU through the interrupt register. The CPU reads the data from the data register in response to the hardware interrupt. Arbitrary data can be sent from the power supply controller to the CPU without degrading the system performance. In addition, the CPU uses one or a plurality of registers of the above register group to set a command or both a command and a parameter in one or the plurality of registers. The power supply controller performs polling to read the contents of the register or registers set with the above data. The command and parameter can be transferred from the CPU to the power supply controller. Note that the SMI (System Management Interrupt) is a kind of a non-maskable interrupt called a system management interrupt and is a hardware interrupt having the highest priority level higher than those of an NMI (Non-Maskable Interrupt) and an INTR (Maskable Interrupt). The SMI is started when an SMI interrupt request input terminal of the CPU is set active.

With the above arrangement of the present invention, for example, to inform the CPU on the system side of depression of a power switch, a code representing the depression of the power switch (OFF operation) is set in the above data register. Data for generating the NMI (or SMI) interrupt is set in the interrupt register. When the CPU on the system side receives this hardware interrupt (SMI or NMI), the CPU reads the data set in the data register. In this manner, depression (OFF operation) of the power switch is informed to the CPU. In the above data exchange means, when an AC adapter is connected to the system, the power save mode is invalidated. When the AC adapter is disconnected from the system, the power save mode is immediately validated. The AC adapter is plugged into the system. When the plugged state of the AC adapter is canceled, the state (status) of change is informed from the power supply controller to the CPU on the system side every time the AC adapter is disconnected from the system. Since the system has this power supply interface apparatus, various system control operations including the power save function can be finely executed without degrading the system performance, thereby improving the system function. Note that the power save operation is a known technique, which is exemplified by switching control of the CPU clock frequency, automatic power-OFF control of the hard disk, and display back light automatic OFF control in an non-operative state.

According to the fourth aspect of the present invention, a register whose write access is controlled by a keyboard controller and read access is controlled by a power supply controller is arranged between the power supply controller and the keyboard controller. The power supply controller directly monitors a specific key input state with reference to the register. When the power supply controller detects the specific key input state, this specific key input is reflected on a device. Device control of the power supply controller which involves with a key operation can be performed without executing processing on the system side.

More specifically, a gate array having a register group capable of performing data read/write access between a power supply controller for controlling a system power supply and a keyboard controller for controlling a keyboard is arranged between the power supply controller and the keyboard controller. A hot key register whose write access is controlled by the keyboard controller and read access is controlled by the power supply controller is arranged in the register group. The keyboard controller sets a key scan code, formed upon a hot key operation, in the hot key register. The power supply controller performs polling to read the key scan code from the hot key register. For example, the brightness and contrast of the display device are controlled in accordance with the contents of the code. The key operation can be directly reflected on the target device of the power supply controller without degrading the system performance.

In addition to the above arrangement, a command register whose write access is controlled by a CPU for controlling a system and read access is controlled by a power supply controller is arranged to cause the power supply controller to define a correspondence between the hot key and the control contents in accordance with the command from the main controller. A specific device can be controlled in accordance with the contents of the hot key register.

With the above arrangement of the present invention, the power supply controller directly checks (reads) the output from the keyboard controller through the register. The control of the brightness and contrast can be performed with, e.g., a hot key operation, without overreading processing on the system side. A register for transferring a command from the CPU to the power supply controller is arranged between the power supply controller and the CPU. Therefore, a key operation correspondence for controlling the brightness and contrast of the display device can be changed from the system side.

A device can be controlled with a key operation independently of processing on the system side by the power supply interface apparatus without degrading the system performance.

According to the fifth aspect of the present invention, there is provided a processing means for invalidating an operation input of an operator operation element such as a power switch or a reset switch as a control object during an execution period of a freeze mode.

According to the sixth aspect of the present invention, there is provided a power supply control apparatus having a dedicated processor, arranged in a portable computer having a resume processing function, and including a power switch for designating an ON/OFF operation of a system power supply and a reset switch for designating system initialization, the power switch and the reset switch being included as monitor objects, comprising means for receiving a specific command (a command representing the freeze mode under execution and a command representing the end of the freeze mode) when a processing unit for executing the resume processing is to be executed in the freeze mode, and monitor processing means for excluding the power switch and the reset switch from the monitor objects to invalidate an operation thereof when the specific command (the command representing the freeze mode under execution) is received from the processing unit.

The processing unit for executing resume processing sends the specific command (i.e, the command representing the freeze mode under execution) for invalidating an input from an operation switch to the power supply control apparatus. Upon reception of the specific command from the processing unit, the power supply control apparatus excludes the power switch and the reset switch from the monitor objects in monitor processing of the control objects and invalidates operations of these switches. Therefore, even if the power switch, the reset switch, or the like is operated during execution of the freeze mode, data can be properly stored.

More specifically, according to the present invention, a battery voltage value and a battery current value are sampled every predetermined period. The count value of a battery level counter for counting the remaining battery level is decremented using the sampled battery current value during discharging and is incremented using the sampled battery current value during charging, thereby updating the count value. The updated count value of the counter and the count values prestored in the fully charged state and the operation limit state are used to calculate a remaining battery level. In addition, this remaining battery level and the sampled battery current value are used to calculate a remaining use time of the battery or a time required to fully charge the battery. At least one of the remaining battery level calculated in accordance with the charge/discharge condition, the remaining use time of the battery, and the time required to fully charge the battery is displayed.

with the above arrangement, the remaining battery level can be accurately calculated in accordance with the degree of degradation of the battery performance. The remaining use time of the battery or the time required to fully charge the battery can be directly displayed during discharging or charging. It is very convenient for the user to check the charge/discharge state of the battery in numerical values.

According to the present invention, there is provided a portable computer having a CPU, a memory, a system bus, various peripheral controllers, and a main display, comprising a sub-display, arranged in the portable computer, for displaying a plurality of icons representing various operating states of the portable computer, a register group which is accessed by the CPU and the peripheral controllers and in which display control data for controlling ON/OFF states of the icons of the sub-display are set by the CPU and the peripheral controller, and an icon display control circuit for ON/OFF-controlling each icon of the sub-display in accordance with the display control data set in the register group.

In this portable computer, the sub-display for displaying the operating conditions of the portable computer is arranged independently of the main display, and various operating states are indicated by the ON/OFF states of the icons on the sub-display. In this case, the display control data for the sub-display are set in the register group by the CPU and other peripheral controllers. The icon display control circuit ON/OFF-controls the icons on the sub-display in accordance with the display control data. In this manner, the state display sub-display is arranged, and display control of the sub-display is performed independently of display control of the main display. Therefore, the current operation mode can be checked without adversely affecting the application program under execution.

According to the seventh aspect of the present invention, there is provided a portable computer having a CPU, a memory, a system bus, various peripheral controllers, and a main display, comprising a sub-display, arranged in the portable computer, for displaying a plurality of icons representing various operating states of the portable computer, a register group which is accessed by the CPU and the peripheral controllers and in which display control data for controlling ON/OFF states of the icons of the sub-display are set by the CPU and the peripheral controller, an icon display control circuit for ON/OFF-controlling each icon of the sub-display in accordance with the display control data set in the register group, key input means for inputting a hot key for designating switching between various operation modes of the portable computer, and hot key transmitting means for transmitting key data of the hot key input from the key input means in accordance with a non-maskable interrupt, wherein the CPU switches the operation mode of the portable computer in response to the hot key data transmitted by the non-maskable interrupt and updates the display control data of the register group so that an operation mode switching result is reflected on the sub-display.

In this portable computer, switching between various operation modes is designated with the hot keys, and the key data from the hot key is transmitted to the CPU through the non-maskable interrupt. For this reason, the interrupt is not masked by the application program under execution. The key data from the hot key can be immediately accepted even during execution of any application program, thereby switching between the operation modes. At this time, the operation mode switching result is also reflected on the sub-display. Therefore, the operation mode can be switched regardless of the application program under execution, and the switching result can be confirmed on the sub-display.

According to the eighth aspect of the present invention, a ROM such as a serial EEPROM which stores card configuration information is mounted on a DRAM card independently of a DRAM, a DRAM power supply is assigned to a plurality of first power supply pins defined as a first power supply voltage, a ROM power supply is assigned to a plurality of second power supply pins defined as a second power supply voltage, and a third power supply voltage required to operate the DRAM and a fourth power supply voltage required to operate the serial EEPROM are independently applied to the first and second power supply pins, respectively.

According to the present invention, some of a plurality of card configuration identification pins (PD pins) of the DRAM card using the serial EEPROM which stores the card configuration information are assigned as communication pins between the serial EEPROM and the system side.

With the above arrangement, the plurality of first power supply pins defined for the first power supply voltage of the DRAM card serve as DRAM power supply pins, and the plurality of second power supply pins defined as the second power supply voltage serve as ROM (serial EEPROM) power supply pins. That is, the power supply pins are not divided for power supply voltages, unlike the conventional case, but are divided for all types of elements applied with power supply voltages through the corresponding power supply pins. That is, the power supply pins are divided into the DRAM power supply pins (first power supply pins) and the ROM (serial EEPROM) power supply pins (second power supply pins).

The first power supply pins are applied with the DRAM operating voltage (third power supply voltage) independently of the power supply voltage (first power supply voltage) defined for these power supply pins. The second power supply pins are applied with the ROM (serial EEPROM) operating voltage (fourth power supply voltage) independently of the power supply voltage (second power supply voltage) defined for these power supply pins.

As described above, the DRAM and ROM (serial EEPROM) mounted on the DRAM card are operated at the independent power supply voltages. Even if these power supply voltages are different from each other, the DRAM card can be used without any trouble. This arrangement is compatible with a future DRAM operated at a lower voltage than the power supply voltage defined for the power supply pins.

When the ROM comprises a serial EEPROM and some of the identification pins (PD pins) are used as communication pins between the DRAM card and the system side, the card configuration information can be exchanged between the card and the system side without providing special input/output pins.

In this case, if the card configuration information includes operating voltage information representing the power supply voltage (third power supply voltage) required to operate the DRAM, and the third power supply voltage representing the operating voltage information in the configuration information is applied to the DRAM through the first power supply pins upon read access of the card configuration information from the serial EEPROM through some of the identification pins, the DRAM can be operated without causing any error or damage. In this case, as the serial EEPROM, a wide-range serial EEPROM operated at a wide-range power supply voltage is used to properly perform read access of the configuration information from the EEPROM.

According to the present invention, there is provided a personal computer capable of transmitting or receiving an electronic mail, comprising a display for displaying at least the presence/absence of a received electronic mail, interrupt generating means for generating an interrupt upon reception of the electronic mail, and interrupt processing means, started in response to the interrupt, for causing the display to perform a state display representing the presence of the received electronic mail when a valid electronic mail is received.

with the above arrangement, for example, when a mail server informs the personal computer of an electronic mail received for this personal computer, the interrupt generating means generates an interrupt to start the interrupt processing means. The interrupt processing means checks in accordance with the status signal received from the mail server if the electronic mail for this personal computer is accurately received. If so, the interrupt processing means calls a basic input/output program to cause the input/output control function to perform a state display representing the presence of the received electronic mail on the display.

Even if the application program is being executed in this personal computer, the user can confirm on the basis of the state display on the display that the electronic mail has been received without performing any special operation. A mail processing means may be started, as needed, to read the electronic mail received by the mail server, thereby displaying the electronic mail and hence confirming the contents of the received mail.

According to the present invention, there is provided a portable computer having a panel opened/closed on a main body and a function of optionally connecting an external display device, comprising a panel switch for detecting the open/closed state of the panel, means for detecting the open/closed state of the panel in accordance with ON/OFF status of the panel switch upon a power-ON operation, and switching means for switching image data to an internal display device or the external display device in accordance with the open/closed state of the panel which is detected by the detecting means, wherein the switching means outputs the image data to only the internal display device when the panel is open, and outputs the image data to both the internal and external display devices when the panel is kept closed.

When the power switch is turned on, the ON/OFF status of the panel switch is read under the BIOS control to determine whether the panel is open or kept closed. If the panel is open, a command is sent to the display controller to output the image data to only the internal display device. Therefore, the display controller outputs the image data stored in the video RAM to only the internal display device.

When the panel is kept closed upon a power-ON operation, a command is sent to the display controller to output the image data to both the internal and external display devices. The display controller then outputs the display data stored in the video RAM to both the internal and external display devices.

As described above, the open/closed state of the panel upon a power-ON operation is detected, and the internal and external display devices can be automatically switched.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the overall system configuration of a portable computer according to an embodiment of the present invention;

FIG. 3 is a block diagram of the extracted hardware arrangement associated with communication between a CPU and a keyboard controller and between the CPU and a power supply controller in the portable computer of the embodiment shown in FIG. 1;

FIG. 5 is a block diagram showing the arrangement of a keyboard interface bus arranged between the keyboard controller and the status LCD control gate array in the portage computer Of the embodiment shown in FIG. 1;

FIGS. 6A through 6C are timing charts of causing the keyboard controller to write data in the status LCD control gate array through the keyboard interface bus shown in FIG. 5;

FIGS. 7A through 7C are timing charts of causing the keyboard controller to read data in the register of the status LCD control gate array through the keyboard interface bus shown in FIG. 5;

FIG. 8 is a block diagram showing the arrangement of a power supply interface bus arranged between the power supply controller and the status LCD control gate array in the portable computer of the embodiment shown in FIG. 1;

FIGS. 9A through 9C are timing charts of causing the power supply controller to write data in the register of the status LCD control gate array through the power supply interface bus,shown in FIG. 8;

FIGS. 10A through 10C are timing charts of causing the power supply controller to read the data in the register of the status I LCD control gate array through the power surface interface bus;

FIG. 11 is a block diagram showing assignment of signals to a plurality of I/O ports of the keyboard controller arranged in the portable computer of the embodiment shown in FIG. 1;

FIG. 12 is the first table showing the functions of signals received and transmitted at the I/O ports of the keyboard controller shown in FIG. 11;

FIG. 13 is the second table showing the functions of signals received and transmitted at the I/O ports of the keyboard controller shown in FIG. 11;

FIG. 14 is a flow chart for explaining a key data transmission operation of the keyboard controller shown in FIG. 11;

FIG. 16 is a flow chart for explaining a key data transmission operation of the keyboard controller in FIG. 11 in use of an external keyboard;

FIG. 17 is a block diagram showing an arrangement of a hardware circuit for executing switching of the speaker volume which is requested in hot processing of the portable computer of the embodiment shown in FIG. 1;

FIGS. 18A through 18C are timing charts for explaining switching of the speaker volume by the circuit in FIG. 17;

FIGS. 19A through 19C show wave forms for explaining brightness and contrast controls of the LCD;

FIG. 20 is a detailed block diagram of a power supply controller for controlling the brightness and contrast of the LCD;

FIG. 21 is a block diagram showing the arrangement of the third embodiment of the present invention;

FIG. 22 is a table showing the register contents of a dedicated register group arranged in the gate array shown in FIG. 4;

FIG. 23 is a table showing the register contents of some registers shown in FIG. 22 and the register addresses;

FIGS. 24A through 24H are formats showing the data structures of the registers shown in FIG. 23;

FIG. 30 is a block diagram showing the circuit arrangement of the sixth embodiment of the present invention;

FIG. 32 is a table showing functions provided in hot key processing of a portable computer according to the seventh embodiment of the present invention;

FIG. 41 is a timing chart showing a state of change in brightness in the brightness down processing of FIG. 40;

FIG. 42 is a flow chart for explaining an operation for realizing an instant security function executed by a CPU arranged in the portable computer of the seventh embodiment;

FIG. 43 is a flow chart for explaining an operation for realizing a power save mode switching function executed by the CPU arranged in the portable computer of the seventh embodiment;

FIG. 44 is a table showing setup states of a CPU clock, a CPU sleep mode, HDD auto OFF, and display auto OFF in each mode switched by the power save mode switching function FIG. 43;

FIG. 49 is a diagram showing a DRAM card and its periphery according to the eighth embodiment of the present invention;

FIGS. 51 and 52 are tables showing the list of signals of the card slot of the eighth embodiment;

FIG. 54 is a block diagram showing the system configuration of a personal computer according to the ninth embodiment;

FIG. 57 is a block diagram showing the system configuration of the tenth embodiment;

DETAILED DESCRIPTION OF THE PREFERRED EMBODIMENTS

Figure 2:
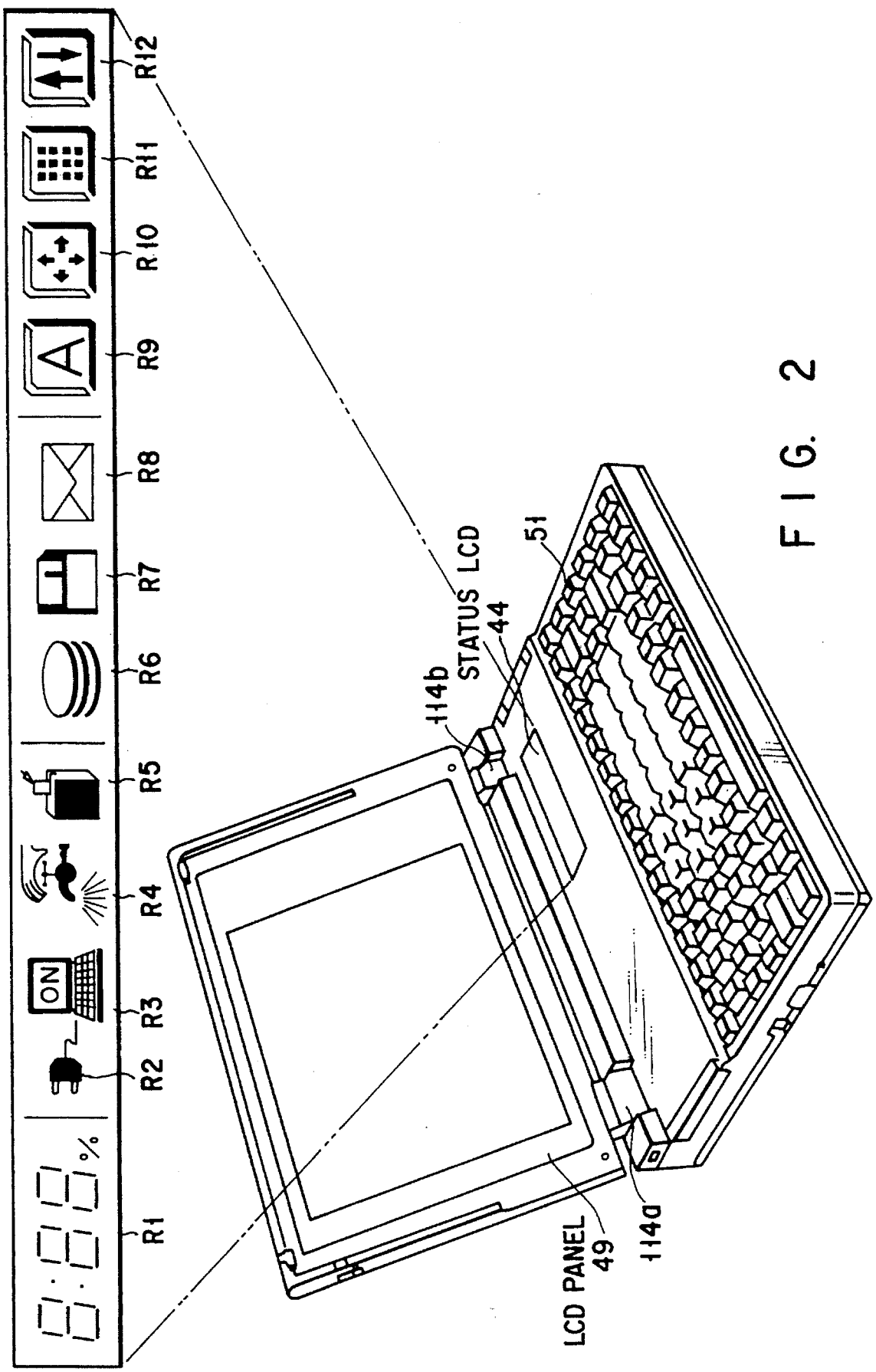
FIG. 2 shows the outer appearance of the portable computer of the embodiment shown in FIG. 1 and a display screen of a status LCD arranged in this portable computer.

Preferred embodiments of the present invention will be described with reference to the accompanying drawings. FIG. 1 shows the system configuration of a portable computer according to an embodiment of the present invention.

This portable computer is a laptop or notebook type personal portable computer and comprises an ISA (Industry Standard Architecture) system bus (ISA-BUS) 11, a high-speed graphic transfer peripheral interface bus (PI-BUS; Peripheral Interface BUS) 12, a keyboard interface bus (KBC-BUS) 13, and a power supply interface bus (PSC-BUS) 14.

A CPU 21 and an I/O controller 22 are connected to the system bus (ISA-BUS) 11. The CPU 21 and the I/O controller 22 comprise a microprocessor 80486SL and a family chip 82360SL which are available from Intel Corp., U.S.A., respectively.

The CPU 21 controls the overall system and executes programs as processing objects stored in a system memory 23. The CPU 21 also has a power management function for low power consumption so as to power down various I/O interfaces in an idle state. The power management function can be executed by interrupt processing called a system management interrupt (SMI). The interrupts of the CPU 21 also include a non-maskable interrupt (NMI) and a maskable interrupt (INTR). An SMI is a kind of non-maskable interrupt and is a hardware interrupt having the highest priority whose level is higher than those of the NMI and INTR. The SMI is started by activating the interrupt request input SMI of the CPU 21. Similarly, interrupt request inputs NMI and INTR (not shown) of the CPU 21 are activated to start the non-maskable interrupt and the maskable interrupt, respectively.

Interrupt processing using an SMI is utilized to execute not only a function of power management but also an expansion function such as hot key processing (to be described later).

The I/O controller 22 is a dedicated logic for realizing the CPU and memory support functions. The I/O controller 22 controls each I/O device connected to a corresponding serial port 41 and an external printer connected to a printer port (EPP; Enhanced Parallel Port) 43. Two interrupt controllers (PICs; Programmable Interrupt Controllers), two timers (PICs; programmable Interval Timers), two serial I/O controllers (SIOs; Serial Input/Output Controllers), and one real time clock (RTC) are incorporated in this I/O controller 22. The real time clock is a timepiece module having its own operating battery. The real time clock has a static CMOS RAM (to be referred to as a CMOS memory hereinafter) always applied with a power supply voltage from this battery. This CMOS memory is used to store setup information representing a system configuration.

Communication between the CPU 21 and the I/O controller 22 is performed through the system bus (ISA-BUS) 11 or a dedicated interface line arranged between the CPU 21 and the I/O controller 22. Interface signals between the CPU 21 and the I/O controller 22 include, e.g., signals for controlling the SMI function of the CPU 21.

An active-low SMI signal is supplied from the I/O controller 22 or a status LCD control gate array (SLCDC GA) 26 to the interrupt request input SMI of the CPU 21 through an AND gate G1. The SMI signal is supplied from the status LCD control gate array (SLCDC GA) 26 to the CPU 21 upon requesting hot key processing and any other special processing for function expansion (both will be described in detail later). The SMI signal from the I/O controller 22 is generated upon detecting necessity of the I/O power-down during time monitoring using the timer.

Each hot key is a key for directly requesting execution of a special function such as a system operation environment setting/change to the CPU 21. Some specific keys on a keyboard 51 are assigned as hot keys. When hot keys are depressed, several functions associated with a system operation environment setup/change provided by the CPU 21 are directly accessed and executed. In this hot key processing, normal key data transmission through the system bus (ISA-BUS) 11 is not performed. An SMI is issued to the CPU 21, and key data of the depressed hot key is sent to the CPU 21 through the keyboard interface bus (KBC-BUS) 13 and the status LCD control gate array (SLCD GA) 26.

The functions of the CPU 21 which can be accessed with the hot keys are an instant security function, a power save mode switching function, a resume/boot mode switching function, an LCD/CRT display switching function, an LCD panel monochrome inverted display function, and the like. These functions are provided by the programs stored in a BIOS-ROM 25 (to be described later). A specific program is executed by the SMI processing program executed by the corresponding SMI. The SMI processing program is stored in a specific memory space (a SM memory space) completely separate from a memory space for executing a normal application program. The CPU 21 is instantaneously switched to a fourth mode C a system management mode) different from any of a real mode, a protect mode, and a virtual 86 mode even if the CPU 21 is in any of the real, protect or virtual 86 mode. As a result, the internal states of the CPU 21 immediately before the SMI is started are automatically saved in a RAM resided in the SM memory space and the SM processing program stored in the SM memory space is started. Upon executing a completion instruction of the SM processing, the CPU 21 automatically restores the internal states stored in the SM memory and returns to a normal operation condition. Due to this, the application program restarts the execution from the immediate state of the SMI. As described above, the SM processing program can be executed independent of the application program. For this reason, even during execution of an application program, the function corresponding to the depressed hot key can be immediately accessed.

Functions accessed with the hot keys also include functions directly executed and controlled by hardware in place of the CPU 21. The functions executed and controlled by the hardware include functions executed by a keyboard controller (KBC) 30 and a power supply controller (PSC) 46 (these two controllers will be described later). The functions provided by the keyboard controller (KBC) 30 are a function of setting an "Arrow" mode for using a key on the keyboard 51 together with an arrow key, a function of setting a "Numeric" mode for using a key on the keyboard 51 together with an arrow key, and a function of setting an "Scroll Lock" mode of the keyboard 51. The functions provided by the power supply controller (PSC) 46 are a function of adjusting the contrast/brightness of an LCD panel 49 and a function of controlling the volume level of a speaker (not shown).

The system memory 23 and an optional DRAM card 24 are connected to the local bus of the CPU 21. The system memory 23 is used as the main memory of this system and stores programs as processing objects and data. The system memory 23 has a standard capacity of 4 Mbytes, and includes the SM memory. The DRAM card 24 is used as an expanded memory of the computer system and is optionally connected to an 88-pin dedicated card slot formed in the computer main body. A 2-, 4-, 8-, or 16-Mbyte DRAM card can be used as the DRAM card 24.

The BIOS-ROM 25 is connected to the system bus (ISA-BUS) 11. The BIOS-ROM 25 stores a basic input/output program (BIOS; Basic I/O System) and is constituted by a flash memory (FLASH MEM) so as to update the programs. The basic input/output program includes an initialization processing program at the time of power-ON operation, driver programs for controlling various input/output devices, and programs for performing processing operations associated with hot key operations.

The status LCD control gate array (SLCDC GA) 26, a floppy disk controller (FDC) 27, a PCMCIA gate array (PCMCIA GA) 28, the keyboard controller (KBC) 30, an expansion connector 31 to which an expansion unit (Desk Station) is detachably mounted, and a hard disk drive (HDD) 42 are connected to the system bus (ISA-BUS) 11.

The status LCD control gate array (SLCDC GA) 26 performs display control of a status LCD 44, communication with the keyboard controller (KBC) 30, and communication with the power supply controller (PSC) 46. In display control of the status LCD 44, the status LCD control gate array (SLCDC GA) 26 causes the status LCD 44 to display a remaining battery operation time and various operation environment states settable/changeable with hot key operations. In this case, the remaining battery operation time is displayed in numeric values, and other operation environment states are displayed with icons. The remaining battery capacity can also be displayed in percentage. Setup information in the CMOS memory is changed to select whether the remaining battery operation time is displayed in numerical values or percentage.

The status LCD 44 is a status display liquid crystal sub-display arranged to display the remaining battery operation time and various operation mode set states. The detailed display contents of the status LCD 44 will be described later with reference to FIG. 2.

Communication between the status LCD control gate array (SLCDC GA) 26 and the keyboard controller (KBC) 30 is performed to exchange various kinds of control information between the CPU 21 and the keyboard controller (KBC) 30 at high speed. The keyboard interface bus (KBC-BUS) 13 is used in this communication. That is, the status LCD control gate array (SLCDC GA) 26 has a register group having a plurality of registers for temporarily storing control information exchanged between the CPU 21 and the keyboard controller (KBC) 30. The keyboard controller (KBC) 30 read/write-accesses the register group through the keyboard interface bus (KBC-BUS) 13, and the CPU read/write-accesses the register group through the system bus 11. The register group includes a register used to supply the SMI signal to the AND gate G1 and a register (Fn status register) for storing hot key data transmitted from the keyboard controller (KBC) 30.

Communication between the status LCD control gate array (SLCDC GA) 26 and the power supply controller (PSC) 46 is performed to exchange various kinds of control information between the CPU 21 and the power supply controller (PSC) 46 at high speed. The power supply interface bus (PSC-BUS) 14 is used in this communication. More specifically, the status LCD control gate array (SLCDC GA) 26 has an I/O register group for temporarily storing control information exchanged between the CPU 21 and the power supply controller (PSC) 46. The power supply controller (PSC) 46 read/write-accesses the corresponding registers through the power supply interface bus (PSC-BUS) 14. The CPU 21 read/write-accesses the register group through the system bus 11.

The communication from the KBC 30 to the PSC 46 is performed in order for the PSC 46 executes the hot key process. In this case, the CPU 21 does not participate in the execution. More specifically, the function of hot key processing by the power supply controller (PSC) 46 is executed by reading key data of the Fn status register of the status LCD control gate array (SLCDC GA) 26 through the power supply interface bus (PSC-BUS) 14.

The floppy disk controller (FDC) 27 controls a two-mode floppy disk drive (FDD) 45 for read/write-accessing 750- and 1.44-Mbyte 3.5" disks. The floppy disk controller (FDC) 27 incorporates a variable frequency oscillator (VFO).

The PCMCIA gate array (PCMCIA GA) 28 performs read/write control of a 68-pin PCMCIA (Personal Computer Memory Card International Association) card mounted in one of PCMCIA slots 48a and 48b and communication with the keyboard controller (KBC) 30. The PCMCIA gate array (PCMCIA GA) 28 also includes an interface logic and a logic for realizing the security function.

Of the two PCMCIA slots 48a and 48b, the slot 48a supports all types of PCMCIA cards, i.e., PCMCIA cards of a 18-mm thick type, a 10.5-mm thick type 3, a 5.0-mm thick type 2, and a 3.3-mm thick type 1. The slot 48b supports two types of PCMCIA cards, i.e., the PCMCIA cards of the 5.0-mm thick type 2 and the 3.3-m thick type 1. A 5.0-mm thick PCMCIA card is also used as a security card. Note that this security card is not directly related to the above described security function. The security card is used for expanding the security function of the system such as encrypting/decrypting data of the HDD and the communication. According to the security function of the PCMCIA gate array (PCMCIA GA) 28, the control of the EEPROM 29 and the permission/inhibition of accesses by various I/O units due to access rights is performed when the KBC 30 collates a password input by a user through the KB 51 with a password stored in the EEPROM 29, and permits the system to be started only if a coincidence is established.

The security function also includes an instant security function. This instant security function is provided to perform processing such as a turn-off operation of the display screen of the LCD panel 49 and a key lock operation of the keyboard 51 in response to predetermined hot key processing commands from the keyboard controller (KBC) 30. When a predetermined password is input by a user with key operations at the keyboard 51, the initial state is restored. At this time, password collation is performed such that the password is read from the EEPROM 29 through the PCMCIA gate array (PCMCIA GA) 28 by the keyboard controller (KBC) 30 and is compared with an input password. The collation result is sent to the CPU 21 in the form of an SMI through the register of the PCMCIA gate array (PCMCIA GA) 28.

The keyboard controller (KBC) 30 controls the standard internal keyboard 51 incorporated in the computer main body. The keyboard controller (KBC) 30 scans the key matrix of the internal keyboard 51 to receive a signal corresponding to a depressed key, and converts the signal into a predetermined key code (scan code). In this case, a key code corresponding to a hot key arranged on the internal keyboard 51 is sent to the LCD control gate array (SLCDC GA) 26 through the keyboard interface bus (KBC-BUS) 13 and is transmitted to the CPU 21 in the form of an SMI. On the other hand, a key code except for the hot key code is normally transmitted to the CPU 21 through the system bus (ISA-BUS) 11 in the form of an INTR. The keyboard controller (KBC) 30 also has functions of controlling an optional mouse 52 and an optional external keyboard 53.

An expansion unit (Desk Station) can be connected to the expansion connector 31. Each expansion board such as a communication board is mounted on the expansion unit to allow function expansion. The hard disk drive (HDD) 42 has an IDE (Integrated Drive Electronics) interface and is directly accessed and controlled by the CPU 21. This hard disk drive (HDD) has a size of 2.5 inches and a storage capacity of 120/200 Mbytes.

A display controller (to be referred to as a VGA controller hereinafter) 32 complying with VGA (Video Graphic Array) specifications is connected to the peripheral interface bus (PI-BUS) 12. The VGA controller 32 controls the display operations of the monochrome gradation or color display LCD panel 49 with back light and a color CRT 50 optionally connected to the main body. The VGA controller 32 receives image data from the CPU 21 through the peripheral interface bus (PI-BUS) 12 and draws an image in an image memory (VRAM) 33. In this case, since the system bus (ISA-BUS) 11 is not used, the system performance is not degraded by image data transfer. The brightness and contrast of the LCD panel 49 are directly adjusted by the PSC 46 in response to hot key operations from the keyboard 51. The CPU 21 and the VGA controller 32 do not participate in this adjustments.

The power supply controller (PSC) 46 and a power supply circuit (PS) 47 are further arranged in this system. The power supply controller (PSC) 46 controls to supply a power supply voltage from the power supply circuit 47 to each unit. Communication with the CPU 21 is performed through the power supply interface bus (PSC-BUS) 14 and the register of the status LCD control gate array (SLCDC GA) 26. The power supply controller (PSC) 46 also performs hot key processing operations such as the brightness/contact adjustment of the LCD panel 49, the speaker volume adjustment, and the like in accordance with the key data input to the Fn status register in the status LCD control gate array (SLCDC GA) 26. In this case, the CPU 21 does not participate in this hot key processing operations. The hot key input from the KB 51 is transmitted to the PSC 46 through the KBC 30, the ISA bus 11. The SLCDCGA 26 and the PSC bus. The PSC 46 executes the process corresponding to the input. The power supply circuit 47 generates an internal power supply voltage of a predetermined voltage value supplied to each unit, using the battery incorporated in the computer main body or an external power supply voltage applied through the AC adapter. Even if the power switch of the computer is turned off, the power supply circuit 47 generates a backup power supply voltage BK and supplies it to each unit.

FIG. 2 shows the outer appearance of this computer and a display screen of the status LCD 44.

As shown in FIG. 2, the keyboard 51 is integrally formed with the computer main body, and the status LCD 44 is also arranged in the computer main body. The LCD panel 49 is mounted on the main body to be pivotal between an open position and a closed position. The status LCD 44 has a display area R1 for displaying numerical values such as a remaining battery use time and 11 icon display areas R2 through R12.

Three digits for displaying the remaining battery capacity are displayed on the display area R1. In this case, the remaining capacity is displayed as a remaining use time in numerical values or percentage. To display time, a mark icon ":" is turned on. To display a value in percentage, a mark icon "%" is turned on. An icon representing AC adapter driving or battery driving is displayed in the icon display area R2. In this case, in AC adapter driving, a jack plug icon is turned on. In battery driving, the jack plug icon is turned off. The R3 in FIG. 2 indicates a power ON state. The icon R3 is turned on and off when the system is powered on and off, respectively. A tap water faucet icon representing the setup state of the battery save mode using the number of water droplets is displayed in the icon display area R4. The battery save modes include three modes (full power mode, economy mode, and low power mode) as combinations of operation modes such as the settings/nonsettings of a CPU clock frequency and a CPU sleep mode and the settings/nonsettings of the display and HDD auto off functions, and a user setting mode in which these operation modes can be arbitrarily set. The power consumption is reduced in an order of the full power mode, the economy mode, and the low power mode. The number of water droplets in the tap water faucet icon is changed in accordance with the magnitude of power consumption. In the full power mode, all the water droplets are ON. The number of ON water droplets is reduced in the order of the economy mode and the low power mode. In the user setting mode, the number of ON water droplets is determined in accordance with the setting state of each operation mode. In the user setting mode, a hand icon shown in FIG. 2 is always set in the ON state. This hand icon is kept off in modes (i.e., the full power mode, the economy mode, and the low power mode) except for the user setting mode. Switching between the full power mode, the economy mode, the low power mode, and the user setting mode is executed by hot key processing provided by the CPU 21.

A book icon shown in FIG. 2 is displayed in the icon display area R5 to indicate the resume or boot mode. In the resume mode, the system statuses are saved in a battery backed-up memory when the system is powered off. When the system is powered on, the system is restored to the state immediately before the system is powered off. In the boot mode, the system is initialized each time it is powered. In this case, the book icon is ON in the resume mode. In the boot mode, the book icon becomes OFF. Switching between the resume and boot modes is executed by hot key processing provided by the CPU 21.

A hard disk icon and a floppy disk icon which are kept on in use of the hard disk and the floppy disk are displayed in the icon display areas R6 and R7, respectively. A mail icon representing a received electronic mail is displayed in the icon display area R8. A letter icon, an arrow icon, a numeric key pad icon, and a scroll icon, which represent a key input mode at the keyboard are displayed on the icon display areas R9, R10, R11, and R12 respectively. In this case, the letter icon in the display area R9 is ON in the capital-letter key input mode. The arrow icon in the display area R10 is ON in the Arrow mode using an overlay arrow key. The numeric key icon in the display area R11 is ON in the Numeric mode using an overlay numeric key. The scroll icon in the display area R12 is displayed in the scroll lock mode. Switching between these key input modes is executed by hot key processing provided by the keyboard controller (KBC) 30.

FIG. 3 shows an extracted hardware arrangement associated with communication between the CPU 21 and the keyboard controller (KBC) 30 an between the CPU 21 and the power supply controller (PSC) 46.

As described above, control information communication between the CPU 21 and the keyboard controller (KBC) 30 is realized such that the CPU 21 read/write-accesses, through the system bus 21, the register group for communication with the keyboard controller (KBC) 30, which is arranged in the status LCD control gate array (SLCDC GA) 26, and that the keyboard controller (KBC) 30 read/write-accesses the register group through the keyboard interface bus (KBC-BUS) 13. In this case, in transfer from the CPU 21 to the keyboard controller (KBC) 30, while the CPU 21 writes control information in the register group through the system bus 11, the keyboard controller (KBC) 30 executes any other processing. When the control information is written in the register group, a request signal is transmitted from the status LCD control gate array (SLCDC GA) 26 to the keyboard controller (KBC) 30. Thereafter, communication is performed between the status LCD control gate array (SLCDC GA) 26 and the keyboard controller (KBC) 30. During this period, the CPU 21 and the system bus 11 are free from this control information transfer. Similarly, in transfer from the keyboard controller (KBC) 30 to the CPU 21, while the keyboard controller (KBC) 30 writes control information in the register group through the keyboard interface bus (KBC-BUS) 13, the CPU 21 and the system bus 11 are free from this control information transfer. When the control information is written in the register group, an SMI signal is transmitted from the status LCD control gate array (SLCDC GA) 26 to the CPU 21, and then communication is performed between the status LCD control gate array (SLCDC GA) 26 and the CPU 21. During this period, the keyboard controller (KBC) 30 is free from this control information transfer.

Even if the number of times of data transfer between the CPU 21 and the keyboard controller (KBC) 30 is increased, an increase in time which occupies the system bus 11 and the CPU 21 in data transfer is small. Therefore, special functions associated with system function expansion such as a hot key function and a security function can be provided to the keyboard controller (KBC) 30.

Control information communication between the CPU 21 and the power supply controller (PSC) 46 is realized such that the CPU 21 read/write-accesses, through the system bus 21, the register group for the power supply controller (PSC) 46, which is arranged in the status LCD control gate array (SLCDC GA) 26, and that the power supply controller (PSC) 46 read/write-accesses the register group through the power supply interface bus (PSC-BUS) 14. In this case, as in communication between the CPU 21 and the keyboard controller (KBC) 30, in transfer from the CPU 21 to the power supply controller (PSC) 46, a request signal is transmitted to the power supply controller (PSC) 46. In transfer from the power supply controller (PSC) 46 to the CPU 21, an SMI signal is transmitted to the CPU 21.

Communication between the CPU 21 and the keyboard controller (KBC) 30 will be exemplified by transmission of hot key data.

Transmission of hot key data is performed using an SMI transmission register 102 and an Fn status register 101 which is assigned as a hot key register in the register group for communication with the keyboard controller (KBC) 30.

As described above, the hot key processing is started upon operation of a specific key assigned as a hot key on the keyboard 51. Several hot key processing operations defined for specific keys can be selectively called by simultaneously depressing the [Fn] key and the specific keys such as [F1], [F2], . . .

When the [Fn] and any specific key are simultaneously depressed, the keyboard controller (KBC) 30 writes key data in the Fn status register 101 in the status LCD control gate array (SLCDC GA) 26 through the keyboard interface bus (KBC-BUS) 13 and writes SMI issuance data "1" in bit 7 of the SMI transmission register 102 so as to inform the CPU 21 of this hot key data. The key data set in the Fn status register 101 comprises the scan code (make code/break code) of the key simultaneously depressed together with the [Fn] key.

When data "1" is set in bit 7 of the SMI transmission register 102, an SMI signal of low level is generated by the status LCD control gate array (SLCDC GA) 26 and is supplied to the CPU 21 through the AND gate G1.

The CPU 21 starts the SMI processing program overlaid in the memory 23 in response to the SMI signal and performs the following operations.

The CPU 21 read-accesses the Fn status register 101 in the status LCD control gate array (SLCDC GA) 26 to determine whether the SMI signal represents a hot key operation. If the key data is set in the Fn status register 101, the CPU 21 detects that the SMI represents the hot key processing. The CPU 21 performs a hot key function such as instant security mode switching, battery save mode switching, switching between the resume and boot modes, switching between LCD and CRT display modes, and monochrome inverted display switching, or the like, in accordance with the contents of the key data.

In this case, when a function required to change the icon in the status LCD 44 is to be performed, i.e., battery save mode switching or switching between the resume and boot modes is to be executed, the CPU 21 writes control data in an icon display control register in the status LCD control gate array (SLCDC GA) 26 and controls the icon ON/OFF states to states corresponding to the contents of the mode switching.

If the function of hot key processing designated by the [Fn] and a specific key is a keyboard overlay function or a scroll lock function, the keyboard controller (KBC) 30 directly accesses the icon display control register in the SLCDC GA 26. At this time, the SMI is not generated.

On the other hand, the power supply controller (PSC) 46 also communicates with the status LCD control gate array (SLCDC GA) 26 through the power supply interface bus (PSC-BUS) 14 to perform polling to read the contents of the Fn status register 101. If the key data set in the Fn status register 101 is speaker volume change data or the brightness/contrast adjustment data of the LCD panel 49, the power supply controller (PSC) 46 performs the corresponding processing. In this case, the SMI is generated with respect to the CPU 21 but the CPU 21 does not perform any processing and returns from the hot key processing routine to the main routine.

When the power supply controller (PSC) 46 detects the ON/OFF state of a power switch of the computer, the attached/detached state of the AC adapter, or the low battery state, the power supply controller (PSC) 46 writes detection information in a predetermined register of the status LCD control gate array (SLCDC GA) 26 through the power supply interface bus (PSC-BUS) 14 so as to inform the CPU 21 of the detection information. At this time, as in the hot key processing, an SMI signal is generated by the CPU 21 to start the SM process of the CPU 21.

The detailed arrangement of the status LCD control gate array (SLCDC GA) 26 will be described with reference to FIG. 4.

Figure 4:
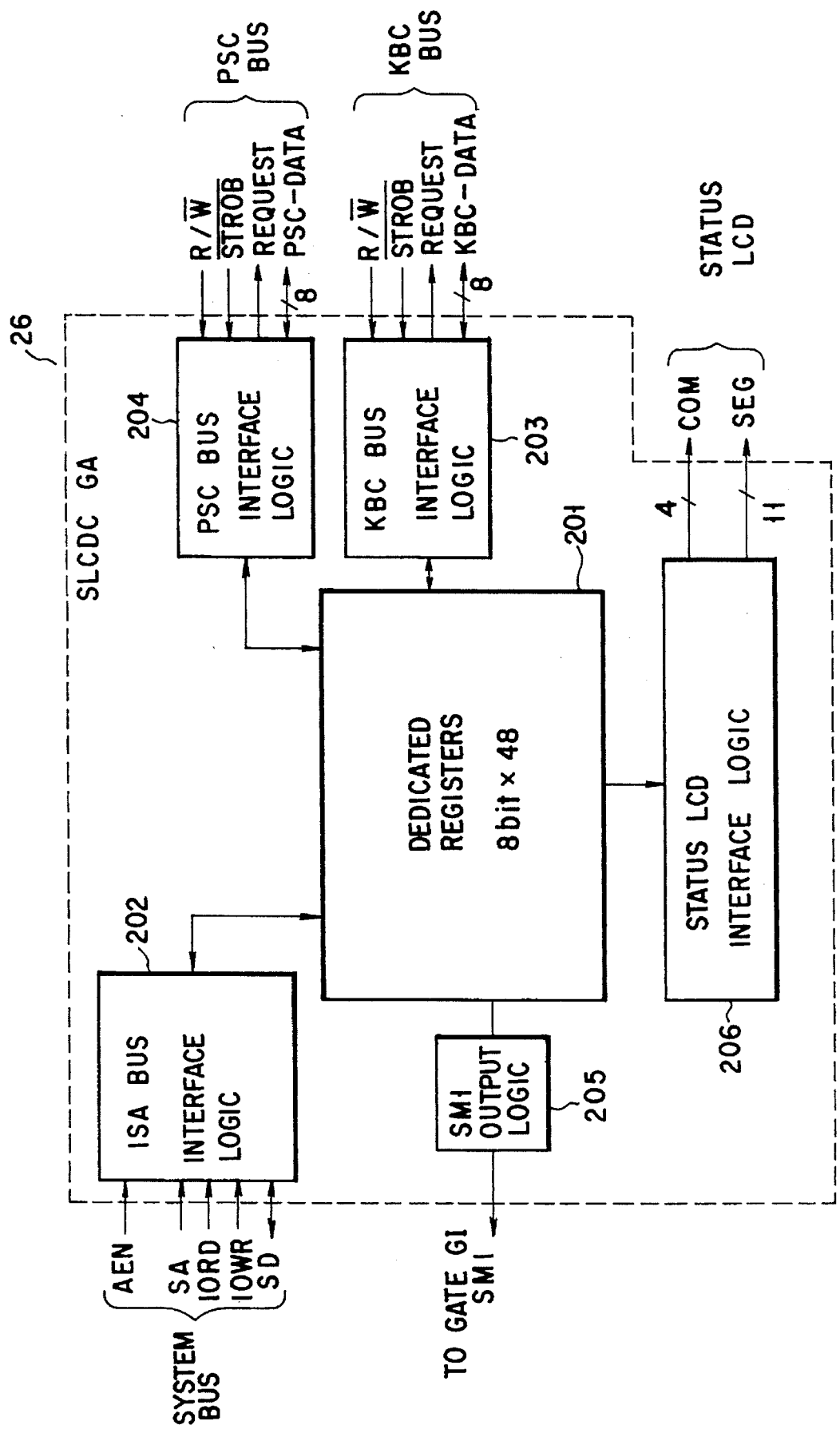
FIG. 4 is a block diagram showing a detailed arrangement of a status LCD control gate array arranged in the portable computer of the embodiment shown in FIG. 1.

As shown in FIG. 4, the status LCD control gate array (SLCDC GA) 26 comprises dedicated registers 201, an ISA-BUS interface logic 202 connected to the system bus (ISA-BUS) 11, a KBC-BUS interface logic 203 connected to the keyboard interface bus (KBC-BUS) 13, a PSC-BUS interface logic 204 connected to the power supply interface bus (PSC-BUS) 14, an SMI output logic 205 for outputting an SMI signal to the AND gate G1, and a status LCD interface logic 206 for controlling the status LCD 44.

The dedicated registers 201 comprise 48 8-bit registers and include a communication register group for communication with the keyboard controller (KBC) 30, a communication register group for communication with the power supply controller (PSC) 46, and a display control register for the status LCD 44. Different addresses are assigned to these registers.

The ISA-BUS interface logic 202 controls to interface with the system bus (ISA-BUS) 11. The ISA-BUS interface logic 22 uses an address enable signal (AEN), an address signal (SA), an I/O read signal (IORD), an I/O write signal (IOWR), and 8-bit data of the system data bus (SD), all of which are supplied from the CPU 21 through the system bus 11, so as to control the read and write operations of the dedicated registers 201 in accordance with a request from the CPU 21. In this case, a specific register to be actually accessed is determined by decoding the address signal (SA).

The KBC-BUS interface logic 203 uses a read/write signal R/W, a strobe signal (STROB), and the address/data of an 8-bit KBC data line (KBC-DATA) of the keyboard interface bus (KBC-BUS), all of which are supplied through the keyboard interface bus (KBC-BUS), so as to control the read and write operations of the dedicated registers 201 in accordance with a request from the keyboard controller (KBC) 30. The KBC-BUS interface logic 203 is connected to a predetermined bit position of a predetermined register used in communication with the keyboard controller (KBC) 30. A request signal (REQUEST) is output to the keyboard controller (KBC) 30 in response to data "1" set at this bit position by the CPU 21. This request signal (REQUEST) is used to cause the keyboard controller (KBC) 30 to read out the data contents of the register set by the CPU 21. An actual communication sequence between the keyboard controller (KBC) 30 and the status LCD control gate array (SLCDC GA) 26, using this interface signal, will be described with reference to FIGS. 5 through 7 later.

The PSC-BUS interface logic 204 uses a read/write signal R/W, a strobe signal (STROB), and the address/data of an 8-bit PSC data line (PSC-DATA) of the power supply interface bus (PSC-BUS), all of which are supplied through the power supply interface bus (PSC-BUS) 14, so as to control the read and write operations of the dedicated registers 201 in accordance with a request from the power supply controller (PSC) 46. The PSC-BUS interface logic 204 is connected to a predetermined bit position of a predetermined register used in communication with the power supply controller (PSC) 46. A request signal (REQUEST) is output to the power supply controller (PSC) 46 in response to data "1" set at this bit position by the CPU 21. An actual communication sequence between the power supply controller (PSC) 46 and the status LCD control gate array (SLCDC GA) 26, using this interface signal, will be described with reference to FIGS. 8 through 10 later.

The SMI output logic 205 is connected to bit 7 of the SMI transmission register 102 arranged in the register group for communication with the keyboard controller (KBC) 30 and bit 7 of the SMI transmission register arranged in the register group for communication with the power supply controller (PSC) 46. When data "1" is set in one of both bits 7, the SMI output logic 205 outputs an SMI signal of low level. This SMI signal is supplied to the SMI input of the CPU 21 through the AND gate G1.

The status LCD interface logic 206 is arranged to control the status LCD 44 in accordance with the contents of the display control register group arranged in the dedicated registers 201. The status LCD interface logic 206 controls the status LCD 44 in accordance with a combination of four common signals and 11 segment signals. In this case, the digits and the icon (44 icons in total) ON/OFF states of the respective display areas of the status LCD 44 are determined in accordance with the contents ("1"/"0") of the display control data set in the corresponding registers. The display control data are set in the display control register group by the CPU 21, the keyboard controller (KBC) 30, and the power supply controller (PSC) 46. The display control data set by the CPU 21 are data for designating the ON/OFF states of the tap water faucet icon in the display area R4, the book icon in the display area R5, the hard disk icon in the display area R6, the floppy disk icon in the display area R7, and the mail icon in the display area R8 in the status LCD 44, as shown in FIG. 2. The hard disk icon and the floppy disk icon in the display areas R6 and R7 are turned on or off not by the CPU 21 but directly by the signals from the HDD 42 and FDC 27. The display control data set by the keyboard controller (KBC) 30 are data for designating the ON/OFF states of the icons in the display areas R9 through R12 in the status LCD 44. The display control data set by the power supply controller (PSC) 46 are data for designating the ON/OFF states of the three digits in the display area R1, the power supply icon in the display area R2, and the power icon in the display area R3.

The communication sequence between the keyboard controller (KBC) 30 and the status LCD control gate array (SLCDC GA) 26, using the keyboard interface bus (KBC-BUS) 13 will be described with reference to FIGS. 5 through 7.

FIG. 5 shows an interface between the keyboard controller (KBC) 30 and the status LCD control gate array (SLCDC GA) 26. As shown in FIG. 5, the keyboard interface bus (KBC-BUS) 13 comprises a total of 11 lines, i.e., eight KBC data lines (KBC-DATA), a read/write signal (R/$\overline{W}$) line 132, a strobe signal ($\overline{STROB}$) line 133, and a request signal (REQUEST) LINE 134. The eight KBC data lines (KBC-DATA) 131 are also used to transmit an address. Eight of the 11 scan lines are used as the KBC data lines (KBC-DATA) 131.

More specifically, the 11 scan lines are connected to the scan-out I/O ports of the keyboard controller (KBC) 30 to transmit, to the keyboard 51, a scan signal for scanning the key matrix of the keyboard 51. Eight return lines are connected to the scan-in I/O ports of the keyboard controller (KBC) 30 to receive a return signal from the keyboard 51. Eight of the 11 scan-out I/O ports are also connected to the KBC data lines (KBC-DATA) 131 and are used to transmit or receive data to or from the status LCD control gate array (SLCDC GA) 26. In this case, during data exchange with the status LCD control gate array (SLCDC GA) 26, a signal on the return line is invalidated by the control logic in the keyboard controller (KBC) 30, and no conversion into a scan code is performed.

In this manner, according to this embodiment, eight of the 11 scan lines are used as the data lines of the keyboard interface bus (KBC-BUS) 13 to reduce the number of I/O port terminals of the keyboard controller (KBC) 30. In this manner, the I/O ports are commonly used by the scan lines and the KBC data lines (KBC-DATA) 131, so that a state-of-the-art keyboard controller chip can be used by simply changing a program.

FIGS. 6A through 6C are timing charts of causing the keyboard controller (KBC) 30 to write data in the register in the status LCD control gate array (SLCDC GA) 26.

As shown in FIGS. 6A through 6C, since the keyboard controller (KBC) 30 normally transmits a scan signal to the keyboard 51, the scan signal can be transmitted onto the KBC data lines (KBC-DATA) 131 except for a communication period with the status LCD control gate array (SLCDC GA) 26. To write data in the register of the status LCD control gate array (SLCDC GA) 26, an address for designating the register is output from the keyboard controller (KBC) 30 onto the KBC data lines (KBC-DATA) 131, and then write data is output onto the KBC data lines (KBC-DATA) 131. During the period in which the address or data appears on these data lines, a return signal from the keyboard 51 is invalidated. The read/write signal (R/$\overline{W}$) from the keyboard controller (KBC) 30 is kept at low level.

When the strobe signal ($\overline{STROB}$) from the keyboard controller (KBC) 30 rises, the address on the KBC data lines (KBC-DATA) 131 is fetched by the status LCD control gate array (SLCDC GA) 26, and the register designated by this address is selected when the strobe signal ($\overline{STROB}$) rises, the current data on the KBC data lines (KBC-DATA) 131 is written in the selected register.

By this write operation, for example, the hot key data and data are respectively written in the Fn status register 101 and the SMI transmission register 102.

FIGS. 7A through 7C are timing charts of causing the keyboard controller (KBC) 30 to read data from the register of the status LCD control gate array (SLCDC GA) 26.

To read data from the register of the status LCD control gate array (SLCDC GA) 26, an address for designating the register is output from the keyboard controller (KBC) 30 onto the KBC data lines (KBC-DATA) 131. When the strobe signal ($\overline{STROB}$) from the keyboard controller (KBC) 30 falls, the address on the KBC data lines (KBC-DATA) 131 is fetched by the status LCD control gate array (SLCDC GA) 26. Then, the KBC 30 switches the KBC data line from the output state to the input state. When the read/write signal (R/$\overline{W}$) from the keyboard controller (KBC) 30 goes high, the read operation of the register designated by the address is executed, and read data is output from the status LCD control gate array (SLCDC GA) 26 onto the KBC data lines (KBC-DATA) 131. When the read data on the KBC data lines (KBC-DATA) is fetched by the keyboard controller 30, the strobe signal ($\overline{STROB}$) goes high and finally the read/write signal (R/$\overline{W}$) goes low. As a result, the read data output from the SLCD GA 26 is ceased.

This read operation is executed when, for example, control information from the CPU 21 is transmitted as a command to the keyboard controller (KBC) 30. In this case, the read operation is performed in response to the request signal (REQUEST) from the status LCD control gate array (SLCDC GA) 26.

A plurality of communication registers are prepared in the status LCD control gate array (SLCDC GA) for communication with the keyboard controller (KBC) 30. Once control information is set in such a register by the CPU 21, the above-mentioned read operation can be repeated to continuously read out a plurality of control information by the keyboard controller (KBC) 30. In this case, only the dedicated keyboard interface bus (KBC-BUS) 13 is used in communication between the status LCD control gate array (SLCDC GA) 26 and the keyboard controller (KBC) 30. The system bus (ISA-BUS) is not used, so that many kinds of control information can be transmitted to the keyboard controller (KBC) 30 without adversely affecting the system performance as a whole.

Control information transmitted from the CPU 21 to the keyboard controller (KBC) 30 is exemplified by hot key definition information or the like for assigning a specific key on the external keyboard 53 as a hot key. That is, although each hot key is defined by the "Fn+(any key)" in use of the internal keyboard 51, the external keyboard 53 does not have a special key such as the [Fn] key, and a combination of several keys on the external keyboard 53 must be used in place of the [Fn] key. In this case, a key pattern represented by a combination of several keys is transmitted from the CPU 21 to the keyboard controller (KBC) 30 as the hot key definition information. Transmission of the hot key definition information to the keyboard controller (KBC) 30 is performed in, e.g., in the initialization routine by the CPU 21 upon power-ON operation. Details of transmission processing of the hot key definition information to the keyboard controller (KBC) 30 will be described with reference to FIG. 16.

A communication sequence between the power supply controller (PSC) 46 and the status LCD control gate array (SLCDC GA) 26, using the power supply interface bus (PSC-BUS) 14, will be described with reference to FIGS. 8 through 10.

FIG. 8 shows the interface between the power supply controller (PSC) 46 and the status LCD control gate array (SLCDC GA) 26. As shown in FIG. 8, the power supply interface bus (PSC-DATA) 14 comprises a total of 11 lines, i.e., eight PSC data lines (PSC-DATA) 141, a read/write signal (R/W) line 142, a strobe signal (STROB) line 143, and a request signal (REQUEST) LINE 144. In this case, the eight PSC data lines (PSC-DATA) 141 are used to receive and transmit both data and an address.

FIGS. 9A through 9C are timing charts of causing the power supply controller (PSC) 46 to write data in the register in the status LCD control gate array (SLCDC GA) 26.

As shown in FIGS. 9A through 9C, to write data in the register of the status LCD control gate array (SLCDC GA) 26, an address for designating the register is output from the power supply controller (PSC) 46 to the PSC data lines (PSC-DATA) 141, and then write data is output onto the PSC data lines (PSC-DATA) 141. The read/write signal (R/W) from the power supply controller (PSC) 46 is kept low.

When the strobe signal (STROB) from the power supply controller (PSC) 46 falls, the address on the PSC data lines (PSC-DATA) 141 is fetched by the status LCD control gate array (SLCDC GA) 26, and the register designated by this address is selected. When the strobe signal (STROB) rises, the current data on the PSC data lines (PSC-DATA) 141 is written in the selected register.

By this write operation, for example, power switch ON/OFF detection information, AC adapter attachment/detachment detection information, low battery state detection information, and the like can be written.

FIGS. 10A through 10C are timing charts for causing the power supply controller (PSC) 46 to read data from the register of the status LCD control gate array (SLCDC GA) 26.

To read data from the register of the status LCD control gate array (SLCDC GA) 26, an address for designating the register is output from the power supply controller (PSC) 46 onto the PSC data lines (PSC-DATA) 141. When the strobe signal (STROB) from the power supply controller (PSC) 46 falls, the address on the PSC data lines (PSC-DATA) 141 is fetched by the status LCD control gate array (SLCDC GA) 26. The PSC 46 switches the PSC-DATA 141 in the input state. When the read/write signal (R/W) from the power supply controller (PSC) 46 goes high, the read operation of the register designated by the address is executed, and read data is output from the status LCD control gate array (SLCDC GA) 26 onto the PSC data lines (PSC-DATA) 141. When the read data on the PSC data lines (PSC-DATA) is fetched by the power supply controller 46, the strobe signal (STROB) goes high and finally the read/write signal (R/W) goes low. As a result, the read data output from the SLCD GA 26 is ceased.

This read operation is executed when, for example, control information from the CPU 21 is transmitted as a command to the power supply controller (PSC) 46. In this case, the read operation is performed in response to the request signal (REQUEST) from the status LCD control gate array (SLCDC GA) 26.

A plurality of communication registers are prepared in the status LCD control gate array (SLCDC GA) for communication with the power supply controller (PSC) 46. Once control information is set in these registers by the CPU 21, the above-mentioned read operation can be repeated to continuously read out a plurality of control information by the power supply controller (PSC) 46. In this case, only the dedicated power supply interface bus (PSC-BUS) 14 is used in communication between the status LCD control gate array (SLCDC GA) 26 and the power supply controller (PSC) 46. The system bus (ISA-BUS) 11 is not used, so that many kinds of control information can be transmitted to the power supply controller (PSC) 46 without adversely affecting the system performance as a whole.

A detailed arrangement of the keyboard controller (KBC) 30 will be described with reference to FIGS. 11 through 13.

FIG. 11 shows states of signal assignment to the plurality of I/O ports of the keyboard controller (KBC) 30. FIGS. 12 and 13 describe the functions of signals received at or transmitted from these I/O ports.

The keyboard controller (KBC) 30 comprises a one-chip microcomputer including a CPU, a ROM, a RAM, and a plurality of I/O ports. As shown in FIG. 11, these I/O ports are assigned to interface with the system bus (ISA-BUS) 11, the status LCD control gate array (SLCDC GA) 26, the internal keyboard 51, the mouse 52, the external keyboard 53, and a numeric key pad 54, as shown in FIGS. 12 and 13.

As can be apparent from FIGS. 12 and 13, to interface with the system bus (ISA-BUS), eight ports DB0 through DB7, a reset signal input terminal (R), an I/O write signal input terminal (WR), an I/O read signal input terminal (RE), a chip select signal input terminal (CS), an address input terminal (C/D) for receiving the lower third bit (SA02) of a system address signal, and clock input terminals (X1 and X2) are used. The eight ports DB0 through DB7 are used to exchange data between an 8-bit register in the keyboard controller (KBC) 30 and the CPU 21 and are connected to the lower eight bits (SD7–SD0) of the 16-bit data bus of the system bus (ISA-BUS) 11.

To interface with the internal keyboard 51, ports P00 through P07, P30 through P32, and P40 through P47 are utilized. Of these ports, the ports P00 through P07 and P30 through P32 are connected to the 11 scan lines of the internal keyboard 51, respectively. The ports P40 through P47 are connected to the eight return lines of the internal keyboard 51, respectively. Of the ports P00 through P07 and P30 through P32, the eight ports P00 through P07 are also used in communication with the status LCD control gate array (SLCDC GA) 26. The ports P00 through P07 are also connected to the eight bit data lines of the keyboard interface bus (KBC-BUS) 13, as described with reference to FIG. 5. To interface with the status LCD control gate array (SLCDC GA) 26, in addition to the ports P00 through P07, ports P60 through P62 are also used. The ports P60 and P61 are used to transmit the read/write signal (R/W) and the strobe signal (STROB) to the status LCD control gate array (SLCDC GA) 26. The port P62 is used to receive the request signal (REQUEST) from the status LCD control gate array (SLCDC GA) 26. To interface with the external keyboard 53, ports P26 and P27 are used. The ports P26 and P27 are used to exchange data and a clock with the scan code controller incorporated in the external keyboard 53.

The keyboard controller (KBC) 30 has two types of ports to communicate with the CPU 21. One type of port is a port for communicating with the CPU 21 through the system bus (ISA-BUS) 11, and the other type of bus is a port for communicating with the CPU 21 through the keyboard interface bus (KBC-BUS) 13 and the status LCD control gate array (SLCDC GA) 26.

In this case, the port for communicating with the CPU 21 through the system bus (ISA-BUS) 11 is used to exchange existing commands associated with keyboard control and the like required in execution of an application program or the like and to transmit normal key data to transfer it to the application program or the like. On the other hand, the port for communicating with the CPU 21 through the keyboard interface bus (KBC-BUS) 13 and the status LCD control gate array (SLCDC GA) 26 is used for expansion function provided to the this computer, i.e., exchange of commands associated with execution of hot key processing and the security function and to transmit hot key data.

In this manner, the keyboard controller (KBC) 30 is arranged to exchange the existing command used in the application program or the like and other commands added for function expansion through different command path routes. For this reason, execution of a special function is requested while a command from the application program is set in the I/O register for communication with the system bus, which is arranged in the keyboard controller (KBC) 30, the command for executing the requested special function can be exchanged without temporarily saving the contents of this I/O register. The expansion function can be efficiently performed without adversely affecting execution of the application program while maintaining compatibility with a conventional system.

FIG. 14 is a flow chart for key data transmission processing by the keyboard controller (KBC) 30.

In key data transmission, the keyboard controller (KBC) 30 determines whether the depressed key of the internal keyboard 51 is a hot key (i.e., Fn+(any other key)) (step S11). This determination can be performed such that a scan code corresponding to the depressed key is compared with that of the Fn key to determine whether a coincidence is established.

If the depressed key is a hot key, the keyboard controller (KBC) 30 transmits key data from the ports P00 through P07 connected to the keyboard interface bus (KBC-BUS) 13 to the status LCD control gate array (SLCDC GA) 26 (step S12). In this case, the key data to be transmitted represents a scan code of a key simultaneously depressed with the Fn key (the depression period is represented by a make code, and the key release is represented by a break code). This scan code is set in the Fn status register 101 in the status LCD control gate array (SLCDC GA) 26. In step S12 of key data transmission, the keyboard controller (KBC) 30 sets data "1" in bit 7 of the SMI transmission register 102 of the status LCD control gate array (SLCDC GA) 26 so as to issue an SMI signal.

On the other hand, when the depressed key is determined as a key other than a hot key, the keyboard controller (KBC) 30 transmits key data from the ports DB0 through DB7 connected to the system bus (ISA-BUS) 11 (step S13). In this data transmission processing, the key data is set in the register in the keyboard controller (KBC) 30 to communicate with the system bus (ISA-BUS) 11, and a key input interrupt signal IRQ1 is generated from the port 24. This key input interrupt signal IRQ1 is supplied as a maskable interrupt to the CPU 21 through the I/O controller 21.

Figure 15:
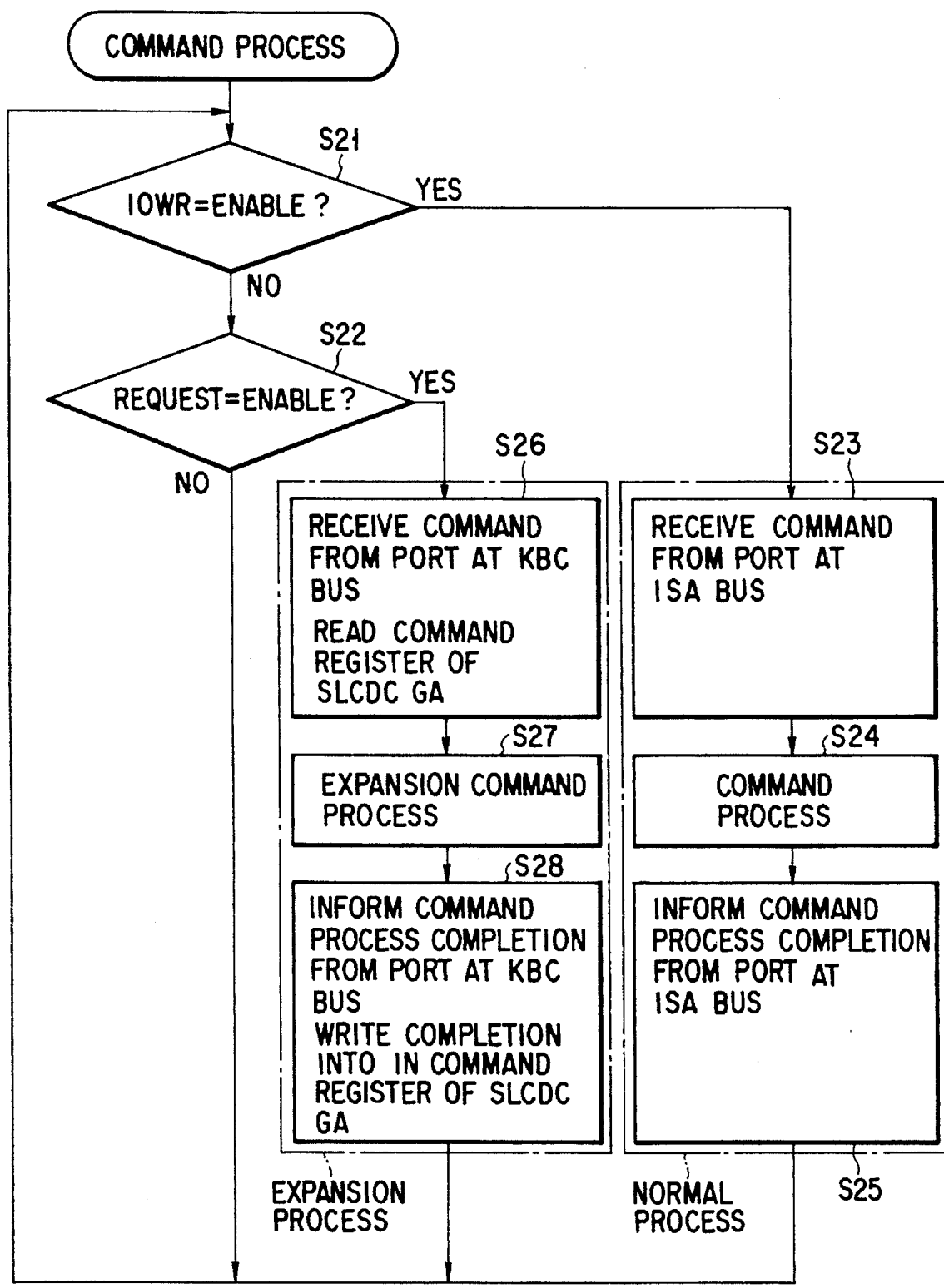
FIG. 15 is a flow chart for explaining a command processing operation of the keyboard controller shown in FIG. 11.

FIG. 15 is a flow chart showing command processing by the keyboard controller (KBC) 30.

The command processing functions of the keyboard controller (KBC) 30 are roughly classified into an existing command processing function released to the application program or the like and any other expansion command processing function. The existing command processing function is used to perform normal key input control such as repetition speed control. The expansion command processing function is used to realize the hot key function and the security function. In this expansion command processing, for example, password collation processing upon power-ON operation, password collation processing in the instant security mode, registration processing of hot key definition information from the external keyboard, and the like are performed.

The existing command processing function for the normal key input control or the like is executed in response to a command received from the CPU 21 through the ports DB0 through DB7 connected to the system bus (ISA-BUS) 11. The command processing result is also informed to the CPU 21 through the system bus (ISA-BUS) 11. The expansion command processing function such as password collation processing and the hot key definition information registration processing is performed in response to a command received from the CPU 21 through the ports P00 through P07 connected to the keyboard interface bus (KBC-BUS) 13. The command processing result is also informed to the CPU 21 through the keyboard interface bus (KBC-BUS) 13.

The normal command processing and the expansion command processing have different execution functions, a command reception processing form, and a processing result informing processing form. For this reason, command processing by the keyboard controller (KBC) 30 is executed as follows.

That is, the keyboard controller (KBC) 30 determines whether a command is a command supplied through the system bus (ISA-BUS) 11 or a command supplied through the keyboard interface bus (KBC-BUS) 13. This determination is performed by determining whether the I/O write signal (IOWR) supplied to the port WR or the request signal supplied to the port P62 is enabled (steps S21 and S22).

When the I/O signal (IOWR) is enabled, the current command is supplied through the system bus (ISA-BUS) 11, and a normal processing routine constituted by steps S23 through S25 is executed. In this case, the keyboard controller (KBC) 30 receives a command from the ports DB0 through DB7 connected to the system bus (ISA-BUS) 11 (step S23). The keyboard controller (KBC) 30 performs command processing for normal key input control such as repetition speed control requested from the application program or the like in accordance with the received command (step S24). When the command processing is completed, the keyboard controller (KBC) 30 sets data representing the processing result or the end of processing in the I/O register for communication with the system bus (ISA-BUS) 11. This data is transmitted from the ports DB0 through DB7 to the CPU 21 (step S25).

On the other hand, when the request signal (REQUEST) is enabled, the current command is supplied through the keyboard interface bus (KBC-BUS) 13. An expansion processing routine constituted by steps S26 through S28 is executed. In this case, the keyboard controller (KBC) 30 receives the command from the ports P00 through P07 connected to the keyboard interface bus (KBC-BUS) 13 (step S26). This reception processing is performed such that the keyboard controller (KBC) 30 read-accesses a predetermined register in the status LCD control gate array (SLCDC GA) 26 in response to the request signal (REQUEST). The keyboard controller (KBC) 30 performs expansion command processing in accordance with the received command (step S27). When this command processing is completed, the keyboard controller (KBC) 30 writes data representing the processing result or the end of processing in a predetermined register in the status LCD control gate array (SLCDC GA) 26 from the ports P00 through P07 so as to inform the CPU 21 of the processing result or the end of processing (step S28).

In this manner, the keyboard controller (KBC) 30 does not use the system bus (ISA-BUS) 11 but uses the keyboard interface bus (KBC-BUS) 13 to receive the expansion processing command and transmit the processing result. For this reason, the hot key processing and any other expansion processing can be performed using the keyboard controller (KBC) 30 without prolonging the time occupying the system bus (ISA-BUS) 11. Therefore, the performance of the computer system as a whole can be improved.

Hot key definition registration processing will be exemplified as expansion command processing.

Since the external keyboard 53 does not have the [Fn] key, a hot key function must be realized by a combination of keys. When a hot key is assigned to a specific key of the external keyboard 53, key assignment may overlap depending on application programs to be executed. In this computer, a hot key pattern in use of the external keyboard is freely selected by a user in a combination of a maximum of three keys. This hot key pattern can be designated by, e.g., starting a setup program. The designated key pattern is stored in the CMOS memory of the real time clock (RTC) in the I/O controller 22 described with reference to FIG. 1.

In the initialization routine executed when the power switch is turned on, the CPU 21 executes initial settings of various types of controllers in accordance with the system configuration information stored in the CMOS memory. To initialize the keyboard controller (KBC) 30, a hot key definition information registration processing command and the key pattern of a hot key stored in the CMOS memory are set from the CPU 21 into the corresponding registers in the status LCD control gate array (SLCDC GA) 26. A request signal (REQUEST) is supplied from the status LCD control gate array (SLCDC GA) 26 to the keyboard controller (KBC) 30.

In response to the request signal (REQUEST), the keyboard controller (KBC) 30 read-accesses the predetermined register in the status LCD control gate array (SLCDC GA) 26. If the readout data represents a hot key definition information registration command, the key pattern of the hot key is read from the register of the status LCD control gate array (SLCDC GA) 26 and is registered in the internal RAM or the like. In this manner, the hot key pattern designated by the user is registered as the hot key definition information in the keyboard controller (KBC) 30.

This hot key pattern is used only when the external keyboard 53 is used. When the internal keyboard 51 is used, the Fn key is used. The external keyboard 53 is optionally attached to the computer main body by the user, as needed. The attachment/detachment of the external keyboard 53 is detected by the keyboard controller (KBC) 30 in initialization. This detection operation is performed using known techniques as follows. For example, the clock and data are transmitted to the ports P26 and P27 connected to the external keyboard 53 to check a response from the external keyboard 53. Alternatively, a decrease in voltage of the connector connected to the external keyboard 53 is checked.

When the power switch is turned on while the external keyboard 53 is attached, only a key input from the external keyboard 53 is accepted, and any key input from the internal keyboard 51 is invalidated.

The actual key data transmission processing by the keyboard controller (KBC) 30 is shown in FIG. 16.

More specifically, in key data transmission, the keyboard controller (KBC) 30 checks the present/absence of the external keyboard 53 (step S31). This can be checked by referring to the presence/absence information of the external keyboard 53 detected during, e.g., initialization. When the external keyboard 53 is not attached to the main body, the scan code corresponding to the depressed key is compared with that of the Fn key, as described with reference to FIG. 14 to determine whether the depressed key is a hot key (Fn+(any other key)) (step S32). If the depressed key is the hot key, the keyboard controller (KBC) 30 transmits the key data from the ports P00 through P07 connected to the keyboard interface bus (KBC-BUS) 13 to the status LCD control gate array (SLCDC GA) 26 (step S34). If the depressed key is a key other than the hot key, the keyboard controller (KBC) 30 transmits the key data from the ports DB0 through DB7 connected to the system bus (ISA-BUS) 11 (step S35).

On the other hand, when the external keyboard 53 is connected to the main body, the scan code corresponding to the depressed key is compared with the scan code of the host key pattern registered in initialization to determine whether the depressed key is a hot key (i.e., (hot key pattern)+(any other key)) (step S33). If YES in step S33, processing in step S34 is executed. Otherwise, processing in step S35 is executed.

Detailed key data transmission processing performed when the external keyboard 53 is connected to the main body will be described below. Assume that a hot key pattern is defined by two keys, i.e., [Ctrl] key+[Alt] key, and that the [Ctrl] and [Alt] keys are sequentially depressed and are kept depressed, and an [F1] key is depressed. In this case, the keyboard controller (KBC) 30 transmits key data as follows.

(1) The scan code of the [Ctrl] key is transmitted from the ports DB0 through DB7 connected to the system bus (ISA-BUS) 11 as in the normal operation.

(2) The scan code of the [Alt] key is not transmitted because depression of the [Alt] key makes it possible to set a hot key state. At this time, the break code of the [Ctrl] key is transmitted from the ports DB0 through DB7 connected to the system bus (ISA-BUS) 11.

(3) When the [F1] key is depressed next, the scan code of the [F1] key is transmitted from the ports P00 through P07 connected to the keyboard interface bus (KBC-BUS) 13 to the status LCD control gate array (SLCDC GA) 26 to inform the CPU 21 of the input of the hot key by means of an SMI signal.

Hot key processing executed by the power supply controller (PSC) 46 will be described below.

The power supply controller (PSC) 46 exchanges various kinds of control information with the CPU 21 using the registers of the status LCD control gate array (SLCDC GA) 26. The power supply controller (PSC) 46 performs speaker volume adjustment or the brightness/contact adjustment of the LCD panel 49 in accordance with the hot key data set in the Fn status register 101 in the status LCD control gate array (SLCDC GA) 26.

FIG. 17 shows a hardware circuit for speaker volume adjustment.

A speaker volume adjustment function can be executed by a hot key operation using the [Fn] key+the [F4] key. Every time this hot key operation is performed, four states, i.e., "small volume", "medium volume", "large volume", and "off" are rotatably set, and at the same time, a beep tone is produced. In this case, the beep tone is kept produced during the period of depression of the [Fn] and [F4] keys.

This function is realized by the power supply controller (PSC) 46 and the hardware logic shown in FIG. 17. That is, a drive circuit 61 of a speaker 60 has two ports A and B. Four speaker power supply voltages (SPK VCC) are selectively supplied from the power supply controller (PSC) 46 to the port A. The four speaker power supply voltages (SPK VCC) correspond to the four states, i.e., "small volume", "medium volume", "large volume", and "off", respectively. A pulse signal for causing the speaker 60 to produce a beep tone is supplied to the port B of the drive circuit 61. This pulse signal is generated by an AND gate 62 and an OR gate 63 arranged in the PCMCIA gate array (PCMCIA GA) 28.

A clock signal having a frequency of the beep tone is supplied from the timer in the I/O controller 22 to one input terminal of the AND gate 62, and an output from the OR gate 63 is supplied to the other input terminal of the AND gate 62. A speaker ON signal is supplied from the power supply controller (PSC) 46 to a first input terminal of the OR gate 63, an alarm signal for signaling various abnormal states is supplied to a second input terminal of the OR gate 63, and a beep signal generated by an application program is supplied to a third input terminal of the OR gate 63. This alarm signal is generated in such cases that the LCD panel 49 is closed in the power-ON state and the AC adapter is accidentally disconnected.

The power supply controller (PSC) 46 periodically read-accesses the Fn status register 101. The power supply controller (PSC) 46 sets the speaker ON signal to "1" when the scan code (make code) of the [F4] key is received, and sets the speaker ON signal to "0" when a break code is received. The power supply controller (PSC) 46 rotatably generates the four speaker power supply voltages (SPK VCC) respectively corresponding to the "small volume", "medium volume", "large volume", and "off". This rotation is performed every time the scan code (make code) of the [F4] key is received.

An operation of switching the speaker volume by a hot key will be described with reference to timing charts of FIGS. 18A through 18C.

When the [Fn] key and the [F4] key on the internal keyboard 51 are simultaneously depressed, the scan code (make code) of the [F4] key is set in the Fn status register 101 in the status LCD control gate array (SLCDC GA) 26. The power supply controller (PSC) 46 performs polling to periodically read-access the Fn status register 101. If the read contents represent the scan code (make code) of the [F4] key, the power supply controller (PSC) 46 sets the speaker ON signal to "1". The power supply controller (PSC) 46 rotates the state of the current speaker power supply voltage (SPK VCC) by one step. For example, if the current speaker power supply voltage (SPK VCC) corresponds to the "small volume", the voltage is switched to a voltage corresponding to the "medium volume". A beep tone having the "medium volume" is produced from the speaker 60. When the [F4] key is released, the break code of the [F4] key is set in the Fn status register 101 in the status LCD control gate array (SLCDC GA) 26 and is read out by the power supply controller (PSC) 46. When the break code of the [F4] key is read out, the status LCD control gate array (SLCDC GA) 26 resets the speaker ON signal to "0". Therefore, production of the beep tone having the "medium volume" is stopped.

In this state, when the [Fn] and [F4] keys are simultaneously depressed, the speaker power supply voltage (SPK VCC) is switched from the value corresponding to the "medium volume" to the value corresponding to the "large volume". A beep tone having the "large volume" is kept produced until the [F4] key is released. When the [Fn] and [F4] keys are simultaneously depressed again, the speaker power supply voltage (SPK VCC) is switched from the value corresponding to the "large volume" to the value (power OFF) corresponding to "off". In this case, no beep tone is produced from the speaker 60.

In this manner, in switching of the speaker volume by the hot key processing, a beep tone is continuously produced while the [Fn] and [F4] are kept simultaneously depressed. For this reason, the user can arbitrarily adjust the beep tone production period and the brightness and the contrast of the LCD panel 49 (linearly changes during the depression UP/DOWN) in accordance with the period during which the [Fn] and [F4] keys are simultaneously kept depressed.

The brightness and the contrast adjustment of the LCD 49 will now be described with reference to FIGS. 19A through 19C and FIG. 20.

In order to increase the brightness of the LCD, [Fn] and [↑] keys are depressed. In order to decrease the brightness of the LCD, [Fn] and [↓] keys are depressed. In order to increase the contrast of the LCD, [Fn] and [→] keys are depressed. In order to decrease the contrast of the LCD, [Fn] and [←] keys are depressed. Since the brightness control and the contrast control of the LCD are similar, only the brightness control of the LCD will be explained.

when [Fn] and [↑] keys in the internal keyboard 51 are depressed, the scan code of the [↑] key is set in the Fn status register 101 in the SLCDG-GA 26 like the switching operation of the speaker volume. The PSC 46 polls the Fn status register 101 and increments the value of the brightness register 55 (8 bits) in the PSC 46 shown in FIG. 20 by one when the read out content is the scan code of the [↑] key. Similarly, when the read out content is the scan code of the [θ] key, the PSC 46 decrements the contents of the brightness register 55 by one. As shown in FIGS. 19A through 19C, when the [Δ] key or [↓] key is kept depressed for a predetermined period of time, for example one second or more, the above increment or decrement operations are repeated. The brightness register 55 comprises 8 bits and the value of which ranges 0 to 255. The contents of the brightness register is converted into brightness voltage values of 0–5 V by the D/A converter 56 and supplied to a back light control circuit (not shown) through the buffer 67.

Similarly, in the contrast adjustment, the value of the contrast register 57 is incremented or decremented by one in response to the depression of the [→] key or [←] key, respectively, and the value is converted into the contrast voltage value ranging from 0 to 5 volts by the D/A converter 58 and supplied to a contrast voltage control circuit (not shown).

As described above, in the portable computer of this embodiment, the dedicated registers for communication with the keyboard controller (KBC) 30 are arranged in the status LCD control gate array (SLCDC GA) 26 connected to the system bus (ISA-BUS) 11. These dedicated registers and the keyboard controller (KBC) 30 are connected through the keyboard interface bus (KBC-BUS) 13. For this reason, the CPU 21 read/write-accesses the dedicated registers in the status LCD control gate array (SLCDC GA) 26 through the system bus (ISA-BUS) 11. The keyboard controller (KBC) 30 read/write-accesses the dedicated registers through the keyboard interface bus (KBC-BUS) 13. Therefore, exchange of various kinds of control information such as commands between the CPU 21 and the keyboard controller (KBC) 30 is performed.

In this case, in transfer from the CPU 21 to the keyboard controller (KBC) 30, the keyboard controller (KBC) 30 can perform other processing operations while the CPU 21 writes the control information in the register group or registers through the system bus (ISA-BUS) 11. When the control information is written in the register group, a request signal is transmitted from the status LCD control gate array (SLCDC GA) 26 to the keyboard controller (KBC) 30. Thereafter, communication is performed between the status LCD control gate array (SLCDC GA) 26 and the keyboard controller (KBC) 30. During this period, the CPU 21 and the system bus (ISA-BUS) 11 are free from this control information transfer. Similarly, in the transfer from the keyboard controller (KBC) 30 to the CPU 21, while the keyboard controller (KBC) 30 writes control information in the register group through the keyboard interface bus (KBC-BUS) 13, the CPU 21 and the system bus (ISA-BUS) 11 are free from this control information transfer. When the control information is written in the register group, an SMI signal is transmitted from the status LCD control gate array (SLCDC GA) 26 to the CPU 21. Thereafter, communication between the status LCD control gate array (SLCDC GA) 26 and the CPU 21 is performed. During this period, the keyboard controller (KBC) 30 is free from this control information transfer.

Even if the number of times of transfer between the CPU 21 and the keyboard controller (KBC) 30 is increased, an increase in time during which the system bus (ISA-BUS) 11 and the CPU 21 are occupied is very small. The keyboard controller (KBC) 30 can have special functions associated with system function expansion such as the hot key function and the security function without degrading the system performance.

Communication between the CPU 21 and the power supply controller (PSC) 46 can be realized such that the CPU 21 read/write-accesses the dedicated register group for communication with the power supply controller (PSC) 46, which is arranged in the status LCD control gate array (SLCDC GA) 26, through the system bus (ISA-BUS) 11, and the power supply controller (PSC) 46 read/write-accesses the register group through the power supply interface bus (PSC-BUS) 14. Therefore, communication between the CPU 21 and the power supply controller (PSC) 46 can also be efficiently performed.

In this embodiment, the keyboard controller (KBC) 30 has two types of ports to communicate with the CPU 21. One type of port is a port for communicating with the CPU 21 through the system bus (ISA-BUS) 11, and the other type of port is a port for communicating with the CPU 21 through the keyboard interface bus (KBC-BUS) 13 and the status LCD control gate array (SLCDC GA) 26. In this case, the port for communicating with the CPU 21 through the system bus (SYSTEM-BUS) 11 is used to exchange existing commands associated with keyboard control or the like required in execution of an application program or the like so as to maintain compatibility with a conventional system. This port is also used to transmit normal key data to the application program or the like. On the other hand, the port for communicating with the CPU 21 through the keyboard interface bus (KBC-BUS) 13 and the status LCD control gate array (SLCDC GA) 26 is used to exchange commands associated with execution of expansion functions, i.e., the hot key processing and the security function, provided to this computer, and to transmit hot key data.

In this manner, the keyboard controller (KBC) 30 is arranged to exchange the existing command used in the application program or the like and other commands added for function expansion through different command path routes. For this reason, execution of a special function is requested while a command from the application program is set in the I/O register for communication with the system bus, which is arranged in the keyboard controller (KBC) 30, the command for executing the requested special function can be exchanged without temporarily saving the contents of this I/O register. The expansion function can be efficiently performed without adversely affecting execution of the application program while maintaining compatibility with a conventional system.

Communication from the keyboard controller (KBC) 30 to the power supply controller (PSC) 46 is performed to cause the power supply controller (PSC) 46 to perform hot key processing. In this case, the CPU 21 does not involve in this communication. That is, the hot key processing function is performed by the power supply controller (PSC) 46 by reading the key data in the Fn status register in the status LCD control gate array (SLCDC GA) 26 through the power supply interface bus (PSC-BUS) 14.

In this embodiment, transmission of the control information to the CPU 21 is performed using the SMI signal. However, when a CPU having no interrupt signal such as an SMI signal, an NMI signal is used in place of the SMI signal.

FIG. 21 is a block diagram showing the arrangement of the third embodiment according to the present invention. The same reference numerals as in FIG. 1 denote the same parts in FIG. 21.

Referring to FIG. 21, reference numeral 21 denotes a CPU (main CPU) for controlling the overall system. In this case, the CPU 21 is exemplified by a CPU having the above-mentioned SMI interrupt request input terminal. A power supply controller (PSC) 46 interrupts data transmission by the SMI interrupt signal. When the SMI interrupt signal is generated in this embodiment, the CPU 21 checks an interrupt generation source in accordance with states of a plurality of predetermined interrupt registers in dedicated registers arranged in a gate array (GA) 26. The CPU 21 then performs power save mode control processing shown in FIG. 26.

Reference numerals 65 and 25 are system memories accessed under the control of the CPU 21. More specifically, the system memory 65 is a RAM used as a program storage area, a work area, and the like of programs as execution objects. The system memory 25 is a BIOS-ROM storing a system BIOS.

The gate array (GA) 26 is arranged between the CPU 21, and a keyboard controller (KBC) 30 (to be described later) and the power supply controller (PSC) 46. The gate array (GA) 26 has input/output ports (interface logic) to which buses of the above components are connected. The gate array (GA) 26 is connected to the CPU 21 through a system bus (SYSTEM-BUS) 11, to the power supply controller (PSC) 46 through a PSC bus (PSC-BUS), and to the keyboard controller (KBC) 30 through a KBC bus (KBC-BUS) 13. A register group constituted by a plurality of registers addressed to be read/write-accessible through the input/output ports connected to the above buses is arranged in the gate array (GA) 26. Some of the registers are used as registers (power supply command status register (an address 3F*h* in FIG. 23; see FIG. 24F) for issuing an SMI interrupt, a register (addresses 31*h*, 32*h*, 34*h*, 35*h* through 37*h*, 38*h*, and 39*h* in FIG. 23; see FIGS. 24B through 24E; see FIGS. 24G and 24H) for transmitting or receiving data (command/parameter), and the like. An output from the specific bit (bit 7) of the power supply command status register (3F*h*) is connected to the SMI interrupt request input terminal of the CPU 21.

The keyboard controller (KBC) 30 controls key inputs at a keyboard (KB) 51 and has a dedicated processor and connection ports for the system bus 11 and the KBC bus 13, when a specific key ([Fn] key) on the keyboard (KB) 51 and any other key are simultaneously depressed, the keyboard controller (KBC) 30 sets the scan code of the depressed key together with the specific key ([Fn] key) in a predetermined register (hot key register (=address 8E$h$)) of the gate array (GA) 26 and allows the CPU 21 and the power supply controller (PSC) 46 to recognize (read) this scan code as hot key data.

The keyboard (KB) 51 is subjected to key scan under the control of the keyboard controller (KBC) 30. The keyboard 51 has the [Fn] key for a hot key input. The hot key input using the [Fn] key is validated in combination with any other key. By this hot key input, the keyboard controller (KBC) 30 generates an SMI interrupt through a predetermined register (Fn status register) of the register group in the gate array (GA) 26 to inform the CPU 21 of the hot key input.

The power supply controller (PSC) 46 is connected to the gate array (GA) 26 through the PSC bus 14 to realize intelligent power supply. The power supply controller (PSC) 46 comprises an 8-bit power supply CPU 71 as a major component, a ROM 72, a RAM 73, an A/D port 74, an input port (IP) 75, an input/output port (IOP) 76, and an output port (OP) 77.

Figure 25:
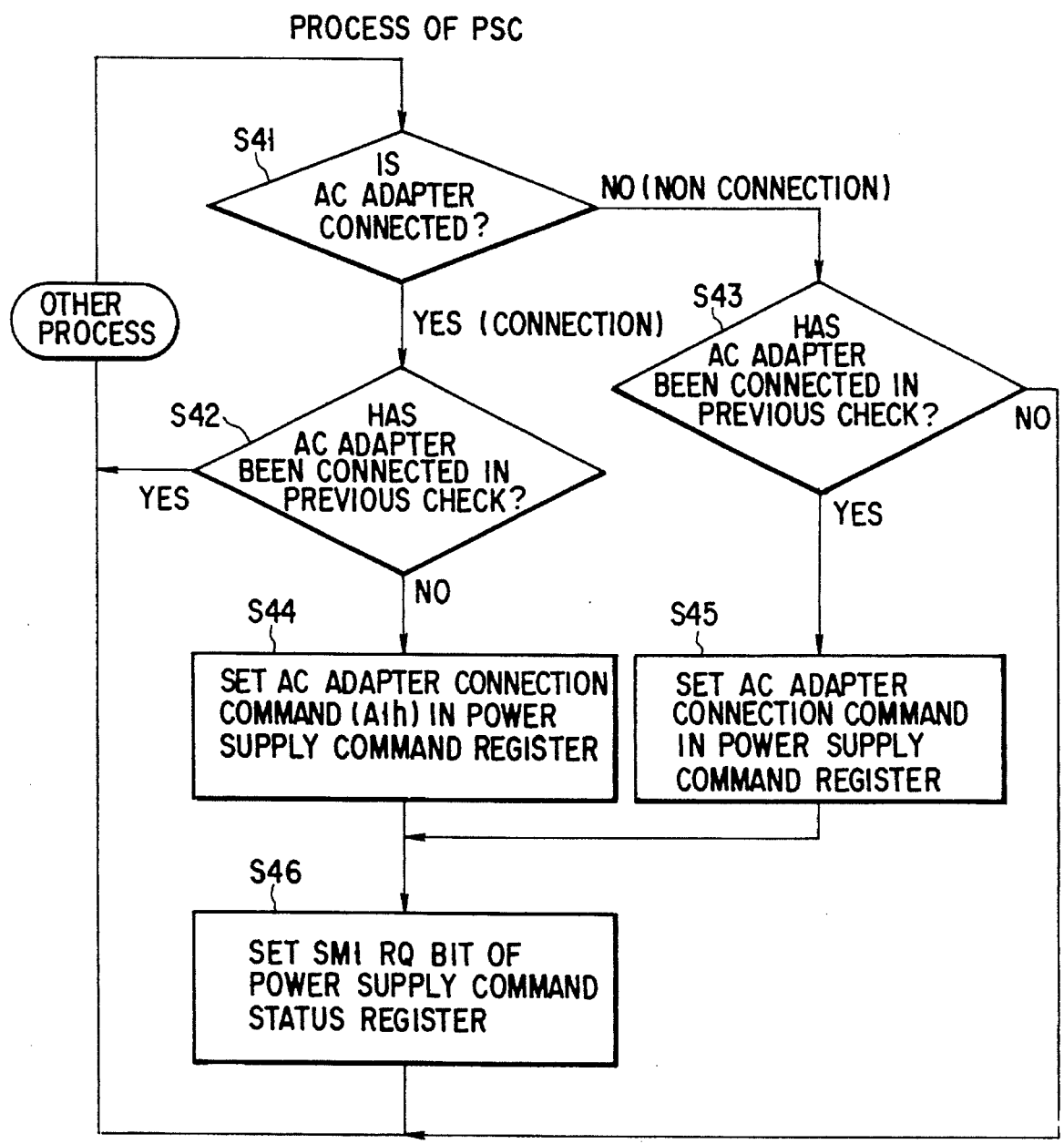
FIG. 25 is a flow chart showing a sequence executed by a power supply controller (PSC) so as to explain an operation of the embodiment shown in FIG. 21.

The power supply CPU 71 arranged in the power supply controller (PSC) 46 executes data transmission processing using the SMI signal for power save control in accordance with the presence/absence of an AC adapter (AC-ADP) 78 shown in FIG. 25. This data transmission processing is part of the processing function in accordance with microprograms stored in the ROM 72. The A/D port 74 samples and digitizes voltages from the AC adapter (AC-ADP) 78 and a battery (BATT) and a consumed current (i) of the battery (BATT) 79. The digital voltage values and the digital current value are fetched by the power supply control CPU 71. The input port 75 inputs and latches operation signals of a power switch (PS) 80 and a reset switch (RS) 81 and transfers them to the power supply control CPU 71. The input/output port 76 transfers data (command/parameter) with the gate array (GA) 26 through the PSC bus 14. The output port 77 outputs an ON/OFF signal to a power supply switch Sa, a charge switch Sb, and the like and outputs a brightness control signal (BCS) and a contrast control signal (CCS) to a flat panel display (DISP) 49 mounted in the system main body (portable computer main body).

The AC adapter (AC-ADP) 78 generates a system operation secondary power supply voltage using an external commercial power supply voltage as a primary power supply voltage. The AC adapter (AC-ADP) 78 is plugged into the system main body to apply the system operation power supply voltage to the system main body.

In this embodiment, the power supply controller (PSC) 46 determines the connected/disconnected state of the AC adapter (AC-ADP) 78. During the operation of the system, when the state of the AC adapter (AC-ADP) 78 is changed from the disconnected state to the connected state, AC adapter connection information (AC adapter connection command (A1$h$)) is set in the power supply command register (38$h$) in the gate array (GA) 26. However, when the state of the AC adapter (AC-ADP) 78 is changed from the connected state to the disconnected state, AC adapter disconnection information (AC adapter disconnection command (A2$h$)) is set in the power supply command register (38$h$) in the gate array (GA) 26.

The rechargeable battery (BATT) 79 serves as the system battery drive power supply. When the AC adapter (AC-ADP) 78 is not connected to the main body, the battery 79 supplies an operating power supply voltage to each component in the system.

An amplifier (A) 82 obtains the consumed current of the battery (BATT) 79 as an analog value on the basis of a potential difference across a resistor R1. This consumed current (i) is input to the A/D port 74 of the power supply controller (PSC) 46 together with the output voltages (v) from the AC adapter (AC-ADP) 78 and the battery (BATT) 79.

A DC/DC converter 83 generates an operating power supply voltage for each component constituting the system. The DC/DC converter 83 generates a power supply voltage required for each component of the system in accordance with an output power supply voltage from the AC adapter (AC-ADP) 78 or the battery (BATT) 79.

The flat panel display (DISP) 49 is permanently or detachably mounted in the system main body. The flat panel display 49 receives the brightness control signal (BCS) and the contrast control signal (CCS) which correspond to the operation command of the hot key from the output port 77 of the power supply controller (PSC) 46.

The switches 80 and 81 are operated by an operator. The switch 80 serves as the power switch (PS) for designating an ON/OFF operation of the system power supply. The switch 81 serves as the reset switch (RS) for resetting the system. Operation signals from the switches 80 and 81 are input to the input port 75 of the power supply controller (PSC) 46. Note that the operation signal from the reset switch (RS) 81 is supplied to the CPU 21 through a gate in the gate array (GA) 26, and a circuit required for this is not illustrated here.

The power supply switch Sa is controlled by the power supply controller (PSC) 46. The power supply switch Sa is ON/OFF-controlled in accordance with the ON/OFF operation of the power switch (PS) 80 and is forcibly turned off in a system failure or the like.

The charge switch Sb is ON/OFF-controlled by the power supply controller (PSC) 46 in the charge mode of the battery (BATT) 79. When the charge switch Sb is ON, an output power supply voltage from the AC adapter (AC-ADP) 78 is supplied to the battery (BATT) 79 through a reverse flow preventive diode D1 and the resistor R1.

The reverse flow preventive diode D1 is arranged in an output current path of the AC adapter (AC-ADP) 78. A reverse flow preventive diode D2 is arranged in an output current path of the battery (BATT) 79.

FIGS. 22 through 24H are views for explaining addresses, names, and bit arrangements of the registers in dedicated registers 201 (FIG. 4) arranged in the gate array (GA) 26. FIG. 22 shows the contents of the dedicated registers 201, FIG. 23 is a table showing the registers used in data exchange between the power supply controller (PSC) 46 and the CPU 21 and the addresses of these registers, and FIGS. 24A through 24H are formats showing the data structures of the registers shown in FIG. 23.

The contents of the registers will be described with reference to FIGS. 24A through 24H.

(a). System Command Status Register (30$h$)

(B7=CPU→PSC, B0=CPU←PSC)

COMRP (bit B7) of this register (30$h$) is set (="1") by the CPU 21 when the CPU 21 sends a command to the power supply controller (PSC) 46.

The power supply controller (PSC) 46 performs polling to read the contents of this register (30$h$) therein. If this bit (B7) is set at "1", the command is executed. If the power supply controller (PSC) 46 is set in a state capable of receiving a command from the CPU 21, the power supply controller (PSC) 46 clears (="0") this bit.

ACK (B0) is set by the power supply controller (PSC) 46 to inform the power supply controller (PSC) 46 of execution of the command.

The CPU 21 confirms using this ACK (B0="0") that the command has been executed. The CPU 21 then clears this bit (B0).

(b). System Command Register (31*h*)

(CPU→PSC)

A transmission command is set in this register (31*h*) by the CPU 21 when the CPU 21 sends the transmission command to the power supply controller (PSC) 46.

(c). System Command Parameter Register (32*h*)

(CPU→PSC)

When a parameter is added to a command which is to be transmitted from the CPU 21 to the power supply controller (PSC) 46, the CPU 21 sets this parameter in this register (32*h*).

(d). Response Command Register (34*h*)

(CPU←PSC)

When the power supply controller (PSC) 46 sends back a response command in response to a command from the CPU 21, the power supply controller (PSC) 46 sets the response command in this register (34*h*).

(e). Response Command Parameter Register (35*h*–37*h*)

(CPU←PSC)

When a parameter is to be added to a response command, the power supply controller (PSC) 46 sets this parameter added to the response command in this register (35*h*–36*h*).

(f). Power Supply Command Status Register (3F*h*)

(CPU←PSC)

When a command is to be sent from the power supply controller (PSC) 46 to the CPU 21, the power supply controller (PSC) 46 sets (="1") SMIRQ bit (B7) in this register (3F*h*).

When this bit (B7) is set at "1", an SMI (or NMI) interrupt is issued to the CPU 21.

When the CPU 21 receives the command from the power supply controller (PSC) 46, the CPU 21 clears this bit (B7).

(g). Power Supply Command Register (38*h*)

(CPU←PSC)

When the power supply controller (PSC) 46 is to send a command to the CPU 21, the power supply controller (PSC) 46 sets this command in this register (38*h*).

(h). Power Supply Control CPU Command Register (39*h*)

(CPU←PSC)

A command to be supplied to the CUP 21 of the system from the power supply control CPU 71 is set in this register (39*h*).

(i). Power Supply Control CPU Command Parameter Register (3A*h*)

When a parameter is added to the power supply control CPU command register (39*h*), the parameter is set in this register.

Figure 26:
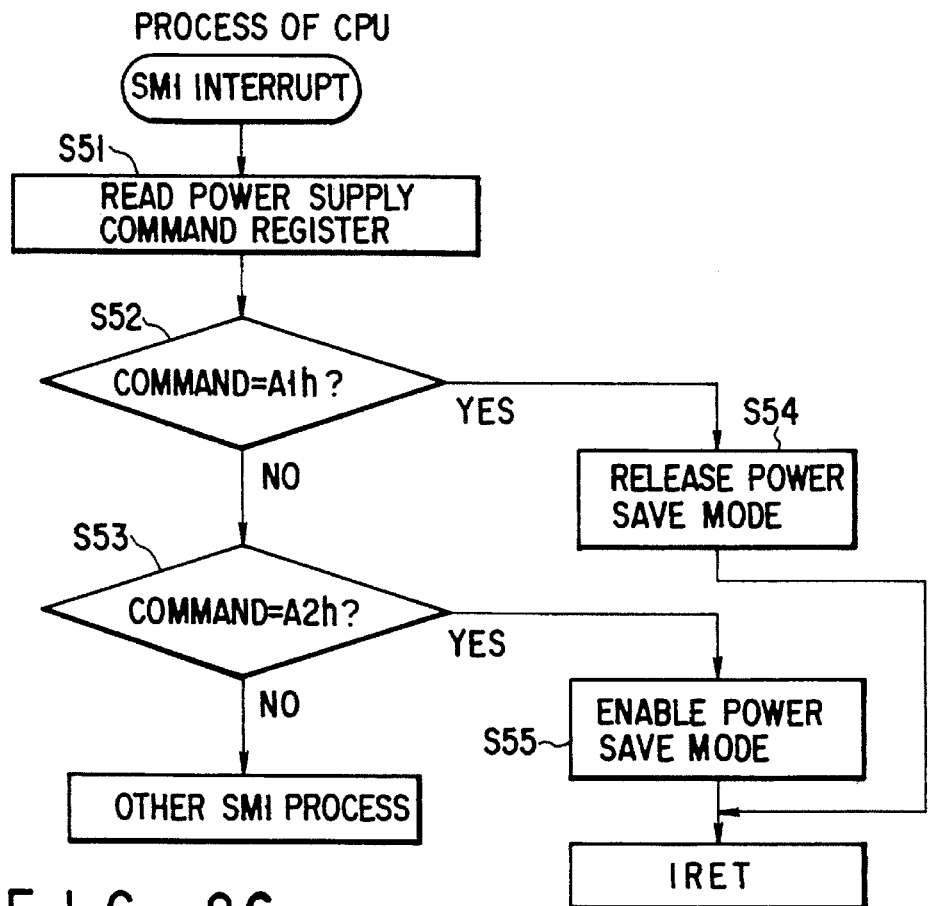
FIG. 26 is a flow chart showing a sequence executed by the power supply controller (PSC) so as to explain an operation of the embodiment shown in FIG. 21.

FIGS. 25 and 26 are flow charts for explaining the processing sequences so as to explain the operations of this embodiment. FIG. 25 shows the processing flow executed by the power supply controller (PSC) 46, and FIG. 26 shows the processing flow executed by the CPU 21. As an example of processing of this embodiment, processing for controlling (invalidating/validating) the power save mode in accordance with a change in plug-in connection (connection→disconnection/disconnection→connection) of the AC adapter (AC-ADP) 78 will be described.

The operations of this embodiment of the present invention will be described with reference to FIGS. 25 and 26. Note that processing for controlling (invalidating/validating) the power save mode in accordance with a change in plug-in connection (connection→disconnection/disconnection→connection) of the AC adapter (AC-ADP) 78 will be described.

In state monitoring processing according to power supply control programs stored in the ROM 72, the power supply control CPU 71 of the power supply controller (PSC) 46 performs polling and scanning of the A/D port 74, the input port 75, and the input/output port 76 every predetermined period to determine the connecting state (connection/disconnection) of the AC adapter (AC-ADP) 78 in accordance with information from the A/D port 74 within this processing. The power supply control CPU 71 then performs processing shown in FIG. 25. More specifically, the power supply control CPU 71 checks the connection state (connection/disconnection) of the AC adapter (AC-ADP) 78 to compare with this state with the state of the previous check operation to determine whether the AC adapter (AC-ADP) 78 is disconnected (steps S41 through S43 in FIG. 25). If the AC adapter (AC-ADP) 78 is plugged in the current check operation and was not plugged in the previous check operation, the CPU 71 determines that the AC adapter (AC-ADP) 78 is plugged into the main body (YES in step S41 and NO in step S42 in FIG. 25), or if the AC adapter (AC-ADP) 78 is not plugged in the current check operation and was plugged in the previous check operation, the CPU 71 determines that the AC adapter (AC-ADP) 78 is disconnected from the main body (connection release) (NO in step S41 and YES in step S43 in FIG. 25).

If the AC adapter (AC-ADP) 78 is determined to be plugged into the main body (i.e., YES in step S41 and NO in step S42 in FIG. 25), the CPU 71 sets an AC adapter connection command (A1*h*) representing the plug-in connection of the AC adapter (AC-ADP) 78 in the power supply command register (38*h*) (FIG. 24G) (step S44 in FIG. 25).

If the AC adapter (AC-ADP) 78 is determined to be disconnected from the main body (release of plug-in connection) (NO in step S41 and YES in step S43 in FIG. 25), the AC adapter disconnection command (A2*h*) representing that the AC adapter (AC-ADP) 78 is disconnected from the main body is set in the power supply command register (38*h*) (step S45 in FIG. 25).

The SMIRQ (B7) bit is set in the power supply command status register (3F*h*) (FIG. 24F) in the dedicated registers 201 arranged in the gate array (GA) 26. That is, "1" is set in the SMIRQ (B7) to issue an SMI interrupt, and the flow returns to normal power supply processing (step S46 in FIG. 25).

The SMIRQ (="1") bit in the power supply command status register (3F*h*) is output as an SMI signal of low level (="0") outside the gate array (GA) 26 through an SMI signal output logic (SMI·G) 205. This SMI signal is then supplied to the SMI interrupt request input terminal of the CPU 21 through the SMI signal path, thereby SMI-interrupting the CPU 21.

When the CPU 21 receives the SMI signal of low level (="0") at its SMI interrupt request input terminal, the CPU 21 executes SMI processing according to the SMI processing program stored in a ROM 325 and scans the dedicated registers 201 in the gate array (GA) 26 to check the command status register from which an SMI interrupt is generated. The CPU 21 then reads the contents of the command register corresponding to this command status register. That is, in this case, the CPU 21 recognizes that the SMI interrupt is issued (SMIRQ="1") from the power supply command status register (3F*h*) and fetches the contents of the power supply command register (38*h*) paired with this power supply command status register. The contents of the register (38*h*) are checked (steps S51 through S53 in FIG. 26).

In this case, the contents of the data read from the power supply command register (38*h*) represent that "the AC adapter (AC-ADP) 78 is plugged into the main body". If the AC adapter connection command (A2*h*) is detected, the power save mode is released, and this interrupt processing is ended (step S54 in FIG. 26).

Alternatively, the contents of the data read from the power supply command register (38*h*) represent that the AC adapter (AC-ADP) 78 is disconnected from the main body". If the AC adapter disconnection command (A2*h*) is detected, the power save mode is validated, and this interrupt processing is ended (step S45 in FIG. 26).

In this manner, the power supply controller (PSC) 46 and the CPU 21 are connected through the gate array (GA) 26 having the dedicated registers 201. Using a predetermined register in the dedicated registers 201, the power supply interface arrangement between the power supply controller (PSC) 46 and the CPU 21 can be obtained. For example, when the AC adapter is connected to the main body, the power save mode is invalidated. However, when the AC adapter is disconnected from the main body, the power save mode is immediately validated. In this manner, every time the AC adapter is disconnected from or connected to the system main body, a change in state is informed from the power supply controller (PSC) 46 to the CPU 21 on the system side. Since such a power supply interface mechanism is realized, various system control operations including the power save function can be finely performed without degrading the system performance, thereby improving the system performance.

In the above embodiment, power save control of the power supply interface mechanism of the present invention has been described. However, the power supply interface mechanism of the present invention is not limited to power save control, but is readily applicable to other system control operations.

In the above embodiment, the gate array (GA) 26 having the dedicated registers 201 is interposed between the power supply controller (PSC) 46 and the CPU 21. However, registers required to data exchange between the power supply controller (PSC) 46 and the CPU 21 may be arranged in the power supply controller (PSC) 46 or any other functional circuit chip.

The arrangement of the power supply circuit is not limited to the one shown in FIG. 21, but can be replaced with another arrangement.

The fourth embodiment of the present invention will be described below.

In this embodiment, a hot key register (8E*h*), the write access of which is controlled by a keyboard controller (KBC) 30 and the read access of which is controlled by a power supply controller (PSC) 46, is arranged in dedicated registers 201. The keyboard controller (KBC) 30 sets a key scan code upon a hot key operation in the hot key register.

The power supply controller (PSC) 46 performs polling and scanning to read the key scan code from the hot key register and controls the brightness, contrast, and the like of a flat panel display (DISP) 49 in accordance with the contents of the code.

Figure 27:
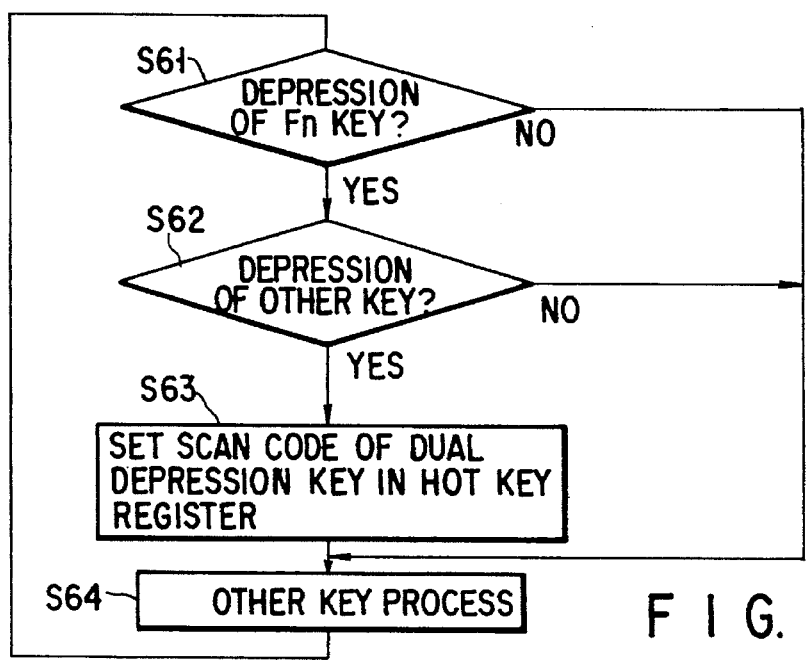
FIG. 27 is a flow chart showing a sequence executed by the keyboard controller (KBC) so as to explain an operation of the fourth embodiment of the present invention.
Figure 28:
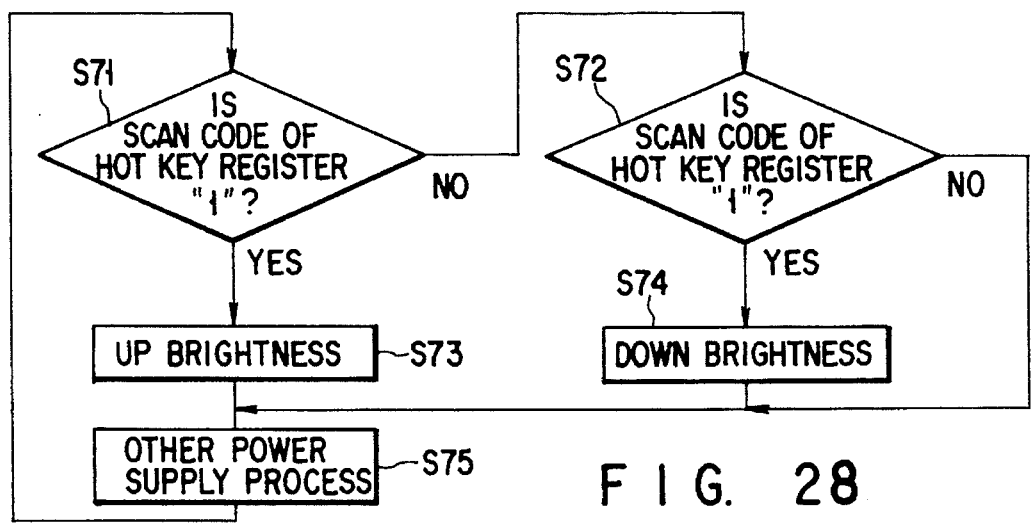
FIG. 28 is a flow chart showing a sequence executed by the power supply controller (PSC) so as to explain an operation of the fourth embodiment.

FIGS. 27 and 28 are flow charts showing processing sequences for explaining the operations of the above embodiment. FIG. 27 shows the processing flow executed by the keyboard controller (KBC) 30, and FIG. 28 shows the processing flow executed by the power supply controller (PSC) 46. As a processing example of this embodiment, processing for up/down control of the brightness of the flat panel display (DISP) 49 according to the contents the hot key register (SE*h*) of the power supply controller (PSC) 46 will be described below.

Operations of the above embodiment according to the present invention will be described with reference to the accompanying drawings. Note that processing for up/down control of the brightness of the flat panel display (DISP) 49 according to the contents of the hot key register (SE*h*) of the power supply controller (PSC) 46 will be described.

The keyboard controller (KBC) 30 monitors a hot key operation in a combination of the [Fn] key and any other key in key input processing at a keyboard (KB) 51. That is, it is determined in accordance with the contents of the key scan code whether any other key is depressed during the depression period of the [Fn] key, thereby monitoring a hot key operation (steps S61 and S62 in FIG. 27).

If the keyboard controller (KBC) 30 determines a hot key operation, the key scan code of the dual depression key, i.e., the key depressed together with the [Fn] key, is set in the hot key in the dedicated registers 201 arranged in the gate array (GA) 26. The keyboard controller (KBC) 30 starts any other key input processing (steps S63 and S64 in FIG. 27).

In this embodiment, processing for performing up/down control of the brightness of the flat panel display (DISP) 49 is exemplified. When the brightness is to be increased, an up cursor or arrow key ("↑") is operated together with the [Fn] key. When the brightness is to be decreased, a down cursor or arrow key ("↓") is operated together with the [Fn] key.

A power supply control CPU 71 in the power supply controller (PSC) 46 performs polling and scanning of an A/D port 74, an input port 75, an input/output port 76, and the dedicated register and the hot key register in the dedicated registers 201 every predetermined period in the state monitoring processing in accordance with power supply control programs stored in a ROM 72. The power supply control CPU 72 checks the contents of the hot key register (8E*h*) within this processing. In this case, processing for performing up/down control of the brightness of the flat panel display (DISP) 49 is the processing object. The key scan codes of the up arrow key ("↑") and the down arrow key ("↓") are monitored (steps S71 and S72 in FIG. 28).

In hot key determination processing, if the key scan code of the hot key register (8E*h*) is that of the up arrow key ("↑"), the level of the brightness control signal (BCS) is increased to increase the display brightness of the flat panel display (DISP) 49, and the flow returns to any other power supply control processing (steps S73 and S75 in FIG. 28).

If the key scan code of the hot key register (8E*h*) is that of the down arrow key ("↓"), the level of the brightness control signal (BCS) is decreased to decrease the display brightness of the flat panel display (DISP) 49, and the flow returns to any other power supply control processing (steps S74 and S75 in FIG. 28).

As described above, the power supply controller (PSC) 46 can directly receive the output from the keyboard controller (KBC) 30 through the hot key register (SEh) without using a CPU 21 on the system side, thereby performing brightness control or the like of the display with a hot key operation.

In the above embodiment, when the key scan code of the up arrow key ("↑") is detected through the hot key register (8Eh), the level of the brightness control signal (BCS) is increased to increase the display brightness of the flat panel display (DISP) 49. If the key scan code of the down arrow key ("↓") is detected, the level of the brightness control signal (BCS) is decreased to decrease the display brightness of the flat panel display (DISP) 49. However, the up/down code can be changed by the CPU 21.

In this case, the CPU 21 sets a change command for designating up/down control and a key scan code to be changed, respectively, in the system command register (31h) and the system command parameter register (32h) in the dedicated registers 201. The CPU 21 sets "1" in bit 7 of the system command status register (30h) to inform the power supply controller (PSC) 46 of command issuance. The power supply controller (PSC) 46 recognizes using the value ("1") of bit 7 of the system command status register (30h) in the dedicated registers 201 that the CPU 21 has issued the command. The power supply controller (PSC) 46 reads the contents of the system command register (31h) and the system command parameter register (32h), decodes them, and changes the key scan code for designating up/down control in accordance with the command from the CPU 21. By this change in key scan code, the power supply controller (PSC) 46 monitors the key scan code of the hot key register (SEh) using the changed key scan code as a monitor object. when the changed key scan code is set in the hot key register (8Eh), the display brightness of the flat panel display (DISP) 49 is changed in accordance with the resultant key scan code.

As described above, the operation key for controlling the brightness of the flat panel display (DISP) 49 can be changed from the system side.

In the above embodiment, the power supply interface mechanism of the present invention performs display brightness control of the display device using the hot key register (8Eh). However, the power supply interface mechanism of the present invention is not limited to display brightness control, but is equally applicable to brightness and contrast control of a display device and any other system control. The arrangement of the power supply circuit is not limited to the one shown in FIG. 1, but may be any other arrangement.

The fifth embodiment of the present invention will be described below.

According to this embodiment, when a power supply controller (PSC) 46 detects from the contents of a command register arranged in a gate array (GA) 26 that the freeze mode is being set, a power switch 80 and a reset switch 81 which are monitor control objects are excluded to invalidate the operations thereof. Therefore, data storage processing in the freeze mode is properly executed with high reliability.

Figure 29:
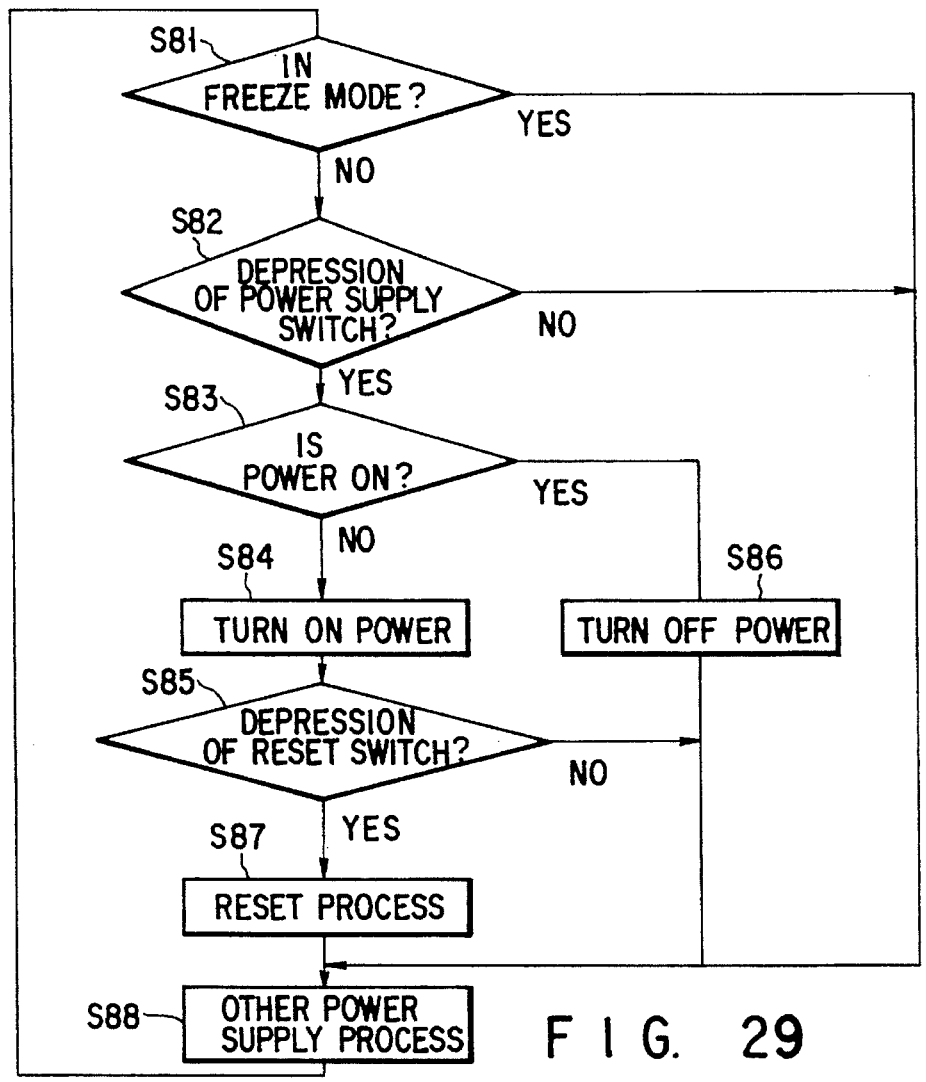
FIG. 29 is a flow chart showing a sequence executed by the power supply controller (PSC) so as to explain an operation of the fifth embodiment of the present invention.

FIG. 29 is a flow chart showing a processing sequence for explaining the operation of the above embodiment. This flow is executed when the power supply controller (PSC) 46 receives, through the dedicated registers 201, a command for invalidating the inputs from the operation switches from the CPU 21.

More specifically, when the power supply controller (PSC) 46 receives a request signal (REQUEST) in accordance with a signal COMRQ (="1") of bit B7 of the system command status register (30h in FIG. 23; FIG. 24A), the power supply controller (PSC) 46 recognizes that a command is sent from the CPU 21. The power supply controller (PSC) 46 reads the contents of the system command register (31h) to determine whether the contents represent a freeze mode "in-execution" command for invalidating the input operations of the operation switches (step S81 in FIG. 29).

If it is determined that the freeze mode is being set, the power switch (PS) 80 and the reset switch (RS) 81 are excluded from monitor control objects to invalidate the operations thereof. The flow continues power control processing including another monitor processing (step S88 in FIG. 29).

This monitor processing for excluding the power switch (PS) 80 and the reset switch (RS) 81 from the monitor control objects to invalidate the operations thereof continues until a command representing an end of the freeze mode is set in the system command register (31h) and the power supply controller (PSC) 46 decodes this command.

If the freeze mode is not set, it is determined whether the power switch (PS) 80 is depressed (step S82 in FIG. 29). If YES in step S82, and if the current state is a power-ON state, power-OFF processing is executed (steps S83 and S86 in FIG. 29). If the current state is the power-OFF state, power-ON processing is executed (steps S83 and S84 in FIG. 29).

In the power-ON state, it is determined whether the reset switch (RS) 81 is depressed (step S85 in FIG. 29). If YES in step S85, system resetting is informed to the CPU 21 in reset processing (step S87 in FIG. 29), and power supply control processing including other monitor processing operations is continued (step S88 in FIG. 29).

In this manner, during execution of the freeze mode, the power switch (PS) 80 and the reset switch (RS) 81 which are the monitor control objects are excluded from the monitor control objects, and their operations are invalidated. During execution of the freeze mode, even if the power switch (PS) 81 and the reset switch (RS) 81 are operated, data storage processing in the freeze mode can be properly performed without breaking the data at high reliability.

In the above embodiment, the gate array (GA) 26 having the dedicated registers 201 is interposed between the power supply controller (PSC) 46 and the CPU 21. However, registers required to data exchange between the power supply controller (PSC) 46 and the CPU 21 may be arranged in the power supply controller (PSC) 46 or any other functional circuit chip. The arrangement of the power supply circuit is not limited to the one shown in FIG. 21, but can be replaced with another arrangement.

In the above embodiment, the power switch (PS) 80 and the reset switch (RS) 81 are exemplified as monitor control objects for invalidating the operation inputs. However, the present invention is also applicable to any one of them, or any other operation equipment.

The sixth embodiment of the present invention will be described below.

In this embodiment, a remaining battery level is accurately calculated in accordance with the degree of degradation of battery performance. A remaining battery use time and a time required to fully charge the battery are directly displayed during discharging and charging, respectively, using not only percentage but also numerical values. For this purpose, a power supply microcomputer 89 comprises firmware 90 and registers 91. The firmware 90 has a battery monitor program 90a for monitoring a remaining level corresponding to the degree of performance degradation of a battery 85 and an I/F controller communication program 90b for transmitting the resultant remaining battery level display data. The registers 91 include a Vb register 91a for holding the sampled voltage value of the battery 85, an Ib register 91b for holding the sampled current value of the battery 85, a Cn counter 91*d* for mounting the remaining battery level, and a Cf register 91*c* for holding the count value of the Cn counter 91*d* in the fully charged state.

FIG. 30 shows the circuit arrangement of this embodiment. The battery 85 serves as an operation power supply. The power supply microcomputer 89 comprising a one-chip microcomputer is mounted on a power supply board 86. A system board 87 has main circuits of the system. A display section 88 comprises, e.g., a liquid crystal display panel.

The power supply voltage from the battery 85 is temporarily applied to the power supply board 86 and then the system board 87. During this period, the power supply microcomputer 89 on the power supply board 86 samples a battery voltage value and a battery current value, and monitor control is performed on the basis of the sampling values.

The power supply microcomputer 89 is installed with the battery monitor program 90*a* and the I/O controller communication program 90*b*, both of which serve as the firmware 90. At the same time, the registers 91 comprising the Vb register 91*a*, the Ib register 91*b*, the Cf register 91*c*, and the Cn counter 91*d* are arranged to execute these programs.

More specifically, the power supply microcomputer 89 is connected to an interface (I/F) controller 92 in the system board 87 through a data/address bus (D/A) bus. The power supply microcomputer 89 sends a data/address signal (D/A signal) and a read/write (R/W) signal to the interface controller 92, thereby performing display control of the remaining battery level.

The interface controller 92 is connected to a system BIOS (ROM) 93 on the system board 87 through an address bus (A bus) and a data bus (D bus). The interface controller 92 reads the display data of the remaining battery level from the power supply microcomputer 89 in accordance with the read/write signal (R/W signal) from the system BIOS 93 and causes the display section 88 to display the display data through the data bus (D bus).

Figure 31:
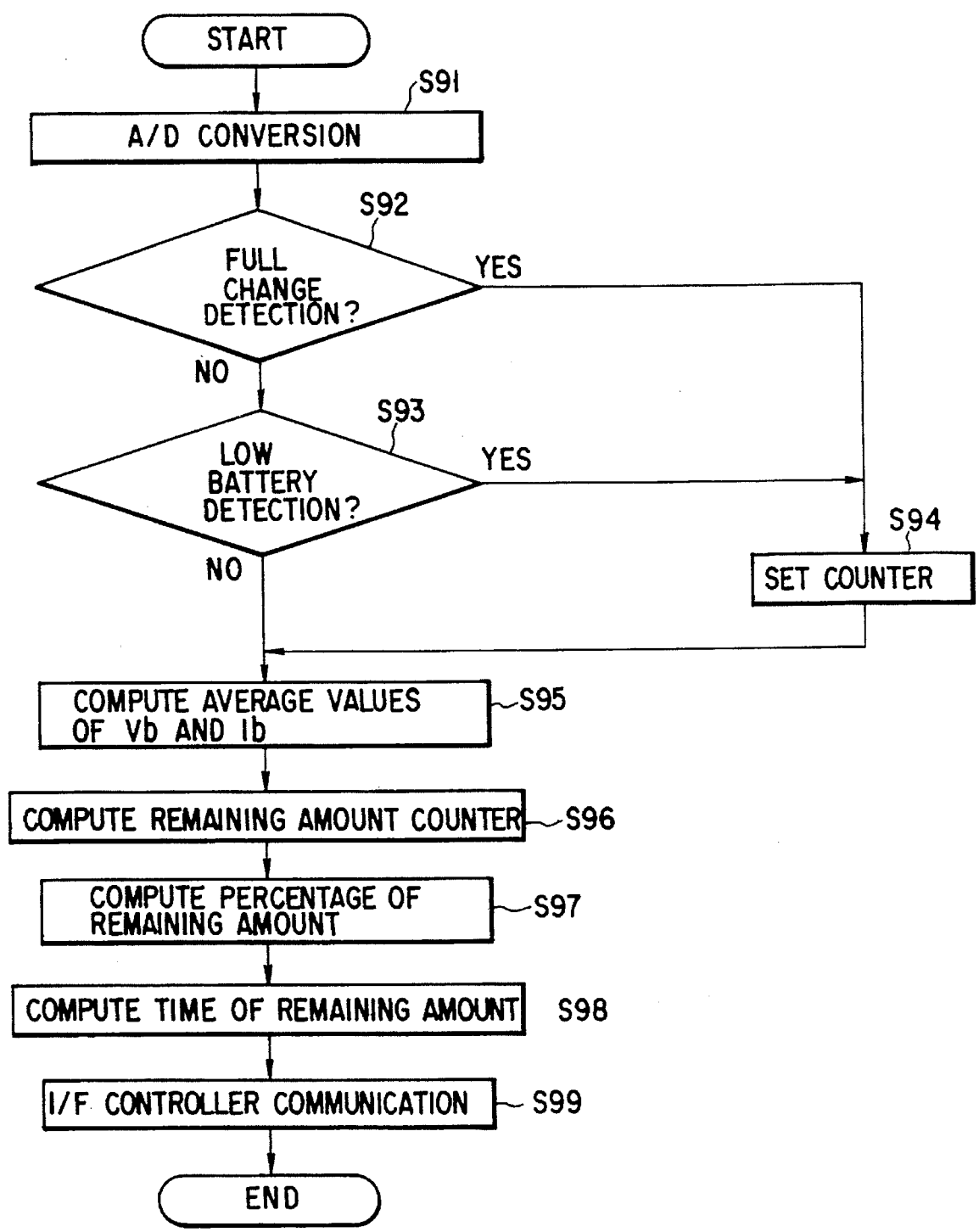
FIG. 31 is a flow chart showing battery monitor program processing in the sixth embodiment.

With the above arrangement, the power supply microcomputer 89 performs the operation control shown in FIG. 31 on the basis of mainly the battery monitor program 90*a*.

According to the battery monitor program 90*a*, the power supply microcomputer 89 samples voltage and current values of the battery 85 connected to the power supply board 86 every predetermined period, e.g., every 100 [ms] and independently A/D-converts the sampling values into 8-bit data (step S91). The power supply microcomputer 89 stores the resultant battery voltage value "Vb" and the resultant battery current value "Ib" in the Vb and Ib registers 91*a* and 91*b* of the registers 91, respectively. At this time, the power supply processor 89 determines on the basis of the sign of the battery current value "Ib" that the battery 85 is discharged or charged during the operation of the system.

The power supply microcomputer 89 then determines on the basis of the battery voltage value "Vb" held in the Vb register 91*a* whether the battery 85 is set in a fully charged state (step S92) or in a low battery state (step S93).

The fully charged state is determined when a value stored in the Cf register 91*c* in the previous fully charged state is equal to the count value of the Cn counter 91*d*. The low battery state is determined when the count value of the Cn counter 91*d* becomes, e.g., 5% of the value held in the Cf register 91*c* and the battery level is detected as 5%. When the fully charged state or the low battery state is detected, setting processing of the Cf register 91*c* and the Cn counter 91*d* is performed in correspondence with the detected state (step S94).

More specifically, when the fully charged state is detected, the present count value of the Cn counter 91*d* is directly transferred to the Cf register 91*c* and set therein when the low battery state is detected, a difference obtained by subtracting the count value of the Cn counter 91*d* from the value held in the Cf register 91*c* is set in the Cf register 91*c*. At the same time, the count value of the Cn counter 91*d* is reset to "0".

If the low battery state is not detected in step S93 or after setting processing of the Cf register 91*c* and the Cn counter 91*d* is performed in step S94, the power supply microcomputer 89 calculates a first average value "Vbs" of ten battery voltage values "Vb" stored within last one second in the Vb register 91*a* and a first average value "Ibs" of ten battery current values "Ib" stored within last one second in the Ib register 91*b*. In addition, the power supply microcomputer 89 calculates a second average value "Vbss" of fifteen first average battery voltage values "Vbs" stored within last fifteen seconds in the Vb register 91*a* and a second average value "Ibss" of fifteen first average battery current values "Ibs" stored within last fifteen seconds in the Ib register 91*b* (step S95).

The power supply microcomputer 89 then calculates a count value of the Cn counter 91*d* for counting the remaining battery level and sets the calculated count (step S96).

More specifically, if the battery 11 is set in the discharged state, the average battery value "Ibs" is subtracted from a count value "$C_{n-1}$" of the Cn counter 91*d* which is immediately preceding count (one second before the present count):

$$(C_{n-1})-\text{Ibs} \tag{1}$$

The resultant difference is set in the Cn counter 91*d*.

If the battery 85 is set in a charged state, the following operation is performed using the count value "$C_{n-1}$" of the Cn counter 91*d*, the first average battery current value "Ibs", and a charging efficiency "Ef" of the battery 85 as follows:

$$(C_{n-1})+\text{Ef}\times\text{Ibs} \tag{2}$$

The resultant value is set in the Cn counter 91*d*.

The count value of the Cn counter 91*d* is controlled to fall within the range defined such that the maximum count value of the Cn counter 91*d* is the value held in the Cf register 91*c*, and the minimum count value of the Cn counter is "0". The charging efficiency "Ef" is preset so that a change in count value of the Cn counter 91*d* in the charged state is set equal to that in the discharged state.

The following operation is performed using the present count value "Cn" of the Cn counter 91*d* and the value "Cf" held in the Cf register 91*c*:

$$(\text{Cn}/\text{Cf})\times100 \tag{3}$$

The resultant value is obtained as display data of the remaining battery level in percentage (step S97).

The following operation is performed using the second average battery current value "Ibss", the second average battery voltage value "Vvbss", and a nominal battery voltage value "Vtyp":

$$\text{Ibss}\times(\text{Vbss}/\text{Vtyp}) \tag{4}$$

The resultant value is obtained as an average battery discharge current value "Ityp". This average battery discharge current value "Ityp" is calculated only when the system is powered by the battery. Otherwise, the latest calculation value in the battery power-ON state is stored.

The power supply microcomputer 89 performs a division using the average battery discharge current value "Ityp" and the count value "Cn" of the counter 91*d* as follows:

$$Cn/Ityp \qquad (5)$$

The resultant quotient is obtained as the time display data of the remaining battery level in units of seconds.

After the percentage display data and the time display data of the remaining battery level are obtained, the power supply microcomputer 89 performs communication with the interface controller 92 on the system board 87 in accordance with the I/F controller communication program 90b. One of the above data is displayed on the display section 88 (step S99).

According to the I/F controller communication program 90b, one of the display data is selected in accordance with a switching command supplied from the system BIOS 93 on the system board 87 through the interface controller 92, and the selected display data is transmitted to the interface controller 92 of the system board 87 every predetermined interval. The display section 88 displays the remaining battery level in percentage or time in accordance with the input display data.

In this case, the time display data is displayed as, e.g., "1:23 (one hour and twenty-three minutes)", or the percentage display data is displayed as, e.g., "45%".

If a calculation using the value "Cf" held in the Cf register 91c and the charging efficiency "Ef" of the battery 85 is performed in place of calculation (5) as follows:

$$(Cf-Cn)/(Ef \times Ityp) \qquad (6)$$

a time required to fully charge the battery 85 in the charged state can be obtained in units of seconds.

The seventh embodiment of the present invention will be described below. In this embodiment, a state display status LCD 44 is arranged as a sub-display in addition to an LCD panel 49 used as a main display. Various operating states are displayed by the ON/OFF states of icons on the status LCD 44. For this reason, the user can check the current operation mode with icons while executing an application program. Switching between various operation modes is designated with hot keys. Hot key data is transmitted to a CPU 21 by means of a non-maskable interrupt such as an SMI interrupt. For this reason, the operation mode can be switched with a hot key even during execution of an application program.

A description will be made with reference to FIGS. 1 through 18 and FIGS. 32 through 48.

First of all, the functions provided by hot keys will be described in detail with reference to FIG. 32.

Each hot key is designated by dual or simultaneous depression of an [Fn] key and any other key. As shown in FIG. 32, the following function are supported by combinations of the [Fn] key and other keys.

[Fn]+[F1]: instant security

[Fn]+[F2]: switching of power save mode

[Fn]+[F3]: switching of resume/boot mode

[Fn]+[F4]: switching of speaker volume

[Fn]+[F5]: switching of LCD/CRT display

[Fn]+[F6]: switching of monochrome inverted display of LCD panel

[Fn]+[F7]: undefined

[Fn]+[FS]: undefined

[Fn]+[F9]: undefined

[Fn]+[F10]: overlay of keyboard (Arrow mode)

[Fn]+[F11]: overlay of keyboard (Numeric mode)

[Fn]+[F12]: scroll lock of keyboard

[Fn]+[→]: contrast up of LCD panel

[Fn]+[→]: contrast down of LCD panel

[Fn]+[↑]: up back light brightness of LCD panel

[Fn]+[↓]: down back light brightness of LCD panel

Data transmitted from a keyboard controller (KBC) 30 to the CPU 21 is the scan code of a specific key simultaneously depressed with the [Fn] key. For this reason, in the SMI processing routine started by the SMI interrupt, the CPU 21 reads the scan code and executes processing designated by the read scan code. When the SMI signal is supplied to the CPU 21, the SMI processing routine is immediately started because the SMI processing routine is a program residing in the main memory. At this time, an application program under execution is not adversely affected by the SMI processing routine.

Figure 33:
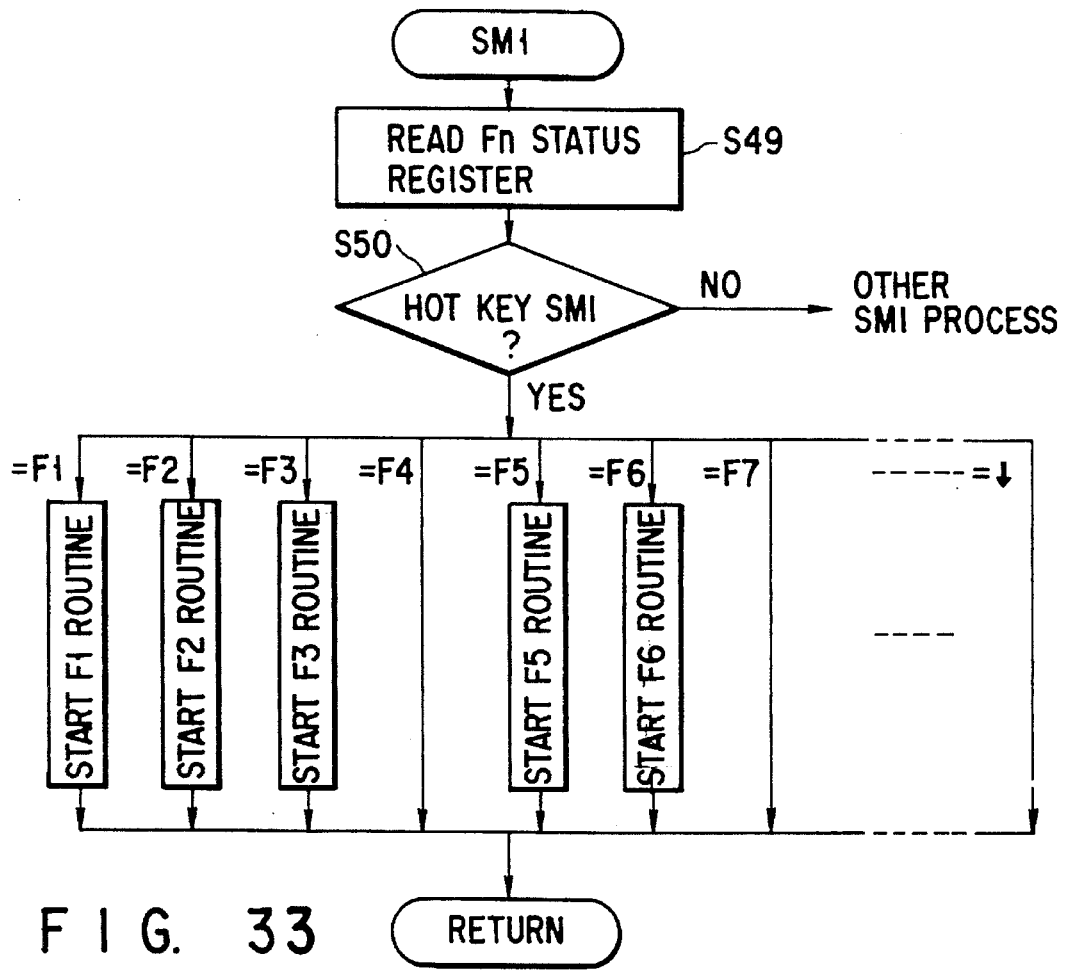
FIG. 33 is a flow chart for explaining the sequence of an SMI processing routine executed by a CPU arranged in the portable computer of the seventh embodiment.
Figure 34:
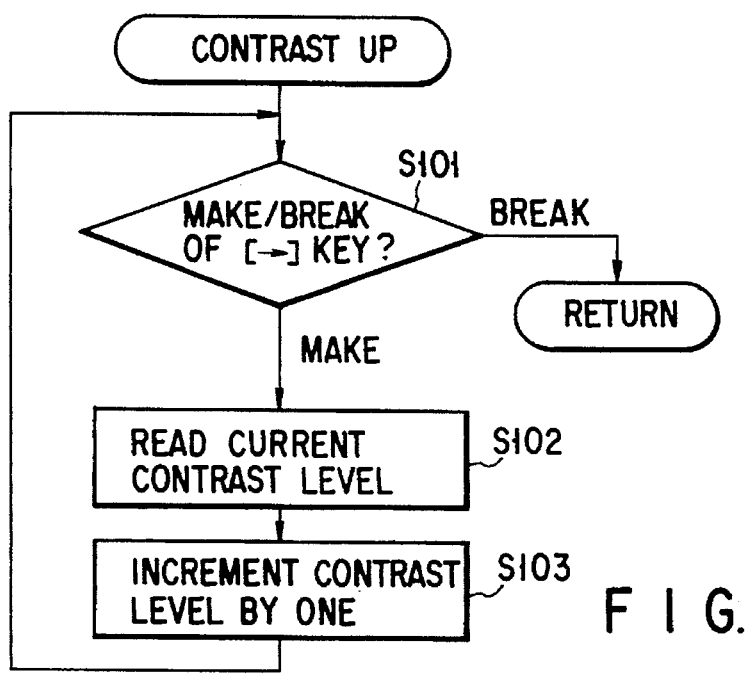
FIG. 34 is a flow chart for explaining contrast up processing for an LCD panel which is executed by a power supply controller arranged in the portable computer of the seventh embodiment.
Figure 35:
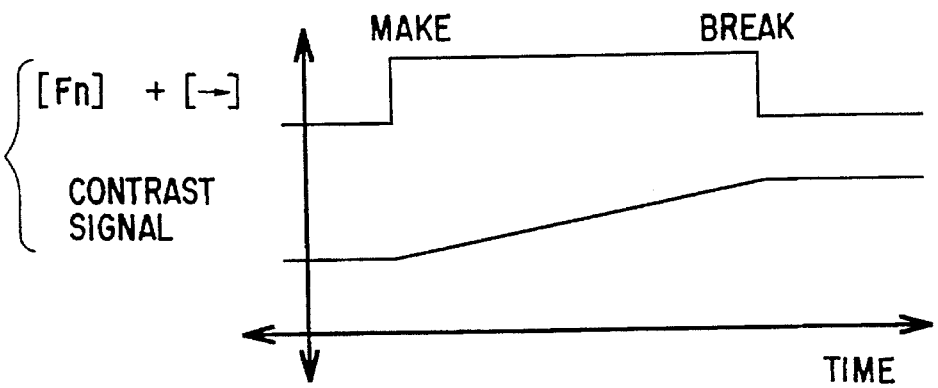
FIG. 35 is a timing chart showing a state of change in contrast in the contrast up processing of FIG. 34.
Figure 36:
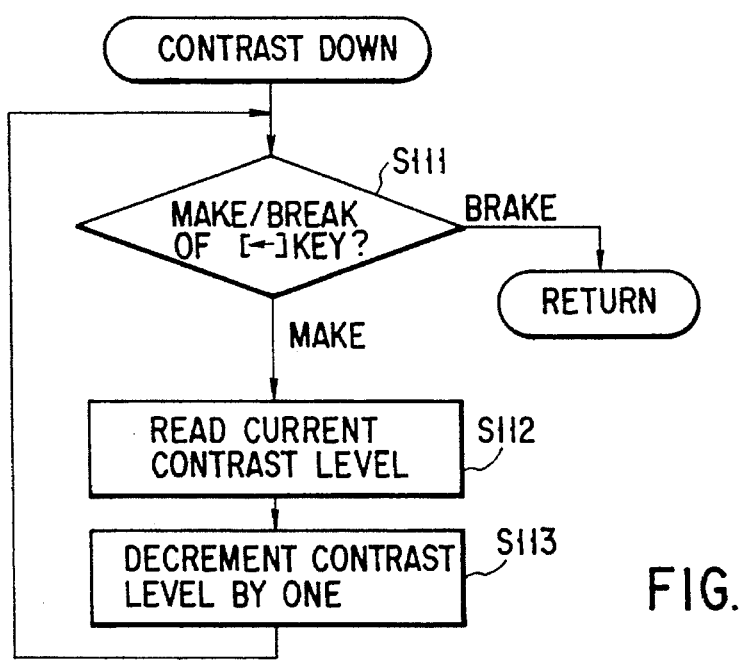
FIG. 36 is a flow chart for explaining contrast down processing for the LCD panel which is executed by the power supply controller arranged in the portable computer of the seventh embodiment.
Figure 37:
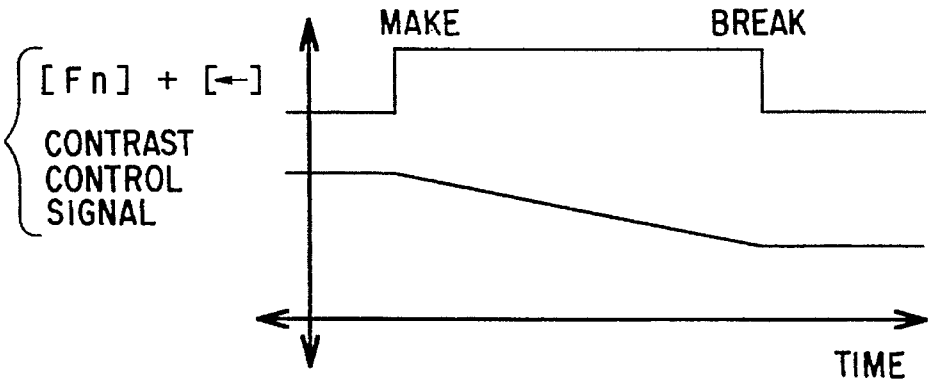
FIG. 37 is a timing chart showing a state of change in contrast in the contrast down processing of FIG. 36.
Figure 38:
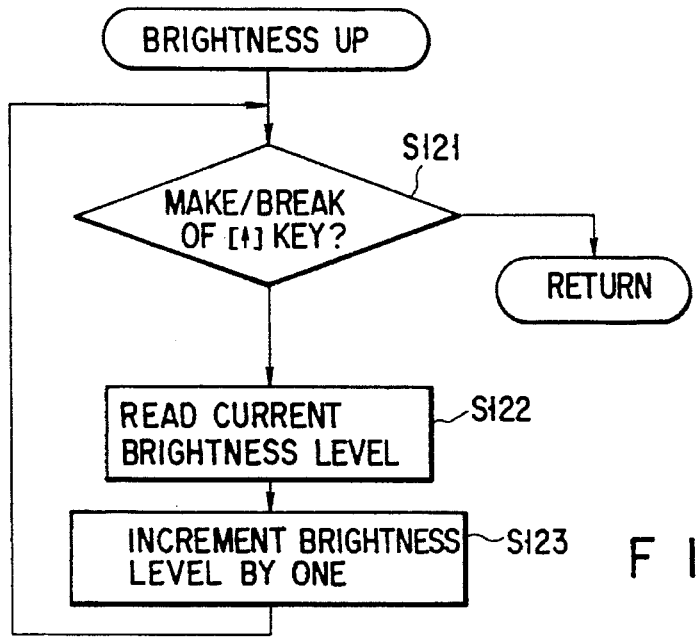
FIG. 38 is a flow chart for explaining brightness up processing for the LCD panel which is executed by the power supply controller arranged in the portable computer of the seventh embodiment.
Figure 39:
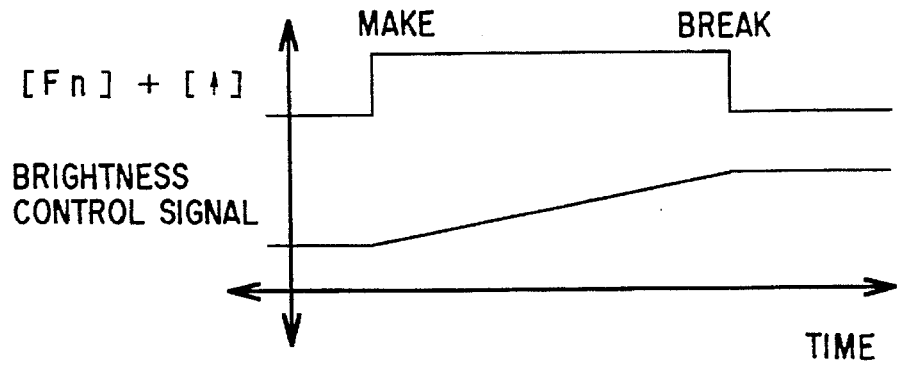
FIG. 39 is a timing chart showing a state of change in brightness in the brightness up processing of FIG. 38.
Figure 40:
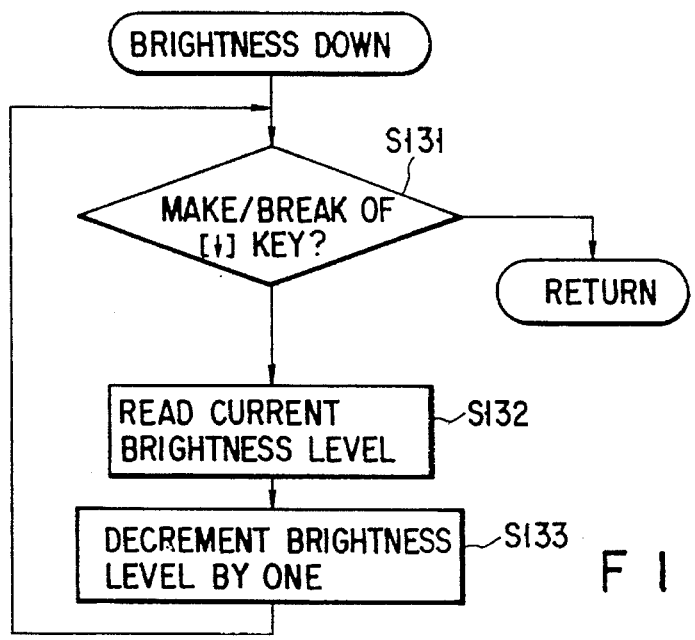
FIG. 40 is a flow chart for explaining brightness down processing for the LCD panel which is executed by the power supply controller arranged in the portable computer of the seventh embodiment.

FIG. 33 shows the flow chart of the SMI processing routine executed by the CPU 21.

The SMI processing routine is started when the SMI signal is supplied to the CPU 21. At this time, the CPU 21 read-accesses an Fn status register 101 in a status LCD control gate array (SLCDC GA) 26 through a system bus (ISA-BUS) 11 (step S49). The CPU 21 detects whether the hot key data is set to determine whether the SMI signal depends on a hot key or any other factor (step S50). If the data read from the Fn status register 101 coincides with any one of the scan codes of the [F1] through [F12] keys and the [→], [←], [↑], and [Λ] keys, the CPU 21 determines a hot key SMI. However, if NO in step S50, the CPU 21 determines that an SMI signal is generated due to any other factor. In this case, the CPU 21 sequentially read-accesses the registers in the status LCD control gate array (SLCDC GA) 26 in accordance with the predetermined priority order to check the SMI factor and performs the corresponding processing.

If the hot key SMI is detected, the CPU 21 performs the following processing in accordance with the contents of the scan code.

That is, when the CPU 21 detects that the read scan code corresponds to the [F1] key, the CPU 21 performs processing (F1 routine) for realizing the instant security function. Similarly, if the read scan code corresponds to the [F2] key, the CPU 21 performs processing (F2 routine) for realizing the power save mode switching function. If the read scan code corresponds to the [F3] key, the CPU 21 performs processing (F3 routine) for realizing the resume/boot mode switching function. If the read key code corresponds to the [F5] key, the CPU 21 performs processing (F5 routine) for realizing the LCD/CRT display switching function. If the read key code corresponds to the [F6] key, the CPU 21 performs processing (F6 routine) for realizing switching of the monochrome inverted display of the LCD panel.

If the read scan key corresponds to any one of the F4, [F7] through [F12], [→], [←], [↑], and [↓] keys, the CPU 21 does not perform any operation and returns from the SMI processing routine to the main routine due to the following reasons. The functions of the [F7] through [F9] are undefined, the functions designated by the [F10] to [F12] are executed by the keyboard controller (KBC) 30, and the functions designated by the [F4], [→], [←], [↑], and [↓] keys are executed by a power supply controller (PSC) 46.

First of all, the hot key functions executed by the keyboard controller (KBC) 30 will be described below.

The functions executed by the keyboard controller (KBC) 30 are the overlay (Arrow mode) function designated by [Fn]+[F10], the overlay (Numeric mode) function designated by the [Fn]+[F11] keys, and the scroll lock function designated by the [Fn]+[F12] keys.

The Arrow mode is a mode using some keys on a keyboard 51 as arrow keys (cursor keys). Every time the

[Fn] and [F10] keys are simultaneously depressed, the modes are toggled in an order of "Arrow mode"→"normal key mode"→ . . . The default in the power-ON operation is the "normal key mode". When the [Fn] and [F10] are simultaneously depressed in this state, the keyboard controller (KBC) 30 changes the mode from the "normal key mode" to the "Arrow mode" and updates the value of the display control register in the status LCD control gate array (SLCDC GA) 26. The keyboard controller (KBC) 30 then turns off the letter icon and turns on the cursor icon in the status LCD 44. When the [Fn] and [F10] keys are simultaneously depressed again, the keyboard controller (KBC) 30 changes the current mode from the "Arrow mode" to the "normal key mode" and updates the values of the display control register in the status LCD control gate array (SLCDC GA) 26. The keyboard controller (KBC) 30 then turns on the letter icon and turns off the cursor icon in the status LCD 44.

The Numeric mode is a mode using some keys on the keyboard 51 as numeric keys (ten keys). Every time the [Fn] and [F11] keys are simultaneously depressed, the mode is toggled in an order of the "Numeric mode"→"normal key mode"→ . . . The default upon the power-ON operation is the "normal key mode". When the [Fn] and [F11] are simultaneously depressed in this state, the keyboard controller (KBC) 30 changes the mode from the "normal key mode" to the "Numeric mode" and updates the value of the display control register in the status LCD control gate array (SLCDC GA) 26. The keyboard controller (KBC) 30 then turns off the letter icon and turns on the numeric key pad icon in the status LCD 44. When the [Fn] and [F11] keys are simultaneously depressed again, the keyboard controller (KBC) 30 changes the current mode from the "Numeric mode" to the "normal key mode" and updates the values of the display control register in the status LCD control gate array (SLCDC GA) 26. The keyboard controller (KBC) 30 then turns on the letter icon and turns off the numeric key pad icon in the status LCD 44.

The scroll lock mode is a mode for inhibiting scrolling (roll up/roll down) of the display screen under the control of, e.g., an application program. Every time the [Fn] and [F12] keys are simultaneously depressed, the mode is toggled in an order of the "scroll lock ON"→"scroll lock OFF"→ . . . The default upon the power-ON operation is the "scroll lock OFF". When the [Fn] and [F12] are simultaneously depressed in this state, the keyboard controller (KBC) 30 changes the mode from the "scroll lock OFF" to the "scroll lock ON" and updates the value of the display control register in the status LCD control gate array (SLCDC GA) 26. The keyboard controller (KBC) 30 then turns on the scroll icon in the status LCD 44. When the [Fn] and [F12] keys are simultaneously depressed again, the keyboard controller (KBC) 30 changes the current mode from the "scroll lock ON" to the "scroll lock OFF" and updates the values of the display control register in the status LCD control gate array (SLCDC GA) 26. The keyboard controller (KBC) 30 then turns off the scroll icon in the status LCD 44.

The hot key functions executed by the power supply controller (PSC) 46 will be described below.

The functions executed by the power supply controller (PSC) 46 are a speaker volume switching function designated by the [Fn]+[F4] keys, the LCD panel contrast up function designated by the [Fn]+[→] keys, the LCD panel contrast down function designated by the [Fn]+[←] keys, the LCD panel back light brightness up function designated by the [Fn]+[↑] keys, and the LCD panel back light brightness down function designated by the [Fn]+[↓] keys.

Since the speaker volume switching function has been described with reference to FIGS. 17 and 18, the contrast up/down function of the LCD panel 49 and the back light brightness up/down function of the LCD panel 49 will be described below.

The contrast up function of the LCD panel 49 is executed by a hot key operation using the [Fn]+[→] keys. While the dual hot key is kept depressed, the voltage value of the contrast control signal is kept increased to increase the contrast of the LCD panel 49. An operation for increasing the contrast of the LCD panel 49 by the power supply controller (PSC) 46 will be described with reference to FIGS. 34 and 35.

When the [Fn] and [→] keys on the internal keyboard 51 are simultaneously depressed, the scan code (make code) of the [→] key is set in the Fn status register 101 in the status LCD control gate array (SLCDC GA) 26. The power supply controller (PSC) 46 performs polling to periodically read the contents of the Fn status register 101. If the read contents represent the scan code (make code) of the [→] key (step S101), a digital value (contrast level) corresponding to the voltage level of the current contrast control signal is read (step S102), and the read value (contrast level) is incremented by one (step S103). The incremented digital value is D/A-converted and is supplied as a contrast control signal to the LCD panel 49.

Steps S101 through S103 are repeated during a period in which the scan code (make code) of the [→] key is kept set in the Fn status register 101. When the [Fn] and [→] keys on the internal keyboard 51 are released, the break code of the [4] key is set in the Fn status register 101 in the status LCD control gate array (SLCDC GA) 26. When the power supply controller (PSC) 46 reads out this break code, the power supply controller (PSC) 46 returns from the contrast up hot key processing to the main routine.

The contrast down function is executed by a hot key operation using the [Fn]+[←] keys while the dual hot key is kept depressed, the voltage value of the contrast control signal is kept decreased to decrease the contrast of the LCD panel 49. An operation for decreasing the contrast of the LCD panel 49 by the power supply controller (PSC) 46 will be described with reference to FIGS. 36 and 37.

When the [Fn] and [←] keys on the internal keyboard 51 are simultaneously depressed, the scan code (make code) of the [←] key is set in the Fn status register 101 in the status LCD control gate array (SLCDC GA) 26. The power supply controller (PSC) 46 performs polling to periodically read the contents of the Fn status register 101. If the read contents represent the scan code (make code) of the [←] key (step S111), a digital value (contrast level) corresponding to the voltage level of the current contrast control signal is read (step S112), and the read value (contrast level) is decremented by one (step S113). The decremented digital value is D/A-converted and is supplied as a contrast control signal to the LCD panel 49.

Steps S111 through S113 are repeated during a period in which the scan code (make code) of the [←] key is kept set in the Fn status register 101. When the [Fn] and [←] keys on the internal keyboard 51 are released, the break code of the [←] key is set in the Fn status register 101 in the status LCD control gate array (SLCDC GA) 26. When the power supply controller (PSC) 46 reads out this break code, the power supply controller (PSC) 46 returns from the contrast down hot key processing to the main routine.

As described above, in the contrast up/down function, while the [Fn] and [→] keys are simultaneously kept depressed, the contrast is continuously increased. The contrast is continuously decreased while the [Fn] and [←] keys are simultaneously kept depressed. For this reason, the user can arbitrarily adjust the contrast in accordance with the depression duration of the [Fn] and [→] or [Fn] and [←] keys.

The back light brightness up function of the LCD panel 49 is executed by a hot key operation using the [Fn] [↑] keys. While the dual hot key is kept depressed, the voltage value of the brightness control signal is kept increased to increase the back light brightness of the LCD panel 49. An operation for increasing the back light brightness of the LCD panel 49 by the power supply controller (PSC) 46 will be described with reference to FIGS. 38 and 39.

When the [Fn] and [↑] keys on the internal keyboard 51 are simultaneously depressed, the scan code (make code) of the [↑] key is set in the Fn status register 101 in the status LCD control gate array (SLCDC GA) 26. The power supply controller (PSC) 46 performs polling to periodically read the contents of the Fn status register 101. If the read contents represent the scan code (make code) of the [↑] key (step S121), a digital value (brightness level) corresponding to the voltage level of the current brightness control signal is read (step S122), and the read value (brightness level) is incremented by one (step S123). The incremented digital value is D/A-converted and is supplied as a brightness control signal to the LCD panel 49.

Steps S121 through S123 are repeated during a period in which the scan code (make code) of the [↑] key is kept set in the Fn status register 101. When the [Fn] and [↑] keys on the internal keyboard 51 are released, the break code of the [↑] key is set in the Fn status register 101 in the status LCD control gate array (SLCDC GA) 26. When the power supply controller (PSC) 46 reads out this break code, the power supply controller (PSC) 46 returns from the back light brightness up hot key processing to the main routine.

The back light brightness down function is executed by a hot key operation using the [Fn]+[↓] keys. While the dual hot key is kept depressed, the voltage value of the brightness control signal is kept decreased to decrease the back light brightness of the LCD panel 49. An operation for decreasing the back light brightness of the LCD panel 49 by the power supply controller (PSC) 46 will be described with reference to FIGS. 40 and 41.

When the [Fn] and [↓] keys on the internal keyboard 51 are simultaneously depressed, the scan code (make code) of the [↓] key is set in the Fn status register 101 in the status LCD control gate array (SLCDC GA) 26. The power supply controller (PSC) 46 performs polling to periodically read the contents of the Fn status register 101. If the read contents represent the scan code (make code) of the [↓] key (step S131), a digital value (brightness level) corresponding to the voltage level of the current brightness control signal is read (step S132), and the read value (brightness level) is decremented by one (step S133). The decremented digital value is D/A-converted and is supplied as a brightness control signal to the LCD panel 49.

Steps S131 through S133 are repeated during a period in which the scan code (make code) of the [↓] key is kept set in the Fn status register 101. When the [Fn] and [↓] keys on the internal keyboard 51 are released, the break code of the [↓] key is set in the Fn status register 101 in the status LCD control gate array (SLCDC GA) 26. When the power supply controller (PSC) 46 reads out this break code, the power supply controller (PSC) 46 returns from the brightness down hot key processing to the main routine.

As described above, in the brightness up/down function, while the [Fn] and [↑] keys are simultaneously kept depressed, the brightness is continuously increased. The brightness is continuously decreased while the [Fn] and [↑] keys are simultaneously kept depressed. For this reason, the user can arbitrarily adjust the brightness in accordance with the depression duration of the [Fn] and [↑] or [Fn] and [↓] keys.

The F1, F2, F3, F5, and F6 routines executed by the [Fn]+[F1] keys will be described below.

FIG. 42 shows the F1 routine for executing the instant security function designated by the [Fn]+[F1] keys.

If the scan code read from the Fn status register 101 corresponds to the [F1] key, the CPU 21 transfers a command to a VGA controller 32 and the power supply controller (PSC) 46 to turn off the screen of the LCD panel 49 (step S141). In this case, transfer of video data from the VGA controller 32 to the LCD panel 49 is stopped, and power supply to the back light of the LCD panel 49 under the control of the power supply controller (PSC) 46 is stopped. The command is transferred from the CPU 21 to the power supply controller (PSC) 46 through the status LCD control gate array (SLCDC GA) 26 and a power supply interface bus (PSC-BUS) 14.

The CPU 21 then transfers the command (key lock instruction) to the keyboard controller (KBC) 30 to designate key lock (step S142). This command transfer is performed through the status LCD control gate array (SLCDC GA) 26 and a keyboard interface bus (KBC-BUS) 13. Upon reception of the key lock command, the keyboard controller (KBC) 30 reads out a password from a predetermined register of a PCMCIA gate array (PCMCIA GA) 28. Thereafter, the password is collated with key data input by the user from the keyboard 51. Key data transmission is interrupted (key lock) until the password coincides with the input key data. If the password coincides with the input key data, the keyboard controller (KBC) 30 informs the CPU 21 of data "1" representing the password coincidence by means of SMI transmission. At the same time, the keyboard controller (KBC) 30 releases the key lock.

When the CPU 21 receives an SMI signal in the F1 routine, the CPU 21 read-accesses a predetermined register in the status LCD control gate array (SLCDC GA) 26. If data "1" is set in this predetermined register, the CPU 21 determines that password collation is successfully performed (step S143). The CPU 21 transfers the commands to the VGA controller 32 and the power supply controller (PSC) 46 to turn on the screen of the LCD panel 49 (step S144). In this case, video data transfer from the VGA controller 32 to the LCD panel 49 is restarted, and at the same time the power supply to the LCD panel 49 under the control of the power supply controller (PSC) 46 is also restarted.

Note that the flow may temporarily return from the F1 routine to the main routine after the CPU 21 issues the key lock instruction in step S52, and that the flow may return to the F1 routine upon generation of the SMI signal, thereby starting processing from step S53. In this case, the CPU 21 executes an application program or the like during a period until the F1 routine is restarted after it is ended. However, since the display screen is kept OFF and the key lock is not released yet, processing of the application program seems to be interrupted.

FIG. 43 shows the F2 routine for realizing the power save mode switching function designated by the [Fn] and [F2] keys.

If the scan code read from the Fn status register 101 corresponds to the [F2] key, the CPU 21 reads the current power save mode from the CMOS memory (step S151). The power save modes are toggled in an order of "full power"→

"economy"→"low power"→"user setting"→ . . . (step S152). If the current mode is the economy mode, it is changed to the lower power mode. Thereafter, the CPU 21 changes the CPU clock, the CPU sleep mode, the HDD auto OFF mode, the display auto OFF mode, and the like in accordance with the newly set power save mode (step S153). At the same time, the value of the display control register in the status LCD control gate array (SLCDC GA) 26 is updated to update the display state of the tap water faucet icon in the status LCD 44 (step S154).

The set states of the CPU clock, the CPU sleep mode, the HDD auto OFF mode, the display auto OFF mode, and the like in each power save mode are summarized in FIG. 44. By these settings, the power consumption is largest in the full power mode and is reduced in an order of the economy mode and the lower power mode. In the user setting mode, the CPU clock frequency, the CPU sleep mode, the display auto OFF mode, and the HDD auto OFF mode can be arbitrarily designated.

Figure 45:
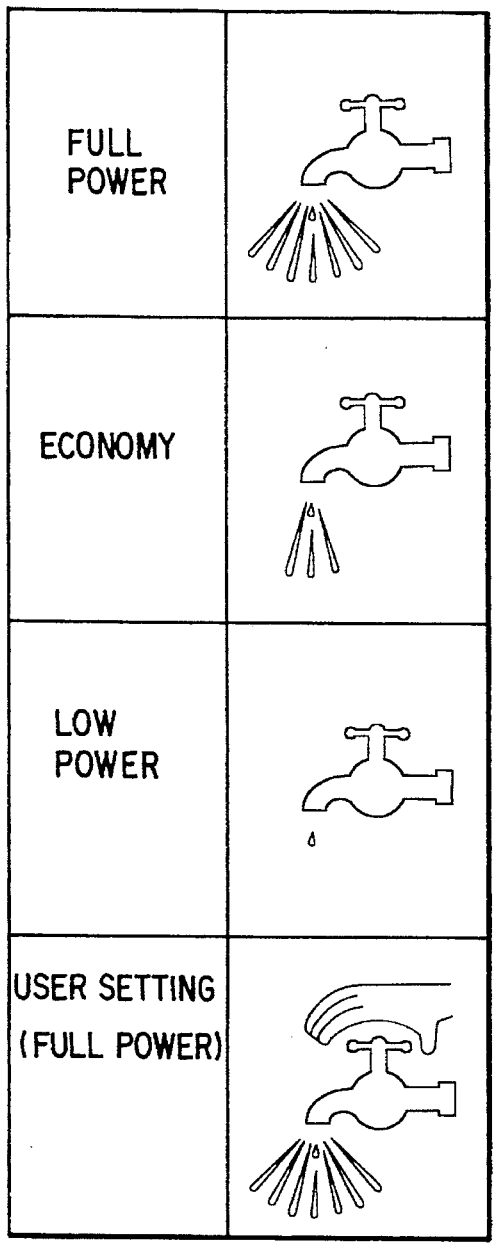
FIG. 45 is a view showing display states of tap water faucet icon in the respective modes switches by the power save mode switching function in FIG. 43.

The display states of the tap water faucet icons in the respective power save modes are shown in FIG. 45. As shown in FIG. 45, the number of water droplets of the tap water faucet icon is changed in accordance with the power consumption levels. All the water droplets are ON in the full power mode. Three water droplets are ON in the economy mode. Only one water droplet is ON in the low power mode. The number of water droplets in the user setting mode is determined in accordance with the set conditions of the CPU clock frequency, the CPU sleep mode, the display auto OFF mode, and the HDD auto OFF mode. In the user setting mode, a hand icon shown in FIG. 45 is always ON. This hand icon is OFF in the modes except for the user setting mode, i.e., the full power mode, the economy mode, and the low power mode.

Figure 46:
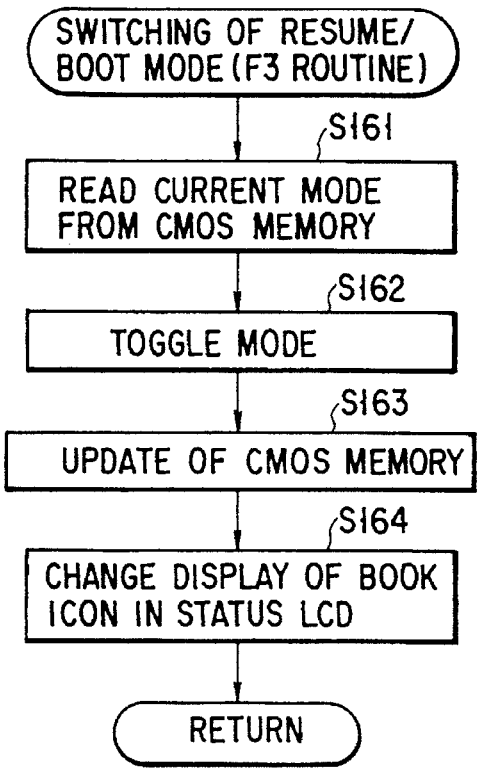
FIG. 46 is a flow chart for explaining an operation for realizing a resume/boot mode switching function executed by the CPU arranged in the portable computer of the seventh embodiment.

FIG. 46 shows the F3 routine for realizing the resume/ boot mode switching function designated by the [Fn]+[F3] keys.

If the scan code read from the Fn status register 101 corresponds to the [F3] key, the CPU 21 reads the current mode from the CMOS memory (step S161). This mode is toggled in an order of "resume"→"boot"→ . . . (step S162). If the current mode is the resume mode, this is changed to the boot mode. If the current mode is the boot mode, this is changed to the resume mode. Thereafter, the CPU 21 writes the change result in the CMOS memory (step S163) and at the same time updates the value of the display control register in the status LCD control gate array (SLCDC GA) 26. The ON/OFF state of the book icon in the status LCD 44 is changed (step S164). In this case, if the user wants to change the current mode from the boot mode to the resume mode, the book icon is set ON. However, if the user wants to change the current mode from the resume mode to the boot mode, the book icon is set OFF.

Figure 47:
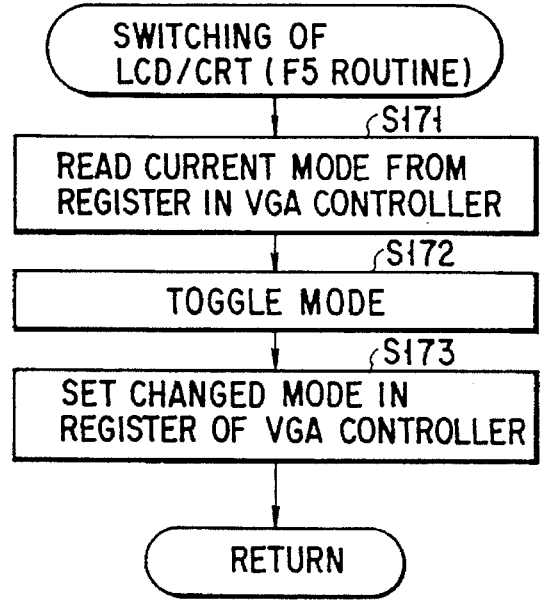
FIG. 47 is a flow chart for explaining an operation for realizing an LCD/CRT switching function executed by the CPU arranged in the portable computer of the seventh embodiment.

FIG. 47 shows the F5 routine for realizing the LCD/CRT display switching function designated by the [Fn]+[F5] keys.

The LCD/CRT switching function allows switching of the display apparatus regardless of the presence/absence of a CRT display 50 because information can be displayed on the CRT display 50 even if the CRT display 50 is connected after the power switch is turned on.

If the scan code read from the Fn status register 101 corresponds to the [F5] key, the CPU 21 reads the current mode from the register of the VGA controller 32 (step S171). The current mode is toggled in an order of "LCD"→ "simultaneous display"→"RT" . . . (step S172). If the current mode is, for example, the display mode using only the LCD, the current mode is changed to the simultaneous display mode of the LCD and CRT. The CPU 21 sets the data designating the changed mode in the register in the VGA controller 32 (step S173). For example, in switching from "LCD" to "simultaneous display", the CPU 21 controls the VGA controller 32 to set the data in the register thereof so as to also display information on the external display. However, in switching from "simultaneous display" to "CRT", the CPU 21 sets data in the register of the VGA controller 32 to allow display on only the external display. At the same time, the CPU 21 sends a command to the status LCD control gate array (SLCDC GA) 26 and to the power supply controller (PSC) 46 through the power supply interface bus (PSC-BUS) 14, thereby powering off the LCD panel 49. In switching from "CRT" to "LCD", the CPU 21 sets data in the register of the VGA controller 32 to allow display on only the LCD 49. At the same time, the CPU 21 sends a command to the status LCD control gate array (SLCDC GA) 26 and to the power supply controller (PSC) 46 through the power supply interface bus (PSC-BUS) 14, thereby powering on the LCD panel 49.

Figures 48, 50:
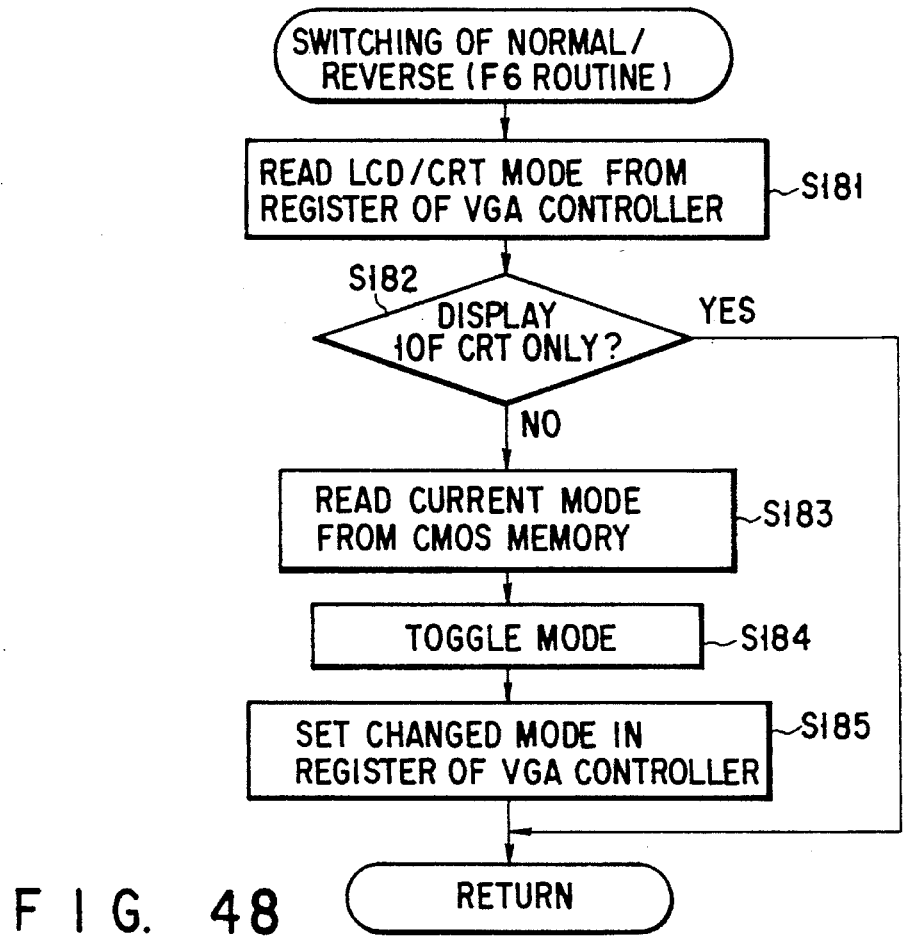
FIG. 48 is a flow chart for explaining an operation for realizing a normal/reverse display switching function of the LCD panel which is realized by the CPU arranged in the portable computer of the seventh embodiment.
FIG. 50 is a table showing a relationship between the states of PDP pins and their definition contents in the eighth embodiment.

FIG. 48 shows the F6 routine for realizing switching of monochrome inverted display of the LCD display, which is designated by the [Fn]+[F6] keys.

The switching of monochrome inverted display is not performed in the display mode using only the CRT display. For this reason, if the scan code read from the Fn status register 101 corresponds to the [F6] key, the CPU 21 reads the current display mode from the register of the VGA controller 32 (step S181) to determine whether the display mode using only the CRT display is set (step S182). If YES in step S182, the CPU 21 does not perform any operation and returns from the F6 routine to the main routine.

If NO in step S182, the CPU 21 read-accesses the CMOS memory to determine whether the current LCD monochrome inverted display mode is a normal or reverse mode (step S183). The CPU 21 toggles the current mode in an order of "normal" "reverse" . . . (step S184). If the current mode is the normal mode, the current mode is changed to the reverse mode. Otherwise, the current mode is changed to the normal mode. Thereafter, the CPU 21 sets data for designating the changed mode in the register of the VGA controller 32 (step S185).

The hot key functions executed by the keyboard controller (KBC) 30 will be described below.

The functions executed by the keyboard controller (KBC) 30 are the overlay (Arrow mode) function designated by the [Fn]+[F10] keys, the overlay (Numeric mode) designated by the [Fn]+[F11] keys, and the scroll lock function designated by the [Fn]+[F12]keys.

The Arrow mode is a mode using some keys on the keyboard 51 as arrow keys (cursor keys). Every time the [Fn] and [F10] keys are simultaneously depressed, the modes are toggled in an order of "Arrow mode"→"normal key mode"→ . . . The default in the power-ON operation is the "normal key mode". When the [Fn] and [F10] are simultaneously depressed in this state, the keyboard controller (KBC) 30 changes the mode from the "normal key mode" to the "Arrow mode" and updates the value of the display control register in the status LCD control gate array (SLCDC GA) 26. The keyboard controller (KBC) 30 then turns off the letter icon and turns on the cursor icon in the status LCD 44. When the [Fn] and [F10] keys are simultaneously depressed again, the keyboard controller (KBC) 30 changes the current mode from the "Arrow mode" to the "normal key mode" and updates the values of the display control register in the status LCD control gate array (SLCDC GA) 26. The keyboard controller (KBC) 30 then turns on the letter icon and turns off the cursor icon in the status LCD 44.

The Numeric mode is a mode using some keys on the keyboard 51 as numeric keys (ten keys). Every time the [Fn] and [F11] keys are simultaneously depressed, the mode is toggled in an order of the "Numeric mode"→"normal key mode"→ . . . The default upon the power-ON operation is the "normal key mode". When the [Fn] and [F11] are simultaneously depressed in this state, the keyboard controller (KBC) 30 changes the mode from the "normal key mode" to the "Numeric mode" and updates the value of the display control register in the status LCD control gate array (SLCDC GA) 26. The keyboard controller (KBC) 30 then turns off the letter icon and turns on the numeric key pad icon in the status LCD 44. When the [Fn] and [F11] keys are simultaneously depressed again, the keyboard controller (KBC) 30 changes the current mode from the "Numeric mode" to the "normal key mode" and updates the values of the display control register in the status LCD control gate array (SLCDC GA) 26. The keyboard controller (KBC) 30 then turns on the letter icon and turns off the numeric key pad icon in the status LCD 44.

The scroll lock mode is a mode for inhibiting scrolling (roll up/roll down) of the display screen under the control of, e.g., an application program. Every time the [Fn] and [F12] keys are simultaneously depressed, the mode is toggled in an order of the "scroll lock ON"→"scroll lock OFF"→ . . . The default upon the power-ON operation is the "scroll lock OFF". When the [Fn] and [F12] are simultaneously depressed in this state, the keyboard controller (KBC) 30 changes the mode from the "scroll lock OFF" to the "scroll lock ON" and updates the value of the display control register in the status LCD control gate array (SLCDC GA) 26. The keyboard controller (KBC) 30 then turns on the scroll icon in the status LCD 44. When the [Fn] and [F12] keys are simultaneously depressed again, the keyboard controller (KBC) 30 changes the current mode from the "scroll lock ON" to the "scroll lock OFF" and updates the values of the display control register in the status LCD control gate array (SLCDC GA) 26. The keyboard controller (KBC) 30 then turns off the scroll icon in the status LCD 44.

As described above, in the portable computer of this embodiment, the status LCD 44 for displaying the states of the portable computer is arranged as a sub-display in addition to the LCD panel 49 used as the main display. The various operating states are displayed by the ON/OFF states of the icons on the status LCD 44. In this case, the display control data on the LCD panel 49 are set in the register group of the status LCD control gate array (SLCDC GA) 26 by the CPU 21, the keyboard controller (KBC) 30, and the power supply controller (PSC) 46. The ON/OFF states of the icons on the status LCD 44 are controlled in accordance with these display control data. As described above, the status LCD 44 for displaying the operating states of the portable computer is arranged, and display control of the status LCD 44 is performed independently of display control of the LCD panel 49 serving as the main display. For this reason, the current operation mode can always be displayed with the icons. Therefore, the user can check the current operation mode with the icons while executing an application program.

In the embodiment, the switching instruction for each operation mode is designated by the corresponding hot key, and the hot key data is transmitted to the CPU 21 by a non-maskable interrupt such as an SMI. The interrupt is not masked by the application program under execution. Hot key data can be accepted regardless of execution of various application programs, thereby switching the operation mode. At this time, the switching result of the operation mode is reflected on the status LCD 44. Therefore, the operation mode can be switched regardless of the application program under execution, and the switching result can be checked on the status LCD 44.

The eighth embodiment of the present invention will be described below. In this embodiment, a DRAM card mounted with a ROM such as a serial EEPROM which stores card configuration information can be used even if the operating voltages of the ROM and the DRAM are different from each other. In this embodiment, an EEPROM 232 which stores card configuration information including operating voltage information of a DRAM 231 is mounted on a DRAM card 24, when this card 24 is mounted in a card slot 20, power supply voltages can be applied from a DRAMVCC 241 and an EEPROMVCC 243 to the DRAM 231 and the EEPROM 232, respectively. When the system is to be powered on, pins PD8 through PD6 of PD pin lines 244 are switched to the output mode, and the pin PD5 is set in the input mode. The card configuration information output from an SO terminal of the DRAM 231 is read from the pint PD5. A power supply voltage of operating voltage information of the card configuration information is applied to the DRAM-VCC 241.

This embodiment will be described with reference to FIGS. 1 and 49 through 53.

FIG. 49 shows the DRAM card 24 and its peripheral arrangement.

The DRAM card 24 is a new DRAM card which has specifications complying with the JEIDA standards and in which "EXPANSION" complying with these standards is defined. In addition to the DRAM 231 serving as an expanded memory of a system memory 23 shown in FIG. 1, the EEPROM (serial EEPROM) 232 which stores the card configuration information is mounted on the DRAM card 24.

The EEPROM 232 is a serial EEPROM operative in the wide power supply voltage range of, e.g., 3 through 5 V. The EEPROM 232 has a VCC (power supply) terminal, a CS (chip select) terminal, a CK (clock) terminal, an SI (serial input data) terminal, and the SO (serial output data) terminal.

The card configuration information stored in the EEPROM 232 includes standard card configuration information assigned to the eight JEIDA PD pins (PD8 through PD1), expanded card configuration information which cannot be expressed by the standard card configuration information, and operating voltage information representing an optimal power supply voltage required for operating the DRAM 231.

An inverter 233 operated at the same power supply voltage as that of the EEPROM 232 to invert the CS input to the EEPROM 232, and a pull-up resistor 234 are mounted on the DRAM card 24. This pull-up resistor 234 is used to maintain the input to the inverter 233 at high level.

The card slot 20 for receiving the DRAM card 24 is connected to the DRAM power supply lines (DRAMVCC) 241 for applying a power supply voltage to the DRAM 231, an interface signal line group 242 used to transfer interface signals to the DRAM 231, and the EEPROM power supply lines (EEPROMVCC) 243 for applying a power supply voltage to the EEPROM 232. Each of the DRAMVCC 241 and the EEPROMVCC 243 comprises a plurality of lines (four in this embodiment, although not shown). The interface signal line group 242 is operated at the same voltage level as that of the DRAMVCC 241.

The PD pin line group 244 consisting of eight signal lines used to read the card configuration information from the system (personal computer main body) side and access the EEPROM 232, and a common ground line (GND) 245 are connected to the card slot 20. The PD pin line group 244 is operated at the same voltage level as that of the EEPROMVCC 243. Pull-up resistors 246 are connected between the EEPROMVCC 243 and the eight signal lines constituting the PD pin line group 244, respectively.

The DRAM card 24 and its peripheral arrangement will be described in detail (A) when viewed from the system side, (B) when viewed from the DRAM card 24 side, and (C) in view of the signal list of the card slot 20.

(A) when Viewed From System Side

The eight signal lines constituting the PD pin line group 244 correspond to the eight JEIDA PD pins (PD1 through PD1) and are pulled up by the independent pull-up resistors 246, respectively. The eight signal lines are then connected to I/O ports of the system (personal computer main body). The I/O ports are normally set in the input port, and the system side (a CPU 21 shown in FIG. 1) monitors the states of the PD pins of the card slot 20.

when the DRAM card 24 is not mounted in the card slot 20, all the signal lines (PD pins) of the PD pin line group 24 are open (NC; No Connect) and are set at high level (H) by the corresponding pull-up resistors 246. In this case, the system side detects "No Card", as shown in FIG. 50.

When the DRAM card 24 having the EEPROM 232 therein is mounted in the card slot 20, the PD pin line group 24 is set such that the pin PD4 is connected to the GND 245 and set at low level (L), and the pins PD3 through PD1 are kept open (NC) and are kept at high level (H) by the corresponding pull-up resistors 246. The system side determines "EXPANSION" (FIG. 50) in accordance with the state (LHHH) of the pins PD4 through PD1.

At this time, the pin PD8 is connected to the CS terminal of the EEPROM 232, the pin PD7 is connected to the CK terminal of the EEPROM 232, the pin PD6 is connected to the SI terminal thereof, and the pin PD5 is connected to the SO terminal thereof. For this reason, on the system side, in the EXPANSION mode, the pins PD8, PD7, and PD6 are switched to the output mode pins for CS (chip select), CK (clock), and SI (serial input data). The pin PD 5 is used for SO (serious output data) in the input mode. The CS, CK, SI, and SO signals are general EEPROM interface signals as of a 93C56.

The DRAMVCC 241 is connected to the VCC terminal of the DRAM 231, and the EEPROMVCC 243 is connected to the VCC terminal of the EEPROM 232. A power supply voltage is applied from the DRAMVCC 241 to the DRAM 231, and a power supply voltage is applied from the EEPROMVCC 243 to the EEPROM 232.

If the DRAMVCC 241 generates a voltage of, e.g., 3.3 V, an interface signal with the DRAM 231 is applied at 3.3-V level. If the EEPROMVCC 243 generates a voltage of, e.g., 5 V, the signal level of each signal line (PD pin) of the PD pin line group 244 is also set at 5 V. At this time, an interface signal with the EEPROM 232 is also given at 5 V.

(B) When Viewed From DRAM Card 24

When the DRAM card 24 is mounted in the card slot 20, a signal obtained by inverting a signal at the pin PD8 by the inverter 233 is input to the CS terminal of the EEPROM 232 in the DRAM card 24. In this state, the pin PD8 (for the standard input mode for monitoring the PD pins) is set at high level until the system (CPU 21) recognizes the DRAM card 24 of the EXPANSION specifications and the pins PD8 through PD6 (used as output pins) are changed to an output mode as the EXPANSION mode. In this embodiment, the signal level at the pin PD8 is inverted to high level by the inverter 233, as described above, and the CS input to the EEPROM 232 is set at low level, thereby preventing chip selection. The pull-up resistor on the input side of the inverter 233 is arranged to perform protection when the proper operations of the pull-up resistors 246 of the PD pins on the system side cannot be expected. The pull-up resistor need not be used.

(C) Signal List of Card Slot 20

FIGS. 51 and 52 show the lists of signals in the card slot 20 so as to cause the pin numbers to correspond to the JEIDA signal names. In this case, RFUs represent pins reserved for future expansion.

As shown in FIGS. 51 and 52, the DRAMVCC 241 is connected to pins (pin numbers 9, 15, 27, and 37) defined as JEIDA 5-V power supply pins VCC(5 V), and the DRAMVCC 241 is connected to pins (pin numbers 11, 17, 25, and 35) defined as JEIDA 3.3-V power supply pins VCC(3.3 V).

The interface signal line group 242 serving as a path for transferring interface signals (MA13 through MA0, MD35 through MD0, RAS3#through RAS0#, CAS3# through CAS0#, and WE#) with the DRAM 231 is operated at the voltage level of the DRAMVCC 241. The PD pin group (PD8 through PD1) corresponding to the PD pin line group 244 is operated at the voltage level of the EEPROMVCC 243.

When a 3.3-V DRAM is used as the DRAM 231, and the EEPROM 232 and the I/O ports are operated at 5 V, a voltage of 3.3 V is applied to the DRAMVCC 241, and a voltage of 5 V is applied to the EEPROMVCC 243.

When a 3.3-V DRAM is used as the DRAM 231, and the EEPROM 232 and the I/O ports are operated at 3.3 V, a voltage of 3.3 V is applied to both the DRAMVCC 241 and the EEPROMVCC 243.

When a 5-V DRAM is used as the DRAM 231, and the EEPROM 232 and the I/O ports are operated at 5 V, a voltage of 5 V is applied to both the DRAMVCC 241 and the EEPROMVCC 243.

As in this embodiment, when a wide range EEPROM operated in the range of 3 V through 5 V is used as the EEPROM 232 and the input ports are operated at a voltage VR falling within the range of 3 V through 5 V, the voltage VR is applied to the EEPROMVCC 243.

These power supply voltages are applied from the power supply circuit (PS) 47 shown in FIG. 1.

Figure 53:
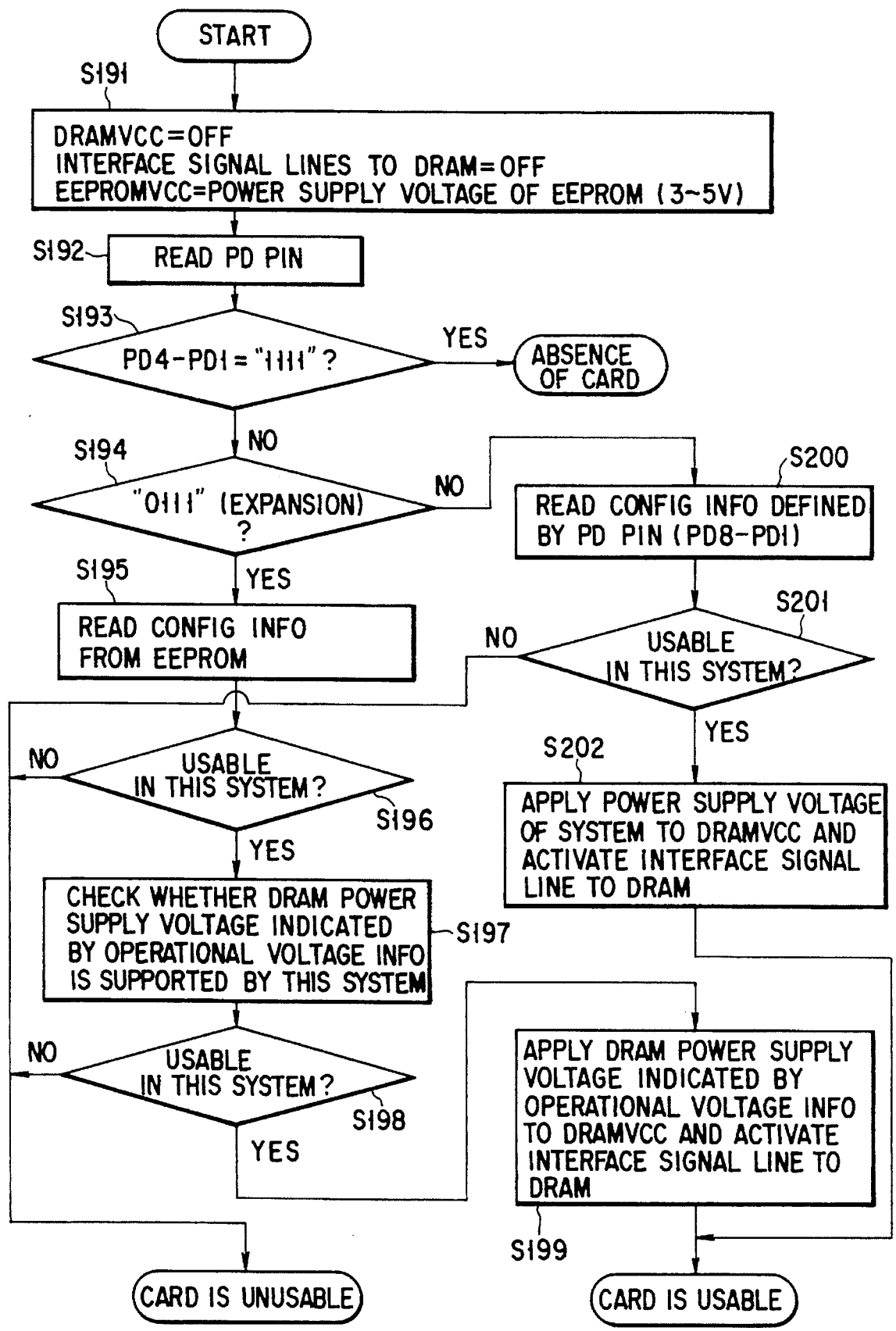
FIG. 53 is a flow chart for explaining a DRAM card control sequence according to the eighth embodiment.

Control of the DRAM card 24 having the above arrangement when the system is powered on will be described with reference to a flow chart in FIG. 53.

When the system is powered on, the CPU 21 transfers control information to a power supply controller (PSC) 46 through a system bus (ISA-BUS) 11, a status LCD control gate array (SLCDC GA) 26, and a power supply interface bus (PSC-BUS) 14. The CPU 21 causes the power supply circuit (PS) 47 to stop applying the voltage to the DRAMVCC 241 (FIG. 47) under the control of the power supply controller (PSC) 46. At the same time, the CPU 21 causes the EEPROMVCC 243 to apply the power supply voltage VR ($3\text{ V} \leq \text{VR} \leq 5\text{ V}$) required to operate the EEPROM 232 under the control of the power supply controller (PSC) 46 (step S191). At the same time, the CPU 21 disables all the lines of the interface signal line groups 242 connected to the DRAM 231.

The CPU 21 reads the state (8-bit data) of the PD pin line group 244 set in the input mode and checks the state of the lower four bits (PD4 through PD1) (step S192). If the states of the pins PD4 through PD1 are given as "1111" (step S193), the CPU 21 determines "No Card", as can be apparent from FIG. 50. The CPU 21 uses a system memory 23 as a main memory to power on the system.

To the contrary, as in this embodiment wherein the DRAM card 24 of the EXPANSION specifications is mounted in the card slot 20, if the states of the pins PD4 through PD1 are given as "0111" (step S194), the CPU 21 determines the "EXPANSION mode", as can be apparent from FIG. 50. The CPU 21 switches the pins PD8, PD7, and PD6 (used as output pins) to the output mode and sets the pin PD5 (used as an input pin) in the input mode. The CPU 21 reads the card configuration information from the EEPROM 232 on the DRAM card 24 (step S195). That is, the CPU 21 sets the pin PD8 to low level and the CS terminal of the EEPROM 232 to high level. The CPU 21 receives a clock from the pin PD7 to the CK terminal thereof. At the same time, the CPU 21 receives an address from the pin PD6 to the SI terminal thereof, and serial output data representing the read/write access type. The CPU 21 reads the card configuration information serially output from the SO terminal of the EEPROM 232 through the pin PD5 in accordance with the input data.

When the CPU 21 reads the card configuration information from the EEPROM 232, the CPU 21 determines from the card configuration represented by this information whether the DRAM card 24 is usable in this computer system (step S196). If YES in step S196, the CPU 21 determines whether the DRAM (231) power supply voltage represented by the operating voltage information described in the read card configuration information is supported by this system (i.e., whether the operating voltage can be applied from the power supply circuit (PS) 47). That is, the CPU 21 determines whether the DRAM card 24 is usable in this system (steps S197 and S198).

If the DRAM card 24 is usable also in consideration of the power supply voltage, the CPU 21 transfers control information to the power supply controller (PSC) 46 through the system bus (ISA-BUS) 11, the status LCD control gate array (SLCDC GA) 26, and the power supply interface bus (PSC-BUS) 14. Under the control of the power supply controller (PSC) 46, the power supply voltage for the DRAM 231, which is represented by the operating voltage information, is applied from the power supply circuit (PS) 47 to the DRAMVCC 241 shown in FIG. 49 (step S199). The power supply voltage for the DRAM 231 on the DRAM card 24 is regulated to an optimal power supply voltage required when the system is powered on. At the same time, the CPU 21 activates all the lines of the interface signal line group 242 connected to the DRAM 231.

In this state, the CPU 21 powers on the system using the DRAM 231 on the DRAM card 24 mounted in the card slot 20, as an expanded memory of the system memory 23.

On the other hand, if the states of the pins PD4 through PD1 are not given as "0111", i.e., if the "EXPANSION" mode is not set, the CPU 21 determines that a card of the EXPANSION specifications is not mounted in the card slot 20, but a DRAM card of the perfect standard specifications is mounted therein. In this case, the CPU 21 continues the input mode of the PD pin line group 244 and reads the standard card configuration information defined by the pins PD8 through PD1 through the PD pin line group 244 (steps S194 and S200).

The CPU 21 determines from the card configuration represented by the read standard card configuration information whether the DRAM card is usable in this system (step S201). If YES in step S201, the CPU 21 transfers control information to the power supply controller (PSC) 46 through the system bus (ISA-BUS) 11, the status LCD control gate array (SLCDC GA) 26, and the power supply interface bus (PSC-BUS) 14. Under the control of the power supply controller (PSC) 46, the power supply voltage of the system is applied from the power supply circuit (PS) 47 to the DRAMVCC 241 shown in FIG. 49. At the same time, the CPU 21 activates all the lines of the interface signal line group 242 connected to the DRAM on the DRAM card.

In this state, the CPU 21 uses the DRAM on the DRAM card mounted in the card slot 20, as an expanded memory of the system memory 23, to power on the system.

The card configuration information is read from the EEPROM 232 on the DRAM card 24 only when the system is powered on. Therefore, when the power-ON operation (initialization) of the system in accordance with the card configuration information read from the EEPROM 232 is completed, the power supply voltage (EEPROM power supply voltage) to the EEPROMVCC 243 may be interrupted (OFF). In this case, the wasteful power consumption can be reduced in a battery-operated system.

In a system wherein the power supply is interrupted (suspend) while the contents of a memory are kept held (i.e., the backup power supply voltage BK is kept applied to the DRAMVCC 241), and the system restores (resumes) a state immediately before the power-OFF operation when the system is powered on again, the power supply voltage need not be supplied to the EEPROMVCC 243 in the suspend mode.

The ninth embodiment of the present invention will be described below. In this embodiment, whether an electronic mail has been received can be automatically displayed without adversely affecting execution of an application program or the like. More specifically, when an electronic mail to this portable computer is received by a mail server on a LAN, a mail reception status signal is sent from this server to the communication board of the computer. In this state, a CPU interrupt is supplied from an I/O controller to start a communication driver program residing in the system memory. A CPU 21 reads the mail reception status signal from the communication board in accordance with this program. When the CPU 21 detects that a valid mail has been received, the CPU 21 calls the BIOS in a BIOS-ROM. The CPU 21 sets the mail icon ON on a status LCD through a status LCD control gate array and returns control to the application program under execution.

Figure 55:
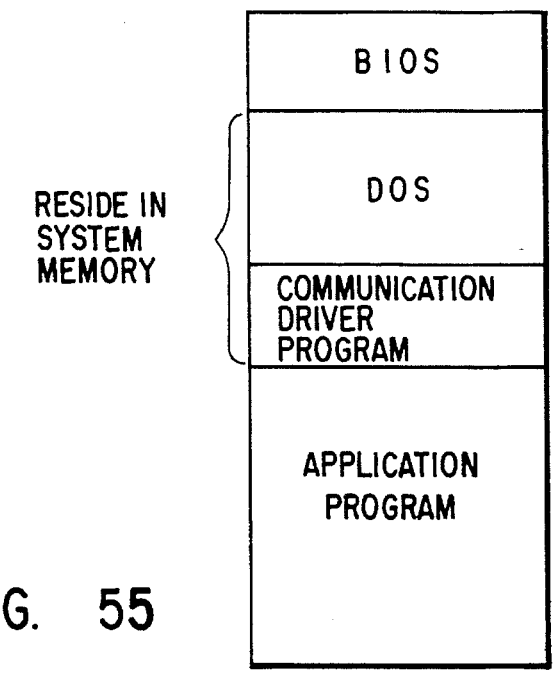
FIG. 55 is a schematic memory map of the ninth embodiment.

This embodiment will be described with reference to FIGS. 2 and 54 through 56. The same reference numerals as in FIG. 1 denote the same parts in FIGS. 54 through 56, and a detailed description thereof will be omitted. In the embodiment shown in FIG. 54, a mail icon control register (MICR) 26a for holding control data for ON/OFF-controlling a mail icon R7 displayed on a status LCD 44 is included in the system of this embodiment. A communication board 32 having a communication interface function capable of exchanging electronic mails with other portable computers through a server (mail server) on a LAN is mounted on an expansion board 31. When the mail server informs the communication port 32 of reception of the electronic mail to the portable computer shown in FIG. 54, the communication board 32 sends an interrupt from an I/O controller 22 to the CPU 21 through a system bus (ISA-BUS) 11. FIG. 55 shows a schematic memory map of this system.

AS shown in FIG. 55, the BIOS stored in a BIOS-ROM 25, a DOS (Disk Operating System), a communication driver program, and various application programs are installed in the memory space of the system.

The DOS and the communication driver program are prestored in a system disk used and loaded in a floppy disk driver (FDD) 45. The DOS and the communication program are loaded in a system memory 23 and reside in the memory 23. The communication driver program is started every time mail reception is informed from the communication board 32 to determine whether a valid electronic mail has been received. The BIOS is called in accordance with the determination result to turn on the display of the mail icon (MI) R7 (FIG. 2).

Various application programs are stored in the system memory 23 or a DRAM card 24.

Frequently accessed portions of the BIOS stored in the BIOS-ROM 25 are stored in the system memory 23 to perform high-speed access when the system is powered on. For the descriptive convenience, the BIOS is executed by always accessing the BIOS-ROM 25 because this is not directly associated with the present invention.

The operation of the ninth embodiment will be described with reference to a flow chart in FIG. 56.

Assume that the portable computer having the arrangement shown in FIG. 54 is connected to a LAN through the communication board 32 mounted in an expansion unit (Desk Station) connected to an expansion connector 31. A mail server for controlling exchange of electronic mails between, e.g., personal computers connected through the LAN is connected to the LAN. When this mail server receives an electronic mail to, e.g., the portable computer shown in FIG. 54, the mail server stores this electronic mail in a mail box assigned to this computer and informs the communication board 32 of reception status (mail reception status). 10 The communication board 32 always monitors the mail reception status signal from the mail server. When the communication board 32 receives this mail reception status signal, the communication board 32 informs the I/O controller 22 of this signal through the system bus (ISA-BUS) 11, thereby causing the controller 22 to generate an interrupt to the CPU 21.

Figure 56:
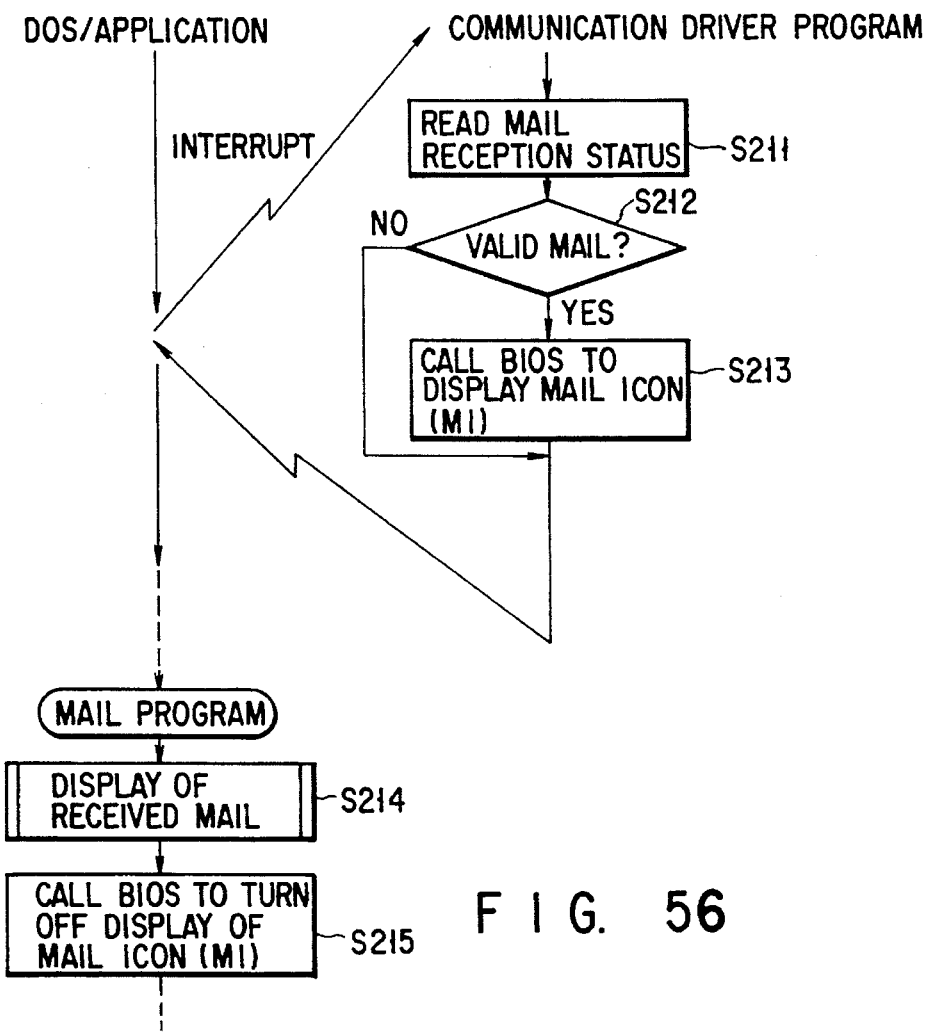
FIG. 56 is a flow chart for explaining the operation of the ninth embodiment.

In the portable computer shown in FIG. 54, the CPU 21 executes the DOS loaded in the system memory 23 or an application program or the like loaded in the system memory 23 or the DRAM card 24.

when the communication board 32 detects a mail reception status signal from the mail server and an interrupt is sent from the I/O controller 22 to the CPU 21 during execution of the DOS or application program, the CPU 21 executes the communication driver program residing in the system memory 23, as shown in the flow chart in FIG. 56.

The CPU 21 accesses the communication board 32 through the system bus (ISA-BUS) 11 to read the mail reception status held in the communication board 32 (step S211). The CPU 21 checks whether a valid mail free from a reception error is received in accordance with the read mail reception status (step S212).

If YES in step S212, the CPU 21 calls the BIOS stored in the BIOS-ROM 25 through the system bus (ISA-BUS) 11 in accordance with the communication driver program and turns on the display of the mail icon (MI) R7 on the status LCD 44. The display of this mail icon (MI) R7 will be described in detail later.

More specifically, when the CPU 21 calls the BIOS, the CPU 21 write-accesses the mail icon control register (MICR) 26*a* in a status LCD control gate array (SLCDC GA) 26 through the system bus (ISA-BUS) 11 and sets control data representing a value of "1" in the register (MICR) 26*a* so as to turn on the display of the mail icon (MI) R7 on the status LCD 44. The status LCD control gate array (SLCDC GA) 26 displays the ON state of the mail icon (MI) R7 formed by a fixed LCD pattern (FIG. 2) at a predetermined position on the status LCD 44 in accordance with the control data having the value of "1" set in the mail icon control register (MICR) 26*a*.

The ON state of the mail icon (MI) R7 on the status LCD 44 makes the user know that an electronic mail has been received even if the portable computer in FIG. 54 is executing the DOS or application program and its execution states are displayed on an LCD panel 49 (without interrupting the DOS or application program under execution or performing a special operation such as mail program running).

Processing for informing the user of the presence of the received mail by the ON state of the mail icon (MI) R7 can be ended within a very short period of time as compared with a conventional scheme wherein a mail program runs while an application program under execution is kept interrupted, the electronic mail received by a mail server is read into a personal computer and displayed on the screen, and the user returns to the previous application program upon confirmation of the electronic mail. Therefore, in this embodiment, the application program under execution will not be kept interrupted for a long period of time.

In this embodiment, while the mail icon (MI) R7 is not displayed, the user recognizes that any electronic mail is not received. For this reason, unlike in the conventional case, the program under execution need not be interrupted, or the mail program need not run to confirm the presence of an electronic mail, or time is not wasted because, in the conventional case, even the absence of a received mail must be confirmed upon running the mail program.

If NO in step S212, the CPU 20 skips step S213 for displaying the mail icon (MI) R7 and performs no operation. In this case, if the mail icon (MI) R7 is already displayed, this display state is continued. However, if the mail icon (MI) R7 is not displayed, this OFF state is continued.

Processing using the BIOS in accordance with the communication driver program can be performed within a very short period of time, as described above. When this processing is ended, control returns to the previous program (DOS or application program), as shown in the flow chart of FIG. 56.

The user confirms in accordance with the ON state of the mail icon (MI) R7 displayed on the status LCD 44 that an electronic mail has been received, a predetermined operation is performed with a keyboard (KB) 51 or the like at a desired timing to run the mail program, thereby performing processing shown in FIG. 56. This mail program is loaded from, e.g., the floppy disk drive (FDD) 45 to the system memory 23 (or the DRAM card 24) as needed.

When the mail program is executed, the received mail is displayed (step S214). This display processing will be described in detail later.

The communication driver program in the system memory 23 is called from the mail program. The CPU 21 accesses the mail server on the LAN through the system bus (ISA-BUS) 11 and the communication board 32 in accordance with this communication driver program and read all the received mails stored in the server (i.e., its own mail box). The read mails are stored in the system memory 23. Control returns from the communication driver program to the mail program.

The CPU 21 performs control for displaying the electronic mails stored in the system memory 23 on the LCD panel 49 in accordance with the mail program, thereby completing the received mail display processing in step S214.

Upon completion of the received mail display processing in step S214, the CPU 21 calls the BIOS stored in the BIOS-ROM 25 to turn off the display of the mail icon (MI) R7 on the status LCD 44 in accordance with the mail program (step S215). The OFF operation of the mail icon (MI) R7 will be described in detail later.

When the CPU 21 calls the BIOS, the CPU 21 write-accesses the mail icon control register (MICR) 26a in the status LCD control gate array (SLCDC GA) 26 through the system bus (ISA-BUS) 11 in accordance with this BIOS and sets control data having a value of "0" for turning off the display of the mail icon (MI) F7 in the register (MICR) 26a. The status LCD control gate array (SLCDC GA) 26 turns off the display of the mail icon (MI) F7 on the status LCD 44 in accordance with the control data having the value of "0" set in the mail icon control register (MICR) 26a.

The above description has been made for indicating the presence/absence of the received electronic mail by means of the mail icon (MI). However, the present invention is not limited to this. The presence/absence of an electronic mail may be indicated by an LED lamp or the like.

The tenth embodiment of the present invention will be described below. In this embodiment, image data output to an internal display device or an external display device can be automatically switched in accordance with the open/closed state of a display panel when the power switch is turned on. That is, when the power switch is turned on, the BIOS sets the ON/OFF status of the panel switch in a register to determine the open/closed state of the display panel in accordance with the set data. If the display panel is open, the BIOS instructs a display controller to output image data to only the internal LCD panel. The display controller then outputs the image data stored in a video RAM to only the LCD. When the display panel is kept closed upon a power-ON operation, the BIOS instructs the display controller to output image data to both the LCD and a CRT. The display controller then outputs the image data stored in the video RAM to both the LCD and the CRT.

The tenth embodiment will be described with reference to the accompanying drawings. A panel switch 56 (FIG. 57) for detecting opening/closing of the display panel 49 is arranged in the main body shown in FIG. 2. This panel switch 156 detects opening/closing of the display panel 49 in accordance with, e.g., pivot positions of the legs 114a and 114b. A connector (not shown) for optionally connecting an external display device such as a CRT is arranged on the rear end portion of the main body.

In FIG. 57, a panel switch 156 for detecting opening/closing of the display panel 49 is set, e.g., ON when the display panel 49 is kept closed and OFF when the display panel 49 is open. The ON/OFF status of the panel switch 156 is set in a register within the PCMCIA-GA 28 when the power switch is turned on. The ON/OFF status signal is sent to a power supply controller 46. The contents set in the register within the PCMCIA-GA 28 are checked by the BIOS stored in the BIOS-ROM 25. The power supply controller 46 has a function of controlling to apply a power supply voltage to each unit in accordance with an instruction from the CPU 21 and determines opening/closing of the display panel 49 in accordance with the ON/OFF signal from the panel switch 156, thereby controlling supply of the power supply voltage to the display panel 49. More specifically, when the display panel 49 is open in the power-ON state, the power supply controller 46 instructs to apply a power supply voltage to the display panel 49. When the display panel 49 is kept closed, the power supply controller 46 instructs to stop supplying the power supply voltage to the display panel 49.

The display controller 32 is operated in accordance with an instruction from the BIOS upon the power-ON operation. When the display panel 49 is kept closed upon the power-ON operation, the display controller 32 supplies image data to both the display panel 49 and the CRT display device 50. When the display panel 49 is open, the display controller 32 supplies the image data to only the display panel 49.

The operation of this embodiment will be described with reference to a flow chart in FIG. 58. When the power switch is turned on in use of the portable computer, the ON/OFF status of the panel switch 156 is set in the register within the PCMCIA-GA 28 under the control of the BIOS (step S221). The BIOS reads the contents of the register within the PCMCIA-GA 28 (step S222) to determine in accordance with the ON/OFF status of the panel switch 156 whether the display panel is open/closed (step S223). If the display panel 49 is open, the BIOS instructs the display controller 32 to output image data to only the display panel 49. The display controller 32 then outputs the image data stored in the video RAM 33 to only the display panel 49 (step S224). If the display panel 49 is closed, the power supply controller 46 instructs to supply a power supply voltage to the display panel 49 and the CRT display device 50, and the image data is displayed on the display panel 49 and the CRT display device 50.

When the power switch is turned on in the open state of the display panel 49, the BIOS determines that the internal display panel 49 is used, and the data is displayed on only the display panel 49. In this case, the display data is not output to the external CRT display device 50.

If it is determined in step S223 that the display panel 49 is kept closed, the BIOS instructs the display controller 32 to output image data to both the display panel 49 and the CRT display device 50. The display controller 32 outputs the image data to both the display panel 49 and the external CRT display device 50 (step S225). In this case, since the display panel 49 is kept closed, the power supply controller 46 sends a command for stopping outputting the power supply voltage to the display panel 49, and the display panel 49 is kept inoperative. Therefore, the image data is displayed on only the CRT display device 50.

As described above, when the power switch is turned on in the closed state of the display panel 49, the BIOS determines use of the external CRT display device 50 and outputs the image data to the CRT display device 50. For example, image data may be displayed on the CRT display device 50 with the display panel 49 being kept closed, using an application program as in a demonstration display.

After the power switch is turned on, the display panel 49 may be opened to use the display panel 49. To cope with this operation, image data is also output to the display panel 49. When the display panel 49 is opened after the power switch is turned on, the power supply voltage is applied to the display panel 49 in accordance with an instruction from the power supply controller 46. Therefore, the image data is immediately displayed on the display panel 49.

Figures 58, 59:
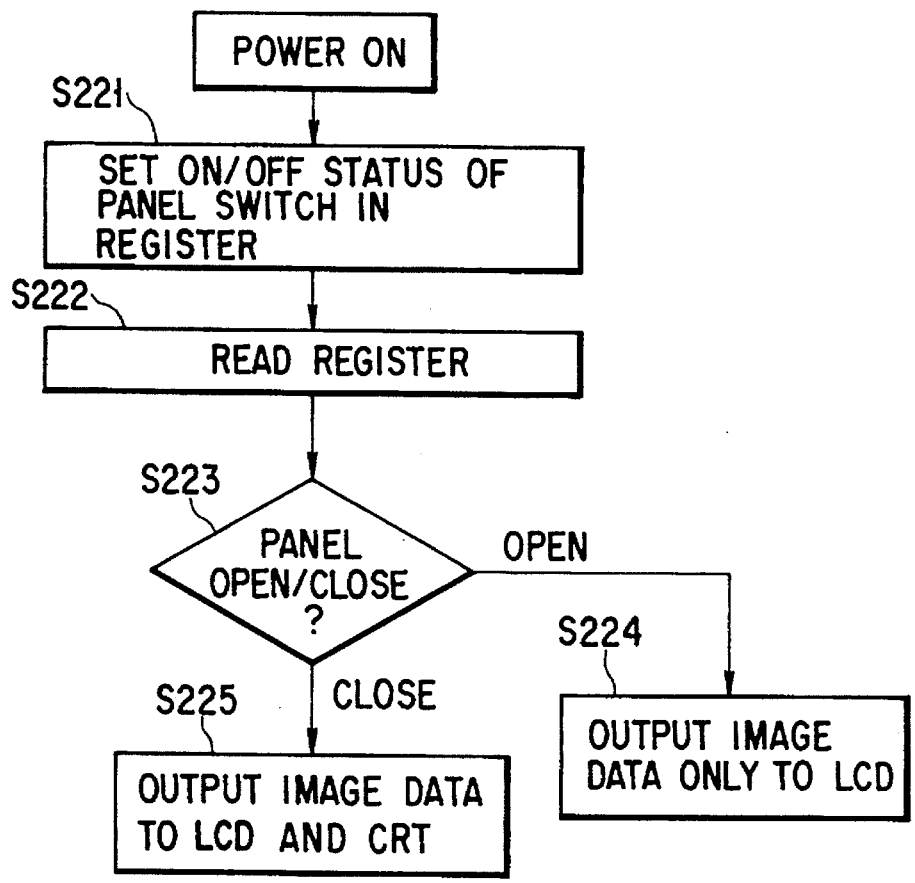
FIG. 58 is a flow chart showing a display device switching procreating of the tenth embodiment.
FIG. 59 is a table showing a relationship between the open/closed state of a display panel and image data output to the display device upon a power-ON operation.

FIG. 59 is a table showing the relationship between the open/closed state of the display panel 49 upon the power-ON operation and the image data output to the display panel 49 and the CRT display device 50. Each circle in FIG. 59 represents that the image data is output.

In the closed state of the display panel 49, the image data is not output to the display panel 49. When the display panel 49 is opened, this state may be detected and the image data may be output to the display panel 49. In this case, interrupt processing must be performed upon opening the display panel 49, and the image data must be output from the display controller 32 to the display panel 49. This operation is not desirable because the interrupt processing is time-consuming, and switching of image data may not be properly performed.

According to the present invention, as described in the above embodiment, when the power switch is turned on, the open/closed state of the display panel 49 is detected, and the output states of the image data to the display panel 49 and the CRT display device 50 are automatically controlled. In addition, after the power switch is turned on, the output states of the image data may be arbitrarily switched in accordance with a key operation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable computer having a CPU, a memory, a keyboard, and a system bus, the portable computer further comprising:

a keyboard controller connected to the CPU through the system bus, the keyboard controller having scan-out I/O ports to which scan lines are connected to transmit, to the keyboard, scan signals, and scan-in I/O ports to which return lines are connected to receive return signals from the keyboard;

a keyboard interface bus including the scan lines and the return lines, and connecting the keyboard controller to the keyboard;

a dedicated register group connected to the CPU through the system bus and to the keyboard controller through the scan lines of the keyboard interface bus, for temporarily storing control information exchanged between the CPU and the keyboard controller;

wherein the keyboard controller writes a hot key data portion of key data in the dedicated register group from the scan I/O port through the keyboard interface bus, the hot key data being formed to set or change an operation mode of the portable computer; and wherein the keyboard controller transmits remaining key data to the CPU through the system bus.

2. The portable computer according to claim 1, wherein:

the dedicated register group includes a function status register and a system management interrupt (SMI) transmission register;

the keyboard controller writes the hot key data in the function status register and SMI issuance data in the SMI transmission register; and the CPU reads, in response to the SMI issuance data, the hot key data held in the function status register to perform a hot key function including instant security mode switching, battery save mode switching, switching between resume and boot modes, switching between LCD and CRT display modes, and monochrome inverted display switching.

3. The portable computer according to claim 1, wherein:

the dedicated register group includes a function status register and a request signal register;

the CPU writes the hot key data in the function status register and a request signal in the request signal register; and the keyboard controller reads, in response to the request signal issuance, the hot key data held in the function status register to perform a hot key function including a function of setting an "Arrow" mode for using a key on the keyboard together with an arrow key, a function of setting a "Numeric" mode for using key on the keyboard together with an arrow key, and a function of setting a "Scroll lock" mode of the keyboard.

* * * * *